(12) United States Patent
Fujisawa et al.

(10) Patent No.: US 7,019,205 B1
(45) Date of Patent: Mar. 28, 2006

(54) ENTERTAINMENT SYSTEM, ENTERTAINMENT APPARATUS, RECORDING MEDIUM, AND PROGRAM

(75) Inventors: Takafumi Fujisawa, Tokyo (JP); Naoto Nakai, Tokyo (JP); Jun Tsuda, Tokyo (JP); Tomoo Yamaguchi, Tokyo (JP); Takeshi Shimizu, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 642 days.

(21) Appl. No.: 09/687,464

(22) Filed: Oct. 13, 2000

(30) Foreign Application Priority Data

Oct. 14, 1999 (JP) .......................................... 11-293061

(51) Int. Cl.
*A63H 5/00* (2006.01)
*G04B 13/00* (2006.01)
*G10H 7/00* (2006.01)

(52) U.S. Cl. ............................. 84/609; 84/615; 84/626; 84/649; 84/662

(58) Field of Classification Search ........... 84/600–603, 84/609–612, 615–616, 618, 626–636, 645, 84/649–654, 656, 662–668
See application file for complete search history.

(56) References Cited

U.S. PATENT DOCUMENTS

| 5,212,733 A | 5/1993 | DeVitt et al. |
| 5,315,057 A | 5/1994 | Land et al. |
| 5,491,297 A | 2/1996 | Johnson et al. |

(Continued)

FOREIGN PATENT DOCUMENTS

| EP | 0 778 536 A2 | 6/1997 |
| EP | 0 920 892 A2 | 6/1999 |
| JP | 2-093498 | 4/1990 |
| JP | 02-108098 | 4/1990 |
| JP | 4-068633 | 11/1992 |
| JP | 06-343764 | 12/1994 |
| JP | 07-064545 | 3/1995 |
| JP | 07-121163 | 5/1995 |

(Continued)

OTHER PUBLICATIONS

A. Merck; "Steinberg Cubase Audio Sequenzer & Harddisk–Recording fur Apple Macintosh"; Keyboard, Music Media Verlag; Augsburg; Jan. 1993; pp. 112–115 and 118; XP–002240715; (full 10–page English translation also included).

Japanese Patent Office; "Rejection of the Application"; Mailing No. 101038; Mailing date Apr. 1, 2003; 4 pages (including one–page English translation of portions).

(Continued)

*Primary Examiner*—Marlon T. Fletcher
(74) *Attorney, Agent, or Firm*—Fitch, Even, Tabin & Flannery

(57) ABSTRACT

A music information processing means comprises a music editing means for assigning an arbitrary sound pattern selected from a plurality of sound patterns in a sound buffer to at least one track, a sound presentation trial processing means for outputting the sound pattern assigned to the track on a speaker of a display monitor via SPU when a control input of the user satisfies a predetermined condition, and an audio data processing means for registering audio data extracted from audio data introduced from a music CD (Compact Disc) or the like loaded in an optical disk drive as one of the sound patterns in a sound pattern file in the sound buffer.

12 Claims, 80 Drawing Sheets

U.S. PATENT DOCUMENTS

| | | | |
|---|---|---|---|
| 5,592,602 A | | 1/1997 | Edmunds et al. |
| 5,623,112 A | * | 4/1997 | Ito et al. .................. 84/622 |
| 5,627,335 A | | 5/1997 | Rigopulos et al. ............ 84/635 |
| 5,680,534 A | * | 10/1997 | Yamato et al. .............. 345/473 |
| 5,684,259 A | | 11/1997 | Horii |
| 5,723,803 A | | 3/1998 | Kurakake .................. 84/637 |
| 5,763,804 A | | 6/1998 | Rigopulos et al. ............ 84/635 |
| 5,782,692 A | * | 7/1998 | Stelovsky .................. 463/1 |
| 5,859,380 A | | 1/1999 | Anada |
| 5,869,781 A | | 2/1999 | Kurata |
| 5,919,047 A | | 7/1999 | Sone |
| 6,011,212 A | | 1/2000 | Rigopulos et al. ............ 84/667 |
| 6,031,174 A | | 2/2000 | Takabayashi |
| 6,066,792 A | * | 5/2000 | Sone ...................... 84/609 |
| 6,150,598 A | * | 11/2000 | Suzuki et al. .............. 84/603 |
| 6,172,948 B1 | | 1/2001 | Keller et al. |
| 6,177,624 B1 | | 1/2001 | Takahashi et al. |
| 6,211,453 B1 | * | 4/2001 | Kurakake .................. 84/609 |
| 6,274,798 B1 | | 8/2001 | Suzuki et al. .............. 84/615 |
| 6,281,420 B1 | * | 8/2001 | Suzuki et al. ............ 84/477 R |
| 6,320,110 B1 | * | 11/2001 | Ishikawa et al. ............ 84/600 |
| 6,347,998 B1 | | 2/2002 | Yoshitomi et al. |
| 6,353,170 B1 | * | 3/2002 | Eyzaguirre et al. ........... 84/603 |
| 6,377,530 B1 | | 4/2002 | Burrows |
| 6,450,888 B1 | | 9/2002 | Takase et al. |

FOREIGN PATENT DOCUMENTS

| | | |
|---|---|---|
| JP | 7-271375 | 10/1995 |
| JP | 8-030270 | 2/1996 |
| JP | 8-110787 | 4/1996 |
| JP | 08-185164 | 7/1996 |
| JP | 08-305356 | 11/1996 |
| JP | 8-305356 A | 11/1996 |
| JP | 9-325776 | 12/1997 |
| JP | 10-149165 | 6/1998 |
| JP | 10-149166 | 6/1998 |
| JP | 10-171460 | 6/1998 |
| JP | 11-015482 | 1/1999 |
| JP | 11-161271 | 6/1999 |
| JP | 11-242483 | 9/1999 |

OTHER PUBLICATIONS

"Techtv, Windows 98/ME Control Panel Features" [online]; Retrieved from the internet on <URL: http://www.techtv.com/callforhelp/howto/jump/0,24331,3413232,00.html>; XP-002237407; pp. 1-3; Retrieved from the internet on Jul. 4, 2003.

European Patent Office; "European Search Report"; cited in counterpart European Patent Application No. EP 00 30 9040 of related U.S. Appl. No. 09/687,578, filed May 27, 2003, pp. 1-3.

European Patent Office; "European Search Report"; cited in corresponding European Patent Application No. EP 00 30 9037 of related U.S. Appl. No. 09/687,497, filed May 21, 2003, pp. 1-3.

Classic Gaming; "Arcade Games: N-P Ping Pong"; XP-002237538; URL:www.classicgaming.com/vault/roms/arcaderoms.PingPong11735.shtml; Apr. 27, 1998; Retrieved from the internet on Apr. 8, 2003; (one page).

Japanese Patent Office; "Rejection of the Application"; Mailing No. 218699; Mailing Date: Jul. 1, 2003; issued in a counterpart foreign application for related U.S. Appl. No. 09/687,497, 4 pages (including two-page English translation of portions).

Japanese Patent Office; "Japanese Office Action"; Mailing No. 317301; Mailing Date: Oct. 1, 2002; issued in a counterpart foreign application for related U.S. Appl. No. 09/687,497, 3 pages (including one-page English translation of portions).

European Patent Office; "European Search Report"; cited in corresponding European Patent Application No. EP 00 30 9033; dated Jun. 20, 2003; pp. 1-2.

European Patent Office; "European Search Report"; cited in European Patent Application No. EP 00 30 9037 corresponding to related U.S. Appl. No. 09/687,497, dated May 21, 2003, pp. 1-3.

"IQS SAW, 4-Spur-Harddisk-Recording fur Windows-PC"; Keyboards, Music Media Verlag; Augsburg; Apr. 1994; pp. 148-152; XP-002240866; (full 10-page English translation also included).

A. Merck; "Steinberg Cubase Audio Sequenzer & Harddisk-Recording fur Apple Macintosh"; Keyboard, Music Media Verlag; Augsburg; Jan. 1993; pp. 112-116; XP-002240715; (full 10-page English translation also included).

Japanese Patent Office, "Rejection of the Application", dated Mar. 23, 2004, for pending Japanese patent application, 6 pages.

European Patent Office, "Summons to Attend Oral Proceedings Pursuant to Rule 71(1) EPC", dated Jun. 30, 2005, issued over EP Application No. 00309037.0 corresponding to related U.S. application Ser. No. 09/687,497, 4 pages.

* cited by examiner

CONTROL INPUT PROCESSING

ENTERTAINMENT SYSTEM, ENTERTAINMENT APPARATUS, RECORDING MEDIUM, AND PROGRAM

BACKGROUND OF THE INVENTION

1. Field of the Invention

The present invention relates to an entertainment system having at least one manual controller connected to an entertainment apparatus which executes various programs, for entering control requests from the user into the entertainment apparatus, an entertainment apparatus which executes various programs, a recording medium storing a program and data that are used by the entertainment system, and a program itself.

2. Description of the Related Art:

Some entertainment systems including entertainment apparatus such as video game machines display video game images based on video game data stored in a recording medium such as a CD-ROM or the like on the display screen of a television receiver while allowing the user or game player to play the video game with commands entered via a manual controller.

In those entertainment systems, the entertainment apparatus and the manual controller are usually connected to each other by a serial interface. When a clock signal is supplied from the entertainment apparatus to the manual controller, the manual controller sends key switch information based on the user's control entries in synchronism with the clock signal.

Recently developed manual controllers incorporate a vibration generating means for applying vibrations to the user based on a request from an external apparatus such as an entertainment apparatus, for example. While a video game is in progress, the vibration generating means applies various different kinds of vibrations to the user in response to user's different control entries.

Almost all video games performed using the above entertainment system are accompanied by background music (BGM) that is outputted at all times while the video game is being played. Even when the user makes some action in the video game with its control input, the background music is continuously performed irrespective of the action, distracting the user's attention from the video game itself.

SUMMARY OF THE INVENTION

It is therefore an object of the present invention to provide an entertainment system, an entertainment apparatus, a recording medium, and a program which are capable of outputting a sound in response to a predetermined control input from the user to add musical interest to a video game or the like.

Another object of the present invention is to provide an entertainment system, an entertainment apparatus, a recording medium, and a program which can produce various sounds in response to control inputs from the user to complete a piece of music, thereby allowing the user to enjoy the fun of completing a piece of music.

Another object of the present invention is to provide an entertainment system, an entertainment apparatus, a recording medium, and a program which allow audio data supplied from music CDs (Compact Disks) or via a network to be used as a BGM sound source for a video game or the like, thus providing an additional element of musical interest for the video game.

Another object of the present invention is to provide an entertainment system, an entertainment apparatus, a recording medium, and a program which allow the user to compose music simply with a small-scale facility without using a musical score and also to enjoy a music composition process and compose a piece of music at any time.

An entertainment system according to the present invention comprises an entertainment apparatus for executing various programs, at least one manual controller for entering control requests from the user into the entertainment apparatus, a display unit for displaying images outputted from the entertainment apparatus, music editing means for assigning an arbitrary sound pattern selected from a plurality of sound patterns each composed of a combination of sounds to at least one track based on a control input from the manual controller, and sound presentation trial processing means for outputting the sound pattern assigned to the track when a control input from the manual controller satisfies a predetermined condition.

According to the present invention, an entertainment apparatus for connection to a manual controller for outputting at least a control request from the user and a display unit for displaying images, comprises music editing means for assigning an arbitrary sound pattern selected from a plurality of sound patterns each composed of a combination of sounds to at least one track based on a control input from the manual controller, and sound presentation trial processing means for outputting the sound pattern assigned to the track when a control input from the manual controller satisfies a predetermined condition.

A recording medium according to the present invention stores a program and data for use in an entertainment system having an entertainment apparatus for executing various prow grams, at least one manual controller for entering manual control requests from the user into the entertainment apparatus, and a display unit for displaying images outputted from the entertainment apparatus. The program stored in the recording medium comprises a first step of assigning an arbitrary sound pattern selected from a plurality of sound patterns each composed of a combination of sounds to at least one track based on a control input from the manual controller and a second step of outputting said sound pattern assigned to said track when a control input from the manual controller satisfies a predetermined condition.

According to th present invention, a program readable and executable by a computer, for use in an entertainment system having an entertainment apparatus for executing various programs, at least one manual controller for entering manual control requests from the user into the entertainment apparatus, and a display unit for displaying images outputted from the entertainment apparatus, comprises a first step of assigning an arbitrary sound pattern selected from a plurality of sound patterns each composed of a combination of sounds to at least one track based on a control input from the manual controller and a second step of outputting said sound pattern assigned to said track when a control input from the manual controller satisfies a predetermined condition.

Accordingly, audio data supplied from music CDs (Compact Disks) or via a network can be used as a BGM sound source for a video game or the like, thus providing an additional element of musical interest for the video game.

Further, the user can compose music simply with a small-scale facility without using a musical score and also to enjoy a music composition process and compose a piece of music at any time.

Further, the entertainment system according to the present invention can output a sound in response to a control input entered by the user, adding musical interest to a video game or the like. By producing various sounds in response to control inputs entered by the user, one piece of music can be completed, thereby allowing the user to enjoy the fun of completing a piece of music.

The music editing means or the corresponding first step may comprise means for, or the steps of, displaying a plurality of sound patterns composed of a combination of sounds as respective symbol images on the display unit, and, responsive to a control input from the manual controller to select at least one track displayed on the display unit and a control input from the manual controller to select the symbol images, registering sound patterns corresponding to the symbol images in the selected track.

Consequently, a desired sound pattern can be selected from a plurality of sound patterns composed of a combination of desired sounds, and assigned to a track. Since the user is simply required to place various sound patterns on tracks without the need for placing notes on a staff notation, the user can compose music through highly simple control actions even if the user does not have an ability to read musical scores.

With the present invention, the user is able to find desired sound patterns with ease and hence to make selections simply.

The music editing means or the corresponding first step may comprise editing view displaying means for, or the step of, displaying an editing view having a pallet display area including at least one track and a plurality of symbol images, on the display unit, track selecting means for, or the step of, selecting a track displayed on the display unit based on a control input from the manual controller, sound pattern selecting means for, or the step of, selecting a sound pattern corresponding to at least one of the symbol images in the pallet display area based on a control input from the manual controller to select the at least one of the symbol images, and sound pattern registering means for, or the step of, registering the sound pattern selected by the sound pattern selecting means or step in the track selected by the track selecting means or step.

The music editing means or the corresponding first step may comprise sound pattern outputting means for, or the step of, outputting a sound of the selected sound pattern via a speaker. In this manner, sound patterns can easily be retrieved.

The sound pattern outputting means or the step of outputting a sound may comprise means for, or the step of, outputting the selected sound pattern depending on an array of light spots which are turned on, of a string of light spots disposed in the selected track.

The music editing means or the corresponding first step may comprise light spot array changing means for, or the step of, changing the array of light spots which are turned on. It is thus possible to change the output states of the predetermined sound patterns to various patterns for increased light spot output pattern creativity.

The music editing means or the corresponding first step may comprise parameter changing means for, or the step of, changing a plurality of parameters of the selected sound pattern. The parameter changing means or the step of changing parameters allow the sound volumes of the sound patterns, PAN, pitches, etc. to be changed, so that music represented by a plurality of sound patterns can be changed to present various different atmospheres.

The music editing means or the corresponding first step may comprise sound changing means for, or the step of, changing an array of sounds of each of the sound patterns. In this fashion, the sounds of a sound pattern, e.g., the layout of notes, can be changed variously to develop a number of sound patterns from a single sound pattern.

The sound presentation trial processing means may display an object relatively moving on at least one track displayed on the display unit, allowing the user to try to acquire the object with a control input, and outputting a sound assigned to the track on which the object is relatively moving when the acquisition of the object with the control input is detected.

The display unit displays an object relatively moving on at least one track. The user tries to acquire the object by entering a control input. When the object is acquired, a sound assigned to the track on which the object has been relatively moving is outputted.

If there are a plurality of tracks, then when objects relatively moving on the tracks are successively acquired, sounds assigned to the tracks are successively outputted, and a piece of music is completed based on a combination of the sounds.

The sound presentation trial processing means or the corresponding second step may comprise object displaying means for, or the step of, displaying the object relatively moving on at least one track, object acquisition determining means for, or the step of, determining whether the object has been acquired with a control input or not, and sound outputting means for, or the step of, outputting a sound assigned to the track on which the object is relatively moving when the object acquisition determining means determines that the object has been acquired.

The sound presentation trial processing means or the corresponding second step may comprise acquiring object displaying means for, or the step of, displaying an acquiring object to acquire the relatively moving object, and the object acquisition determining means or corresponding step may comprise means for, or the step of, determining that the object is acquired if the distance between the acquiring object and the relatively moving object falls in a predetermined range when a predetermined control input is entered from the manual controller.

If a plurality of tracks are displayed on the display unit, then the object acquisition determining means or corresponding step may comprise means for, or the step of, determining that the object is acquired if a track on which the acquiring object and a track on which the relatively moving object are the same as each other when the predetermined control input is entered from the manual controller, and also if the distance between the acquiring object and the relatively moving object falls in the predetermined range.

There may be further included indicator displaying means for, or the step of, displaying an indicator image indicative of one of the tracks on which the object is coming.

If a sound pattern assigned to the track is disposed as a bit string indicative of whether the sound is to be outputted or not outputted, on the track, there may be further included light spot displaying means for, or the step of, displaying a bit string related to the acquired object and indicative of an output state, of the sound pattern disposed on the track on which the acquired object is positioned, in relative motion as an array of light spots, and the sound outputting means or the step of outputting a sound may comprise means for, or the step of, outputting a sound assigned to a light spot which has reached the acquiring object, of the sound pattern assigned to the track.

According to the present invention, there may be further included audio data processing means, or a corresponding third step of, registering audio data extracted from audio data introduced from an external source as one of the sound patterns.

With the above arrangement, audio data introduced from a music CD or via a network can be used as the sound pattern, providing an additional element of musical interest to video games that are played back on the entertainment apparatus.

The audio data processing means or the corresponding third step may comprise audio data extracting means for, or the step of, extracting audio data from the audio data introduced from the external source based on a control input entered from the manual controller, and audio data registering means for, or the step of, registering the extracted audio data as one of the sound patterns.

The audio data processing means or the corresponding third step may comprise trimming means for, or the step of, trimming an excessive portion off the extracted audio data. Since unwanted data can be cut off from the extracted audio data, only impressive audio data can be used as a sound pattern.

The audio data processing means or the corresponding third step may comprise effect applying means for, or the step of, applying an effect to the extracted audio data. Thus, even one form of audio data can be modified into different forms of audio data by applying various effects, resulting in a variety of sound patterns available.

The audio data processing means or the corresponding third step may comprise audio data re-extracting means for, or the step of, re-extracting audio data from the extracted audio data. Consequently, the user can extract only favorite portions from the audio data to which various effects have been applied or the audio data from which unwanted portions have been removed. Therefore, the quality of audio data for use as sound patterns can be increased, and the process of extracting audio data is easy.

The audio data re-extracting means or step may comprise selecting playback means for reproducing the extracted audio data according to a playback attribute selected according to a control input entered from the manual controller. Therefore, the audio data can be varied in various playback modes such as the reverse playback mode and the skipping playback mode, resulting in a variety of sound patterns available.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 80:
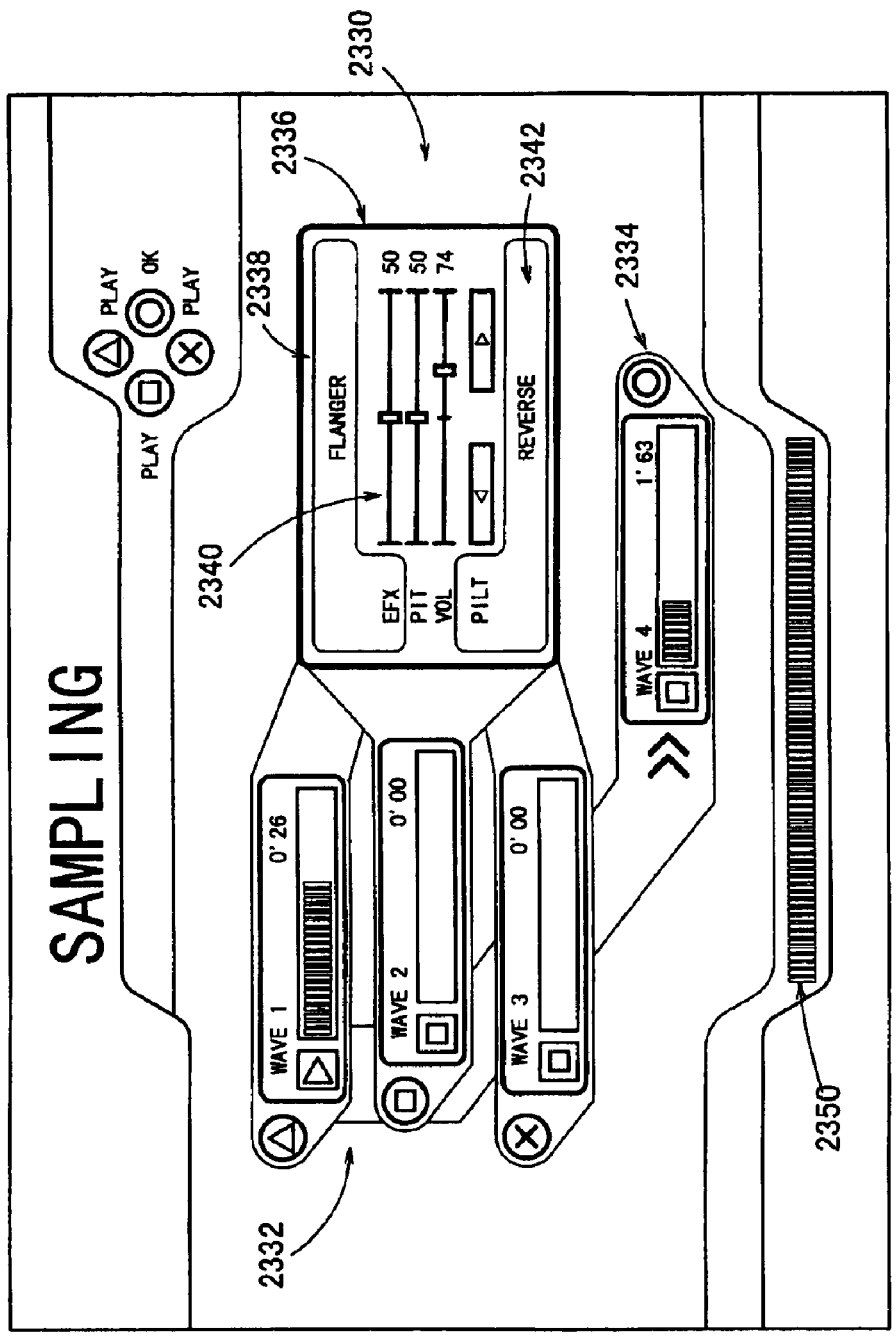
FIG. 80 is a view showing a displayed re-sampling view.

An entertainment system and an entertainment apparatus according to the present invention as applied to a video game apparatus, and a recording medium and a program according to the present invention as applied to a recording medium which stores a program and data to be executed by the video game apparatus and a program to be executed by the video game apparatus will be described below with reference to FIGS. 1 through 80.

Figure 1:
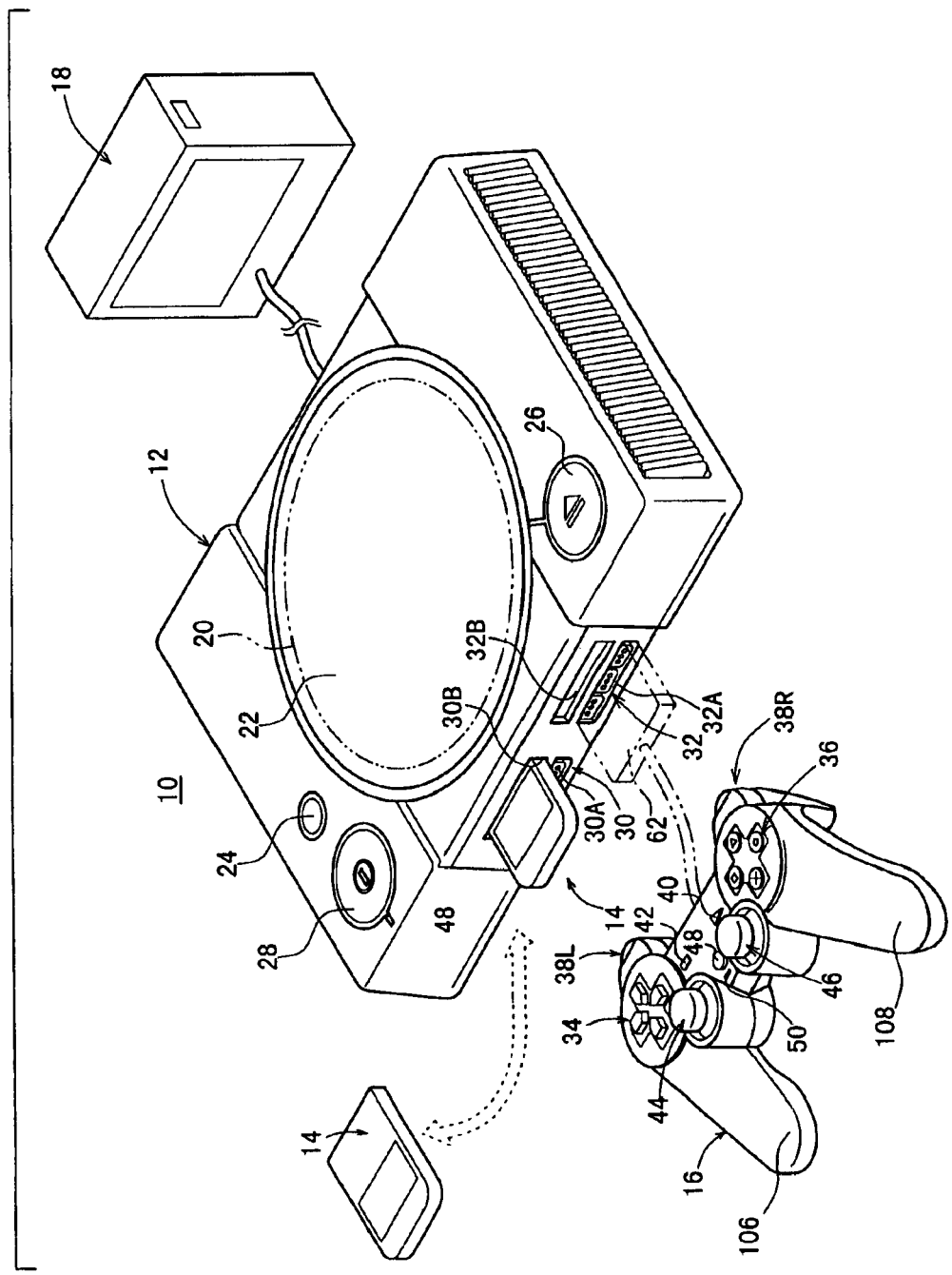
FIG. 1 is a perspective view of an entertainment system according to the present invention.

As shown in FIG. 1, an entertainment system 10 basically comprises an entertainment apparatus 12 for executing various programs, a memory card 14 detachably connected to the entertainment apparatus 12, a manual controller 16 detachably connected to the entertainment apparatus 12 by a connector 62, and a display monitor 18 such as a television receiver which is supplied with video and audio output signals from the entertainment apparatus 12.

The entertainment apparatus 12 reads a program recorded in a mass storage medium such as an optical disk 20 such as a CD-ROM or the like, and executes a game, for example, based on the program depending on commands supplied from the user, e.g., the game player, via the manual controller 16. The execution of the game mainly represents controlling the progress of the game by controlling the display of images and the generation of sounds on the display monitor 18 based on manual input actions entered from the manual controller 16 via the connector 62.

The entertainment apparatus 12 has a substantially flat casing in the shape of a rectangular parallelepiped which houses a disk loading unit 22 disposed centrally for loading an optical disk 20 for supplying an application program and data for a video game or the like. The casing supports a reset switch 24 for resetting a program which is being presently executed, a disk control switch 26 for controlling the loading of the optical disk 20, a power supply switch 28, and two slots 30, 32.

The entertainment apparatus 12 may be supplied with the application program via a communication link, rather than being supplied from the optical disk 20 as the recording medium.

The slots 30, 32 have respective upper slot units 30B, 32B and respective lower slots units 30A, 32A. Two manual controllers 16 may be connected respectively to the lower slots units 30A, 32A, and memory cards 14 or portable information terminals (not shown) having the function of the memory card 14 for storing flags indicative of interim game data may be connected respectively to the upper slots units 30B, 32B. The slots 30, 32 (the upper slot units 30B, 32B and the lower slots units 30A, 32A) are asymmetrically shaped to prevent the connectors 62 and the memory cards 14 from being inserted in the wrong direction.

Figure 2:
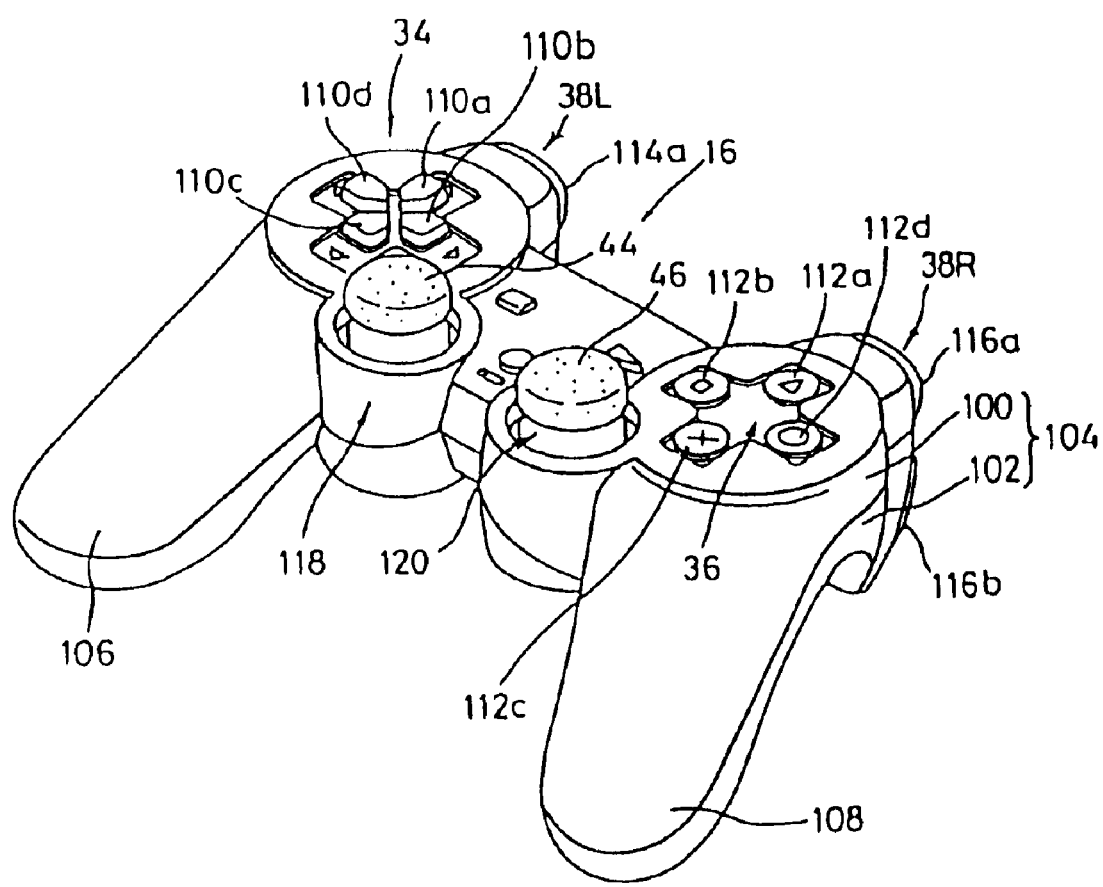
FIG. 2 is a perspective view of a manual controller.
Figure 3:
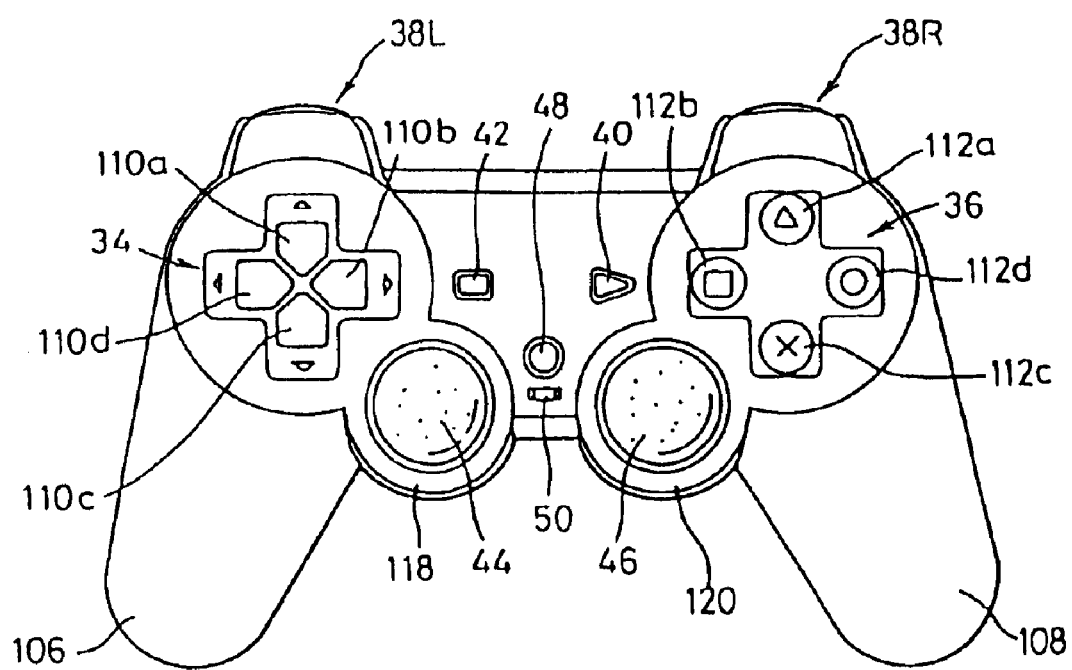
FIG. 3 is a plan view of the manual controller.

As shown in FIGS. 2 and 3, the manual controller 16 has first and second control pads 34, 36, an L (Left) button 38L, an R (Right) button 38R, a start button 40, and a selection button 42. The manual controller 16 also has joysticks 44, 46 for inputting analog control actions, a mode selection switch 48 for selecting control modes of the joysticks 44, 46, and a mode indicator 50 for indicating a selected control mode. The mode indicator 50 comprises a light-emitting element such as a light-emitting diode or the like.

As shown in FIG. 2, the manual controller 16 has a housing 104 comprising an upper member 100 and a lower member 102 which are mated and joined to each other by fasteners such as screws.

As shown in FIGS. 2 and 3, a pair of left and right grips 106, 108 projects from one side of respective opposite ends of the housing 104. The left and right grips 106, 108 are shaped so as to be gripped by the palms of left and right hands of the user or game player when the manual controller 16 is connected to the entertainment apparatus 12 and information retrieval is carried out or the game is played thereby, for example.

As shown in FIG. 3, the left and right grips 106, 108 are progressively spaced away from each other toward their distal ends. To allow the game player to grip the left and right grips 106, 108 comfortably for a long period of time, the left and right grips 106, 108 are tapered from their joint with the housing 104 toward their distal ends, and have arcuate outer peripheral surfaces and arcuate distal end surfaces.

As shown in FIGS. 2 and 3, the first control pad 34 is disposed on one end of the housing 104 and comprises a first pressable control member (up button) 110a, a second pressable control member (right button) 110b, a third pressable control member (down button) 110c, and a fourth pressable control member (left button) 110d. The first through fourth pressable control members 110a, 110b, 110c, 10d project on an upper surface of the housing 104 and are arranged in a crisscross pattern.

The first control pad 34 includes switch elements as signal input elements associated respectively with the first through fourth pressable control members 110a, 110b, 110c, 110d. The first control pad 34 functions as a directional controller for controlling the direction of movement of a displayed game character, for example. When the game player selectively presses the first through fourth pressable control members 110a, 110b, 110c, 10d to turn on or off the switch elements associated with the first through fourth pressable control members 110a, 110b, 110c, 110d, the displayed game character moves in the direction corresponding to the pressed one of the first through fourth pressable control members 110a, 110b, 110c, 110d.

As shown in FIGS. 2 and 3, the second control pad 36 is disposed on the other end of the housing 104 and comprises a first pressable control member (Δ button) 112a, a second pressable control member (□ button) 112b, a third pressable control member (X button) 112c, and a fourth pressable control member (○ button) 112d. The first through fourth pressable control members 112a, 112b, 112c, 112d project on the upper surface of the housing 104 and are arranged in a crisscross pattern.

The first through fourth pressable control members 112a, 112b, 112c, 112d are constructed as independent members, and associated with respective switch elements disposed in the second control pad 36.

The second control pad 36 serves as a function setting/performing unit for setting functions for a displayed game character assigned to the pressable control members 112a–112d or performing functions of a displayed game character when the switch elements associated with the pressable control members 112a–112d are turned on.

Figure 4:
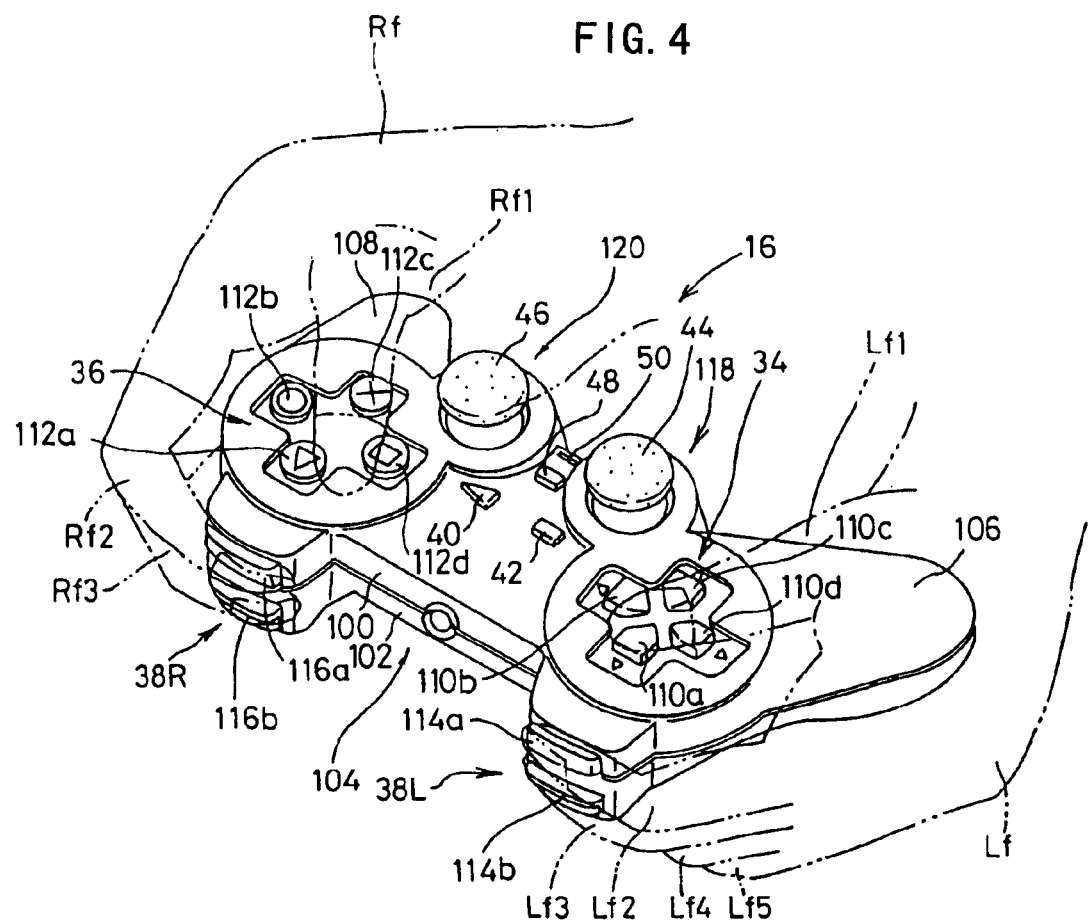
FIG. 4 is a perspective view showing the manner in which the manual controller is used.

The L button 38L and the R button 38R are disposed on a side of the housing 104 remote from the left and right grips 106, 108 and positioned respectively at the opposite ends of the housing 104. As shown in FIGS. 2 and 4, the L button 38L has a first left pressable control member (L1 button) 114a and a second left pressable control member (L2 button) 114b, and the R button 38R has a first right pressable control member (R1 button) 116a and second right pressable control member (R2 button) 116b, respectively.

The L button 38L and the R button 38R have respective switch elements associated respectively with the pressable control members (the L1 button 114a, the L2 button 114b, the R1 button 116a, and the R2 button 116b).

The L button 38L and the R button 38R serve as respective function setting/performing units for setting functions for a displayed game character assigned to the pressable control members 114a, 114b and 116a, 116b or performing functions of a displayed game character when the switch elements associated with the pressable control members 114a, 114b and 116a, 116b are turned on.

As shown in FIGS. 2 and 3, the manual controller 16 also has first and second analog control pads 118, 120 disposed respectively at confronting corners defined between the housing 104 and the proximal ends of the left and right grips 106, 108 which are joined to the housing 104.

The first and second analog control pads 118, 120 have the respective joysticks 44, 46 which can be tilted in all directions (360°) about control shafts thereof, and respective signal input elements such as variable resistors or the like which are operable by the respective joysticks 44, 46. Specifically, the control shafts of the left and right joysticks 44, 46 are normally urged to return to their neutral positions by biasing members. The left and the right joysticks 44, 46 can be freely tilted in all directions (360°) about the axes of the control shafts.

The first and second analog control pads 118, 120 can move a displayed game character while rotating the same or while changing its speed, and can make an analog-like action such as to change the form of a displayed character, when the game player manipulates the joysticks 44, 46. Therefore, the first and second analog control pads 118, 120 are used as a control unit for entering command signals for a displayed character to perform the above movement or action.

When the mode selection switch 48 is pressed, it can select a control mode for allowing a command signal to be inputted from the first and second analog control pads 118, 120 or a control mode for inhibiting a command signal from being inputted from the first and second analog control pads 118, 120.

When the mode selection switch 48 is pressed, the functions of the first through fourth pressable control members 112a, 112b, 112c, 112d of the second control pad 36, and the functions of the pressable control members 114a, 114b and 116a, 116b of the L button 38L and the R button 38R are changed depending on the control mode selected by the pressed mode selection switch 48. Depending on the control mode selected by the mode selection switch 48, the mode indicator 50 flickers and changes its indication light.

As shown in FIG. 4, the left and right grips 106, 108 projecting from the housing 104 are gripped respectively by the palms of the hands of the game player. The housing 104 is not required to be supported by fingers, and the manual controller 16 can be held by the hands while at least six out of the ten fingers of the hands can freely be moved.

As shown in FIG. 4, when the first and second grips 106, 108 are gripped respectively by the palms of the hands of the game player, the thumbs Lf1, Rf1 of the left and right hands can extend over the joysticks 44, 46 of the first and second analog control pads 118, 120, the first through fourth pressable control members 110a–110d of the first control pad 34, and the first through fourth pressable control members 112a–112d of the second control pad 36, and can selectively press the joysticks 44, 46, the pressable control members 110a–110d, and the pressable control members 112a–112d.

Since the joysticks 44, 46 of the first and second analog control pads 118, 120 are positioned in confronting relation to the proximal ends of the left and right grips 106, 108 which are joined to the housing 104, when the left and right grips 106, 108 are gripped by the left and right hands, the joysticks 44, 46 are positioned most closely to the thumbs Lf1, Rf1, respectively. Therefore, the joysticks 44, 46 can easily be manipulated by the thumbs Lf1, Rf1.

As shown in FIG. 4, when the left and right grips 106, 108 are gripped respectively by the palms of the hands of the game player, the index fingers Lf2, Rf2 and middle fingers Lf3, Rf3 of the left and right hands can extend over positions where they can selectively press the L1 button 114a, L2 button 114b of the L button 38L and R1 button 116a, R2 button 116b of the R button 38R.

Figure 5:
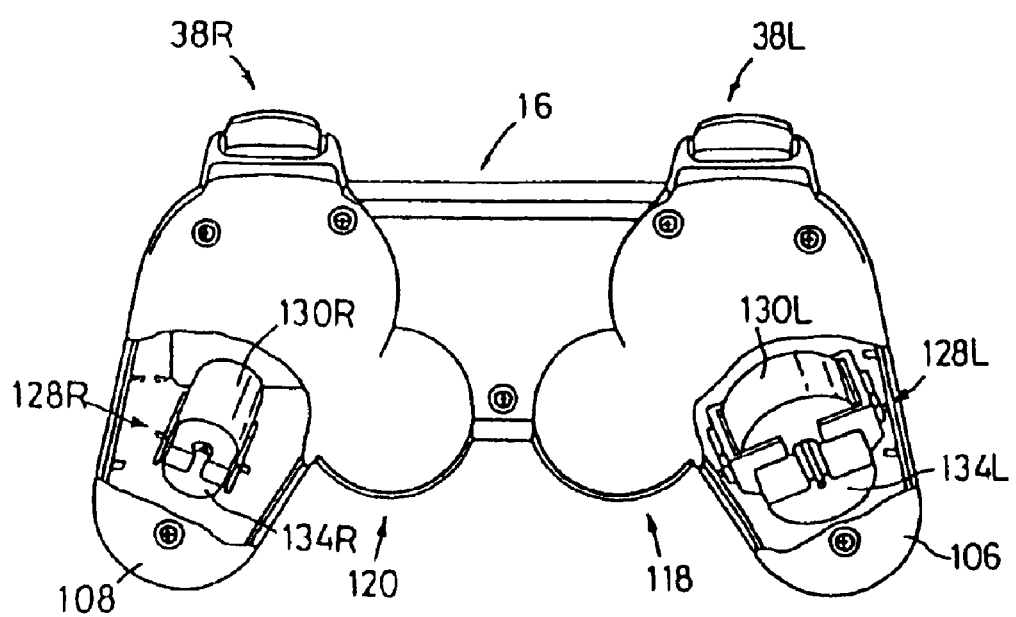
FIG. 5 is a bottom view, partly broken away, of the manual controller, showing vibration imparting mechanisms disposed respectively in left and right grips thereof.

As shown in FIG. 5, the manual controller 16 has a pair of vibration imparting mechanisms 128L, 128R for imparting vibrations to the user in order for the user to be able to play a highly realistic game.

As shown in FIG. 5, the left and right vibration imparting mechanisms 128L, 128R are positioned near the proximal ends of the left and right grips 106, 108 that are held by the hands and fingers when the manual controller 16 is gripped by the user.

Since the both vibration imparting mechanisms 128L, 128R have basically the same structure except their vibration characteristics, only the right vibration imparting mechanism 128R will be described for the purpose of brevity.

The vibration imparting mechanisms 128R comprises a motor 130R energizable by a vibration generating command supplied from the entertainment apparatus 12, and an eccentric member 134R mounted eccentrically on the drive shaft of the motor 130R.

The eccentric member 134R comprises a weight in the form of a heavy metal member having a semicircular cross-sectional shape. The weight has an off-center hole defined therein in which the drive shaft of the motor 130R is fitted.

According to the vibration imparting mechanisms 128L, 128R as constructed above, when the motors 130L, 130R are energized, the drive shafts thereof rotate to cause the eccentric members 134L, 134R to rotate in an eccentric motion for thereby generating vibrations, which are imparted to the left grip 106 and the right grip 108. Then, the vibrations of the left grip 106 and the right grip 108 are applied to the hands and fingers of the user.

Next, the vibration characteristics of the vibration imparting mechanisms 128L, 128R disposed in the left grip 106 and the right grip 108 respectively will be described hereinbelow.

The vibration imparting mechanisms 128L, 128R have the different vibration characteristics.

For example, the motor 130L of the left vibration imparting mechanism 128L is bigger than the motor 130R of the right vibration mechanism 128R. The rotational speed of the motor 130L varies according to a vibration value included in a vibration generating command transmitted from the entertainment apparatus 12. That is, vibrations having different frequencies can be generated depending on the vibration value. In the present embodiment, the vibration frequency of the motor 130L varies in proportion to the vibration value.

In contrast to the motor 130L of the left vibration mechanism 128L, the vibration frequency of the motor 130R of the right vibration mechanism 128R does not vary according to the vibration value included in the vibration generating command. The motor 130R of the right vibration mechanism 128R is simply either energized or de-energized according to the vibration value. If the vibration value (logic value) is "1", the motor 130R of the right vibration mechanism 128R is energized. If the vibration value is "0", the motor 130R of the right vibration mechanism 128R is de-energized. When the motor 130R of the right vibration mechanism 128R is energized, it rotates at a constant speed to generate vibrations at a constant frequency.

In order to energize the motors 130L, 130R to vibrate the manual controller 16 in its entirety, a bidirectional communication function needs to be provided between the manual controller 16 and the entertainment apparatus 12. This bidirectional communication function will be described later on.

Figure 6:
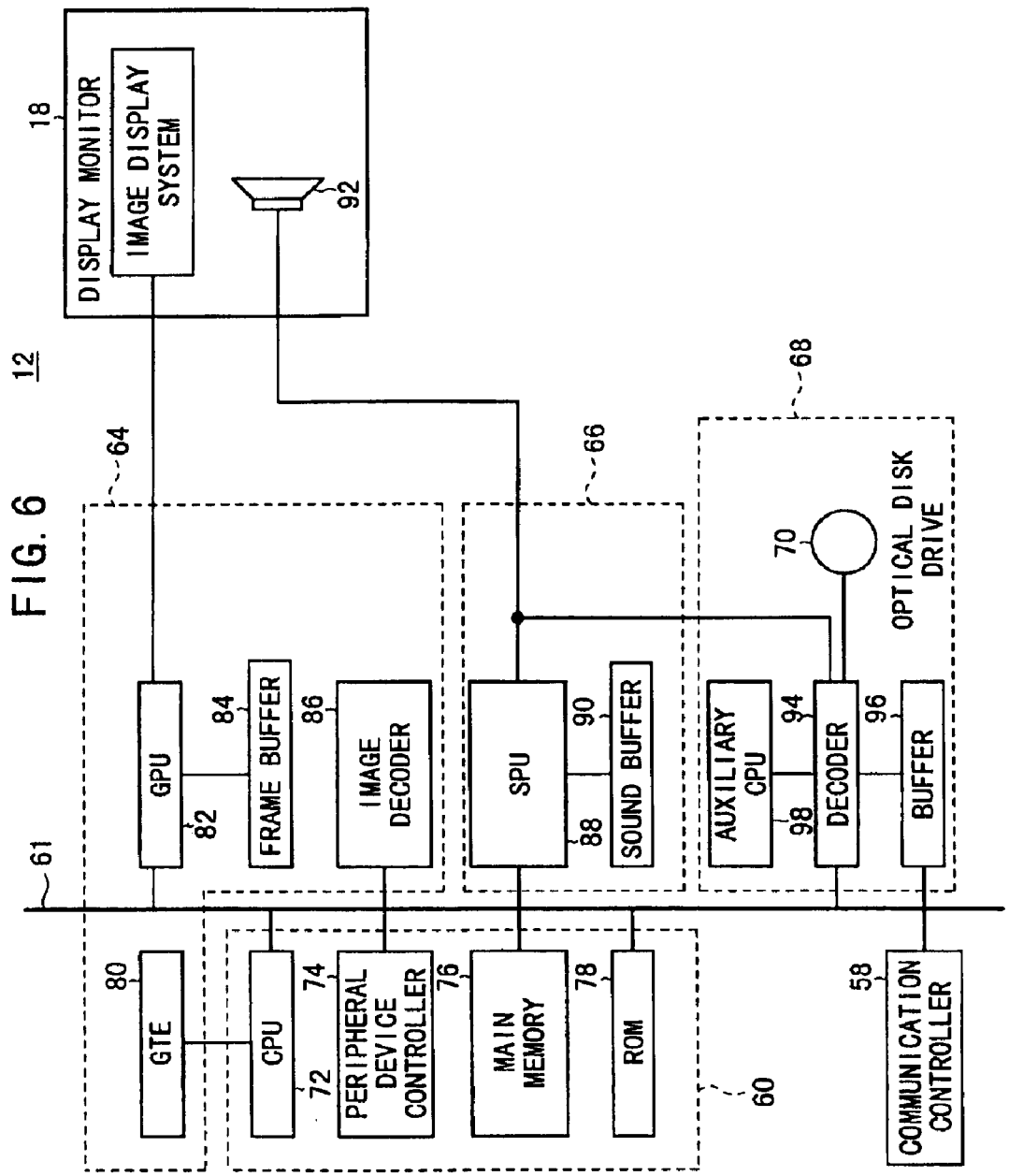
FIG. 6 is a block diagram of a circuit arrangement of an entertainment apparatus.

Now, circuit arrangements of the entertainment apparatus 12 and the manual controller 16 will be described below with reference to FIGS. 6 through 8.

Figure 8:
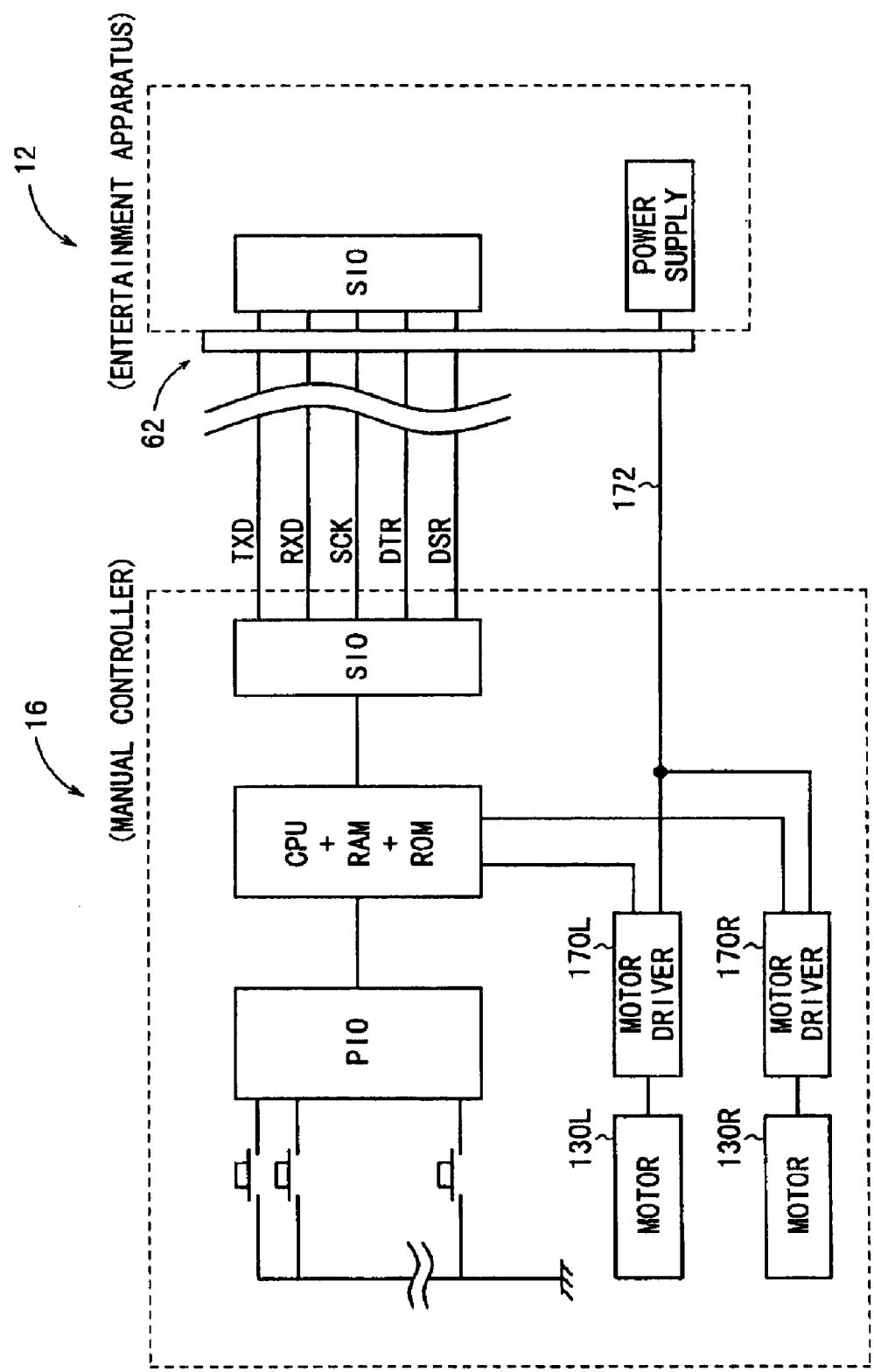
FIG. 8 is a block diagram of components for carrying out bidirectional serial communications between the manual controller and the entertainment apparatus.

As shown in FIG. 8, the entertainment apparatus 12 generally comprises a control system 60, a graphic generating system 64 connected to the control system 60 via a system bus 61, a sound generating system 66 connected to the control system 60 via the system bus 61, and an optical disk control system 68 connected to the control system 60 via the system bus 61. A communication controller 58 for controlling data to be inputted to and outputted from the manual controller 16 and the memory card 14 is also connected to the control system 60 via the system bus 61.

The manual controller 16 supplies commands (including control data) from the user via a communication controller 150 (see FIG. 7) of the manual controller 16 and the communication controller 58 to the entertainment apparatus 12. The optical disk control system 68 includes an optical disk drive 70 in which the optical disk 20, which may comprise a CD-ROM or the like as a specific example of a recording medium according to the present invention.

The control system 60 controls motions of characters displayed on the monitor 18 based on a program and data read from the optical disk 20 and commands supplied from the manual controller 16.

The control system 60 includes a central processing unit (CPU) 72, a peripheral device controller 74 for controlling interrupts and direct memory access (DMA) data transfer, a main memory 76 comprising a random-access memory (RAM), and a read-only memory (ROM) 78 which stores various programs such as an operating system for managing the graphic generating system 64, the sound generating system 66, etc. The main memory 76 can store at least a game program that is supplied from the optical disk 20 and executed by the central processing unit 72.

The CPU 72 controls the entertainment apparatus 12 in its entirety by executing the operating system stored in the ROM 78. The CPU 72 comprises a 32-bit RISC-CPU, for example.

When the entertainment apparatus 12 is turned on, the CPU 72 executes the operating system stored in the ROM 78 to start controlling the graphic generating system 64, the sound generating system 66, etc.

When the operating system is executed, the CPU 72 initializes the entertainment apparatus 12 in its entirety for confirming its operation, and thereafter controls the optical disc control system 68 to execute an application program such as a game program recorded in the optical disk 20.

As the application program such as a game program is executed, the CPU 72 controls the graphic generating system 64, the sound generating system 66, etc. depending on commands entered from the user for thereby controlling the display of images and the generation of music sounds and sound effects.

The graphic generating system 64 comprises a geometry transfer engine (GTE) 80 for performing coordinate transformations and other processing, a graphic processing unit (GPU) 82 for rendering image data according to instructions from the CPU 72, a frame buffer 84 for storing image data rendered by the GPU 82, and an image decoder 86 for decoding image data compressed and encoded by an orthogonal transform such as a discrete cosine transform.

The GTE 80 has a parallel arithmetic mechanism for performing a plurality of arithmetic operations parallel to each other, and can perform coordinate transformations and light source calculations, and calculate matrixes or vectors at a high speed in response to a request from the CPU 72.

Specifically, the GTE 80 can calculate the coordinates of a maximum of 1.5 million polygons per second for a flat shading process to plot one triangular polygon with one color, for example. With the GTE 80, the entertainment apparatus 12 is able to reduce the burden on the CPU 72 and perform high-speed coordinate calculations.

According to an image generating instruction from the CPU 72, the GPU 82 generates and stores the data of a polygon or the like in the frame buffer 84. The GPU 82 is capable of generating and storing a maximum of 360 thousand polygons per second.

The frame buffer 84 comprises a dual-port RAM, and is capable of simultaneously storing image data generated by the GPU 82 or image data transferred from the main memory 86, and reading image data for display. The frame buffer 84 has a storage capacity of 1 Mbytes, for example, and is handled as a 16-bit matrix made up of a horizontal row of 1024 pixels and a vertical column of 512 pixels.

The frame buffer 84 has a display area for storing image data to be outputted as video output data, a CLUT (color look-up table) area for storing a color look-up table which will be referred to by the GPU 82 when it renders a polygon or the like, and a texture area for storing texture data to be subjected to coordinate transformations when a polygon is generated and mapped onto a polygon generated by the GPU 82. The CLUT area and the texture area are dynamically varied as the display area is varied.

The GPU 82 can perform, in addition to the flat shading process, a Gouraud shading process for determining colors in polygons by interpolating intensities from the vertices of the polygons, and a texture mapping process for mapping textures stored in the texture area onto polygons. For performing the Gouraud shading process or texture mapping process, the GTE 80 can perform coordinate calculations for a maximum of about 500,000 polygons per second.

The image decoder 86 is controlled by the CPU 72 to decode image data of a still or moving image stored in the main memory 76, and store the decoded image into the main memory 76.

Image data reproduced by the image decoder 86 is transferred to the frame buffer 84 by the GPU 82, and can be used as a background for an image plotted by the GPU 82. The sound generating system 66 comprises a sound processing unit (SPU) 88 for generating music sounds, sound effects, etc. based on instructions from the CPU 72, and a sound buffer 90 for storing music sounds, sound effects, etc. generated by the SPU 88. Audio signals representing music sounds, sound effects, etc. generated by the SPU 88 are supplied to audio terminals of the monitor 18. The monitor 18 has a speaker 92 which radiates music sounds, sound effects, etc. generated by the SPU 88 based on the supplied audio signals.

The SPU 88 has an ADPCM. (adaptive differential PCM) function for reproducing 16-bit sound data which has been encoded as 4-bit differential sound data by ADPCM, a reproducing function for reproducing waveform data stored in the sound buffer 90 to generate sound effects, etc., and a modulating function for modulating and reproducing the waveform data stored in the sound buffer 90.

The sound system 66 with these functions can be used as a sampling sound source which generates music sounds, sound effects, etc. based on the waveform data stored in the sound buffer 90 according to instructions from the CPU 72.

The optical disk control system 68 comprises an optical disk drive 70 for reproducing application programs and data recorded on the optical disk 20, a decoder 94 for decoding programs and data that are recorded with an error correcting code added thereto, and a buffer 96 for temporarily storing data read from the optical disk drive 70 so as to allow the data from the optical disk 20 to be read at a high speed. An auxiliary CPU 98 is connected to the decoder 94.

Sound data recorded on the optical disk 20 which is read by the optical disk drive 70 includes PCM data converted from audio signals, in addition to the ADPCM data.

The ADPCM data, which is recorded as 4-bit differential data of 16-bit digital data, is decoded by the decoder 94, supplied to the SPU 88, converted thereby into audio signals, and applied to drive the speaker 92.

The PCM data, which is recorded as 16-bit digital data, is decoded by the decoder 94 and then applied to drive the speaker 92.

Figure 7:
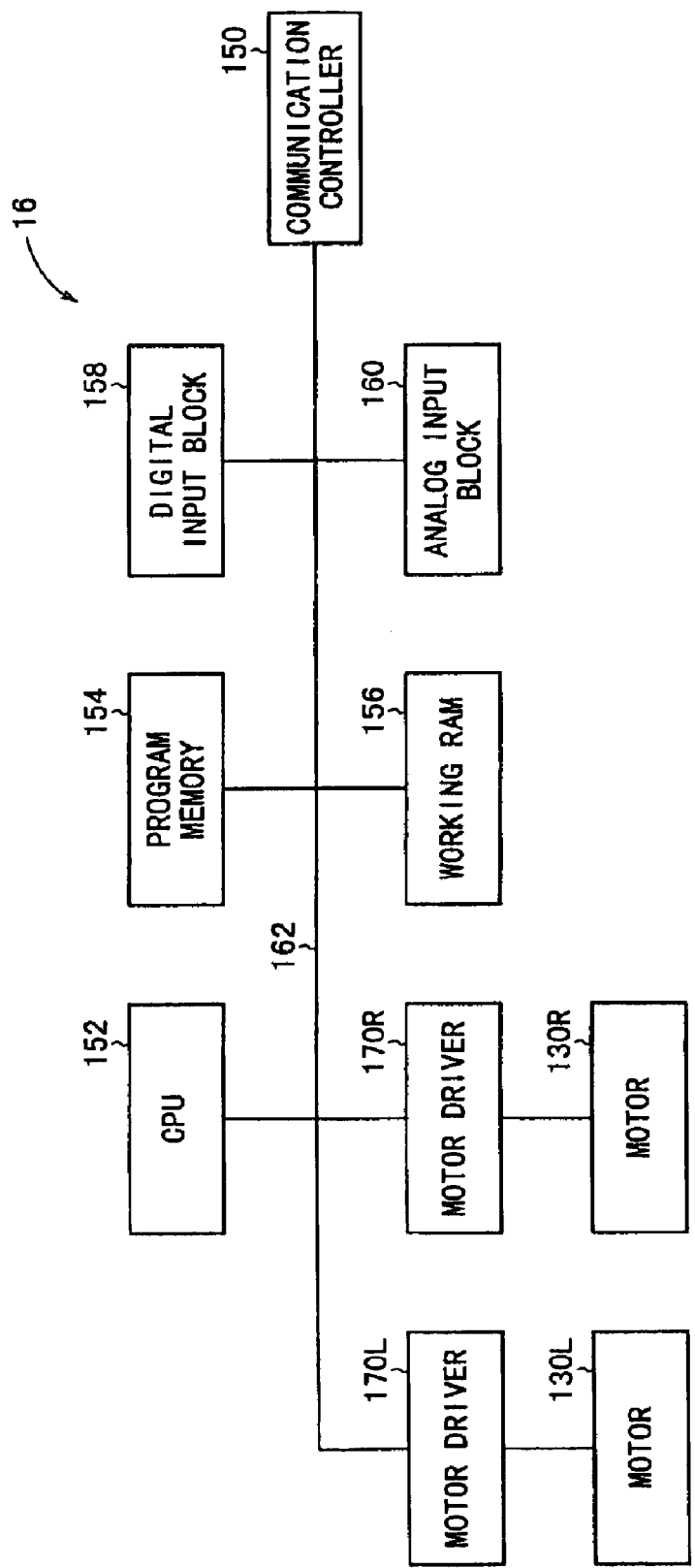
FIG. 7 is a block diagram of the manual controller.

As shown in FIG. 7, the manual controller 16 comprises a communication controller 150, a CPU 152, a program memory 154, a working RAM 156, a digital input block 158, an analog input block 160, a left motor driver 170L for energizing the left motor 130L, and a right motor driver 170R for energizing the right motor 130R. These components of the manual controller 16 are connected to a bus 162.

The digital input block 158 functions as a manual input controller for the pressable control members 110a–110d of the first control pad 34 and the pressable control members 112a–112d of the second control pad 36. The analog input block 160 functions as a manual input controller for the left and right joysticks 44, 46. The digital input block 158 and the analog input block 160 allow the user to enter various items of information into the manual controller 16.

The communication controller 150 has a function to effect serial communications with an external device. The communication controller 150 is electrically connectable to the communication controller 58 (see FIG. 6) of the entertainment apparatus 12, for example, for data communications with the entertainment apparatus 12.

As shown in FIG. 8, the bidirectional communication function between the entertainment apparatus 12 and the manual controller 16 can be performed when the connector 62 capable of performing bidirectional serial communications with the manual controller 16 is connected to the entertainment apparatus 12.

A system in the manual controller 16 for performing the bidirectional communication function comprises a serial I/O interface SIO for performing serial communication with the entertainment apparatus 12, a parallel I/O interface PIO for entering control data from a plurality of control buttons, a one-chip microcomputer comprising a CPU, a RAM, and a ROM, and a pair of motor drivers 170R, 170L for energizing the motors 130R, 130L of the vibration imparting mechanisms 128R, 128L. Each of the motors 130R, 130L is energized by a voltage and a current supplied from the motor drivers 170R, 170L.

A system in the entertainment apparatus 12 for performing the bidirectional communication function comprises a serial I/O interface SIO for performing serial communication with the manual controller 16. When the connector 62 is connected to the serial I/O interface SIO of the entertainment apparatus 12, the serial I/O interface SIO of the entertainment apparatus 12 is connected to the serial I/O interface SIO of the manual controller 16 via the connector 62 for performing bidirectional communications between the entertainment apparatus 12 and the manual controller 16. Other detailed structure of the entertainment apparatus 12 is omitted from illustration in FIG. 8.

Signal and control lines for bidirectional serial communications include a data transfer signal line TXD (Transmit X' for Data) for sending data from the entertainment apparatus 12 to the manual controller 16, a data transfer signal line RXD (Received X' for Data) for sending data from the manual controller 16 to the entertainment apparatus 12, a serial synchronous clock signal line SCK (Serial Clock) for extracting data from the data transfer signal lines TXD, RXD, a control line DTR (Data Terminal Ready) for establishing and cutting off communication with the manual controller 16 as a terminal, and a flow control line DSR (Data Set Ready) for transferring a large amount of data.

As shown in FIG. 8, the signal and control lines for bidirectional serial communication are accommodated in a cable. This cable further includes a power line 172 extending from a power supply in the entertainment apparatus 12 and connected to the motor drivers 170R, 170L in the manual controller 16 for supply electric energy to energize the motors 130R, 130L.

A process of bidirectional serial communication between the entertainment apparatus 12 and the manual controller 16 will be described below. In order for the entertainment apparatus 12 to communicate with the manual controller 16 to read control data from the digital input block 158 and the analog input block 160, the entertainment apparatus 12 first outputs selection data to the control line DTR. As a result, the manual controller 16 confirms that it is selected by the control line DTR, and then waits for a signal from the signal line TXD. Then, the entertainment apparatus 12 outputs an identification code indicative of the manual controller 16 to the data transfer signal line TXD. The manual controller 16 receives the identification code from the signal line TXD.

When the manual controller 16 recognizes the identification code, the manual controller 16 starts communicating with the entertainment apparatus 12. The entertainment apparatus 12 sends control data via the data transfer signal line TXD to the manual controller 16, which sends control data from the digital input block 158 and the analog input block 160 via the data transfer signal line RXD to the entertainment apparatus 12. In this manner, the entertainment apparatus 12 and the manual controller 16 perform bidirectional serial communications. The bidirectional serial communications will be finished when the entertainment apparatus 12 outputs selection stop data via the control line DTR.

With the bidirectional serial communication function, the manual controller 16 can send mainly control data from the digital input block 158 and the analog input block 160 to the entertainment apparatus 12, and the entertainment apparatus 12 can send vibration generating commands for energizing the motors 130R, 130L of the vibration imparting mechanisms 128R, 128L via the data transfer signal line TXD to the manual controller 16.

The vibration generating commands for energizing the motors 130R, 130L include those which have been established in advance in the optical disk 20 set in the entertainment apparatus 12 and those which are newly generated in the entertainment apparatus 12.

A characteristic function of the entertainment system 10 according to the present embodiment will be described below with reference to FIGS. 9 through 80.

The characteristic function of the entertainment system 10 comprises a function (music editing function) for assigning an arbitrary sound pattern selected from a plurality of sound patterns each composed of a combination of sounds to at least one track based on a manual control input of a user, and a function (sound presentation trial processing function) for outputting the sound pattern assigned to the track when the manual control input of the user satisfies a predetermined condition.

Specifically, according to the music editing trial processing function, a plurality of sound patterns composed of a combination of desired sounds are displayed as respective symbol images on the display monitor 18, and when at least one of tracks displayed on the display monitor 18 is selected and one of the symbol images is selected, one of the sound patterns which corresponds to the selected symbol image is registered in the selected track.

Figure 28:
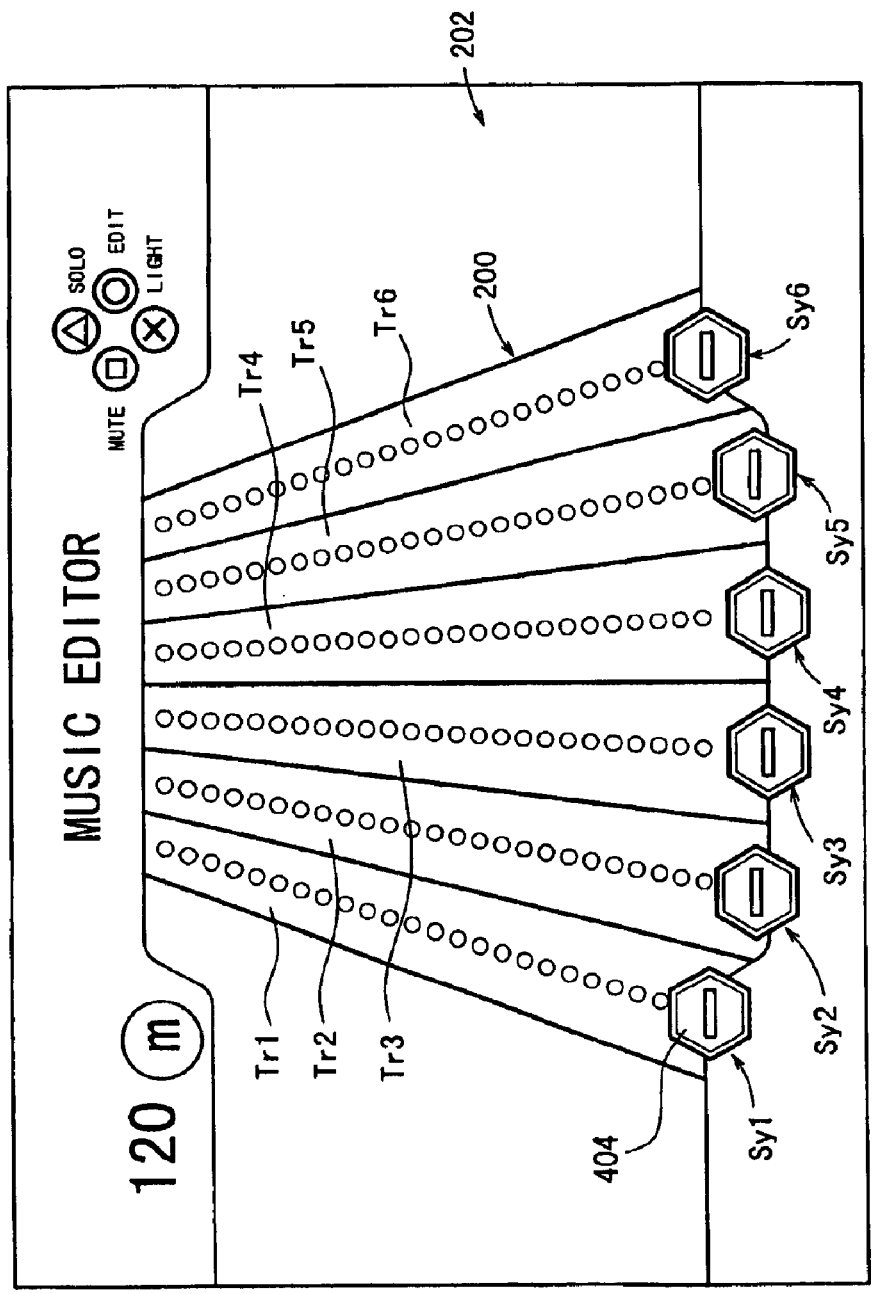
FIG. 28 is a view showing a setting view displayed on a display monitor.
Figure 29:
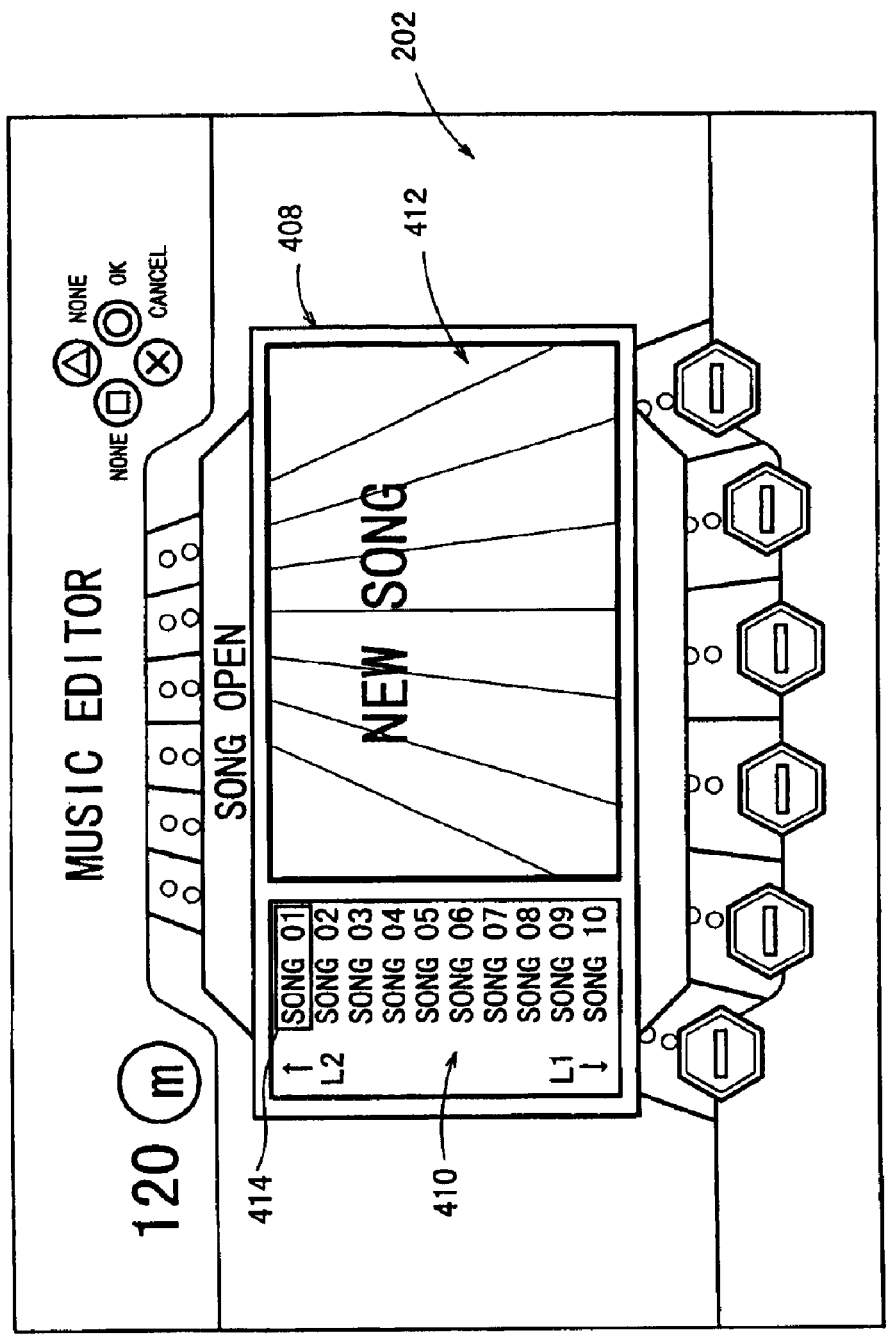
FIG. 29 is a view showing a music number selection view as a window view.

For example, as shown in FIG. 28, a setting view 202 having a track group 200 of six straight tracks Tr1–Tr6 is displayed, and respective sound patterns are registered in the tracks Tr1–Tr6, respectively. When the sound patterns are outputted in synchronism with each other at a preset tempo, the user enjoys a piece of music based on a combination of these outputted sound patterns.

If the above function is performed as a video game, then a number of sound patterns are prepared for each of nine countries, for example. For registering sound patterns in the tracks Tr1–Tr6, the user selects a country and then selects a desired sound pattern from the sound patterns set for the selected country. The user can combine sound patterns of a number of countries with one piece of music, amplifying the fun of playing the video game and also the fun of composing music.

When a sound pattern is outputted, the vibration imparting mechanisms 128L, 128R of the manual controller 16 may be actuated to produce vibrations in synchronism with the outputted sound pattern to make the video game highly realistic.

According to the sound presentation trial processing function, a relatively moving object 1200 (see FIG. 50) is displayed on at least one track displayed on the display monitor 18, and the user tries to acquire the object 1200 with a control input entered by the user. When the acquisition of the object 1200 with the control input is detected, a sound assigned to the track on which the object 1200 has relatively moved is outputted.

Figure 49:
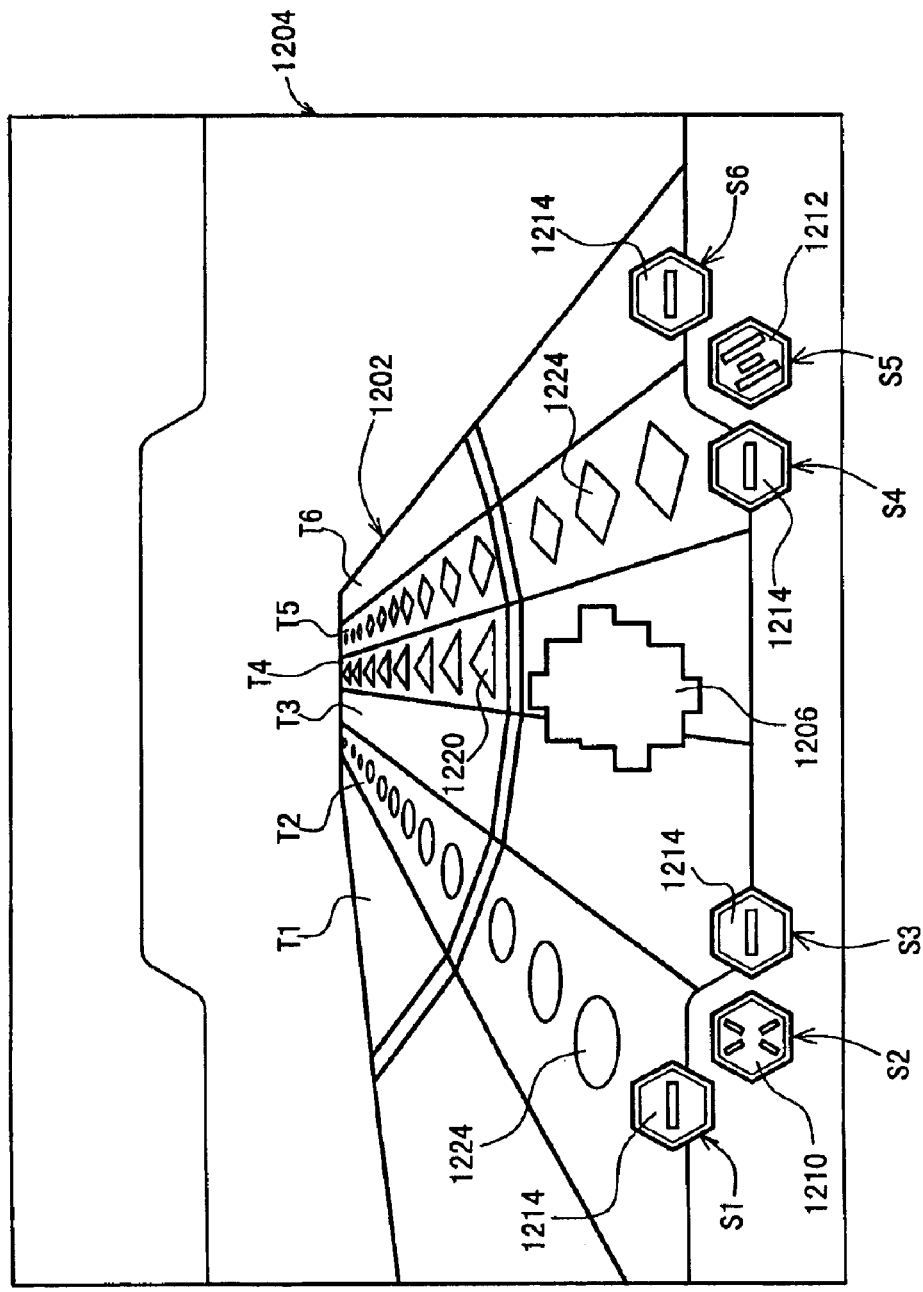
FIG. 49 is a view showing a trial view which displays an acquiring object, with an indicator image displayed indicating the coming of an object on a fourth track.

For example, as shown in FIG. 49, a trial view 1204 simulating an expressway of a track group 1202 of six straight tracks T1–T6 is displayed, and an acquiring object 1206 for acquiring the object 1200 is displayed in the foreground in the trial view 1204. At this time, the acquiring object 1206 is displayed as if moving at a high speed on one of the tracks, e.g., the fourth track T4 in FIG. 49.

The trial view 1204 includes six symbol display areas S1–S6 displayed in lower left and right regions thereof in association with the respective tracks T1–T6. For example, with respect to the tracks T2, T5 where the object 1200 has been acquired, symbol images 1210, 1212 of sound patterns assigned to the respective tracks T2, T5 are displayed in the symbol display areas S2, S5 associated with the tracks T2, T5. With respect to the tracks T1, T3, T4, T6 where the object 1200 has not been acquired, symbol images (initial symbol images) 1214 of "-", for example, indicating that the object 1200 has not been acquired are displayed in the symbol display areas S1, S3, S4, S6 associated with the tracks T1, T3, T4, T6.

In the example shown in FIG. 49, the initial symbol images 1214 are displayed in association with the respective first, third, fourth, and sixth tracks T1, T3, T4, T6 from the left. The symbol image 1210 indicative of the assignment of a percussion sound pattern is displayed in association with the second track T2 from the left, and the symbol image 1212 indicative of the assignment of a melody/harmony sound pattern is displayed in association with the fifth track T5 from the left.

Figure 50:
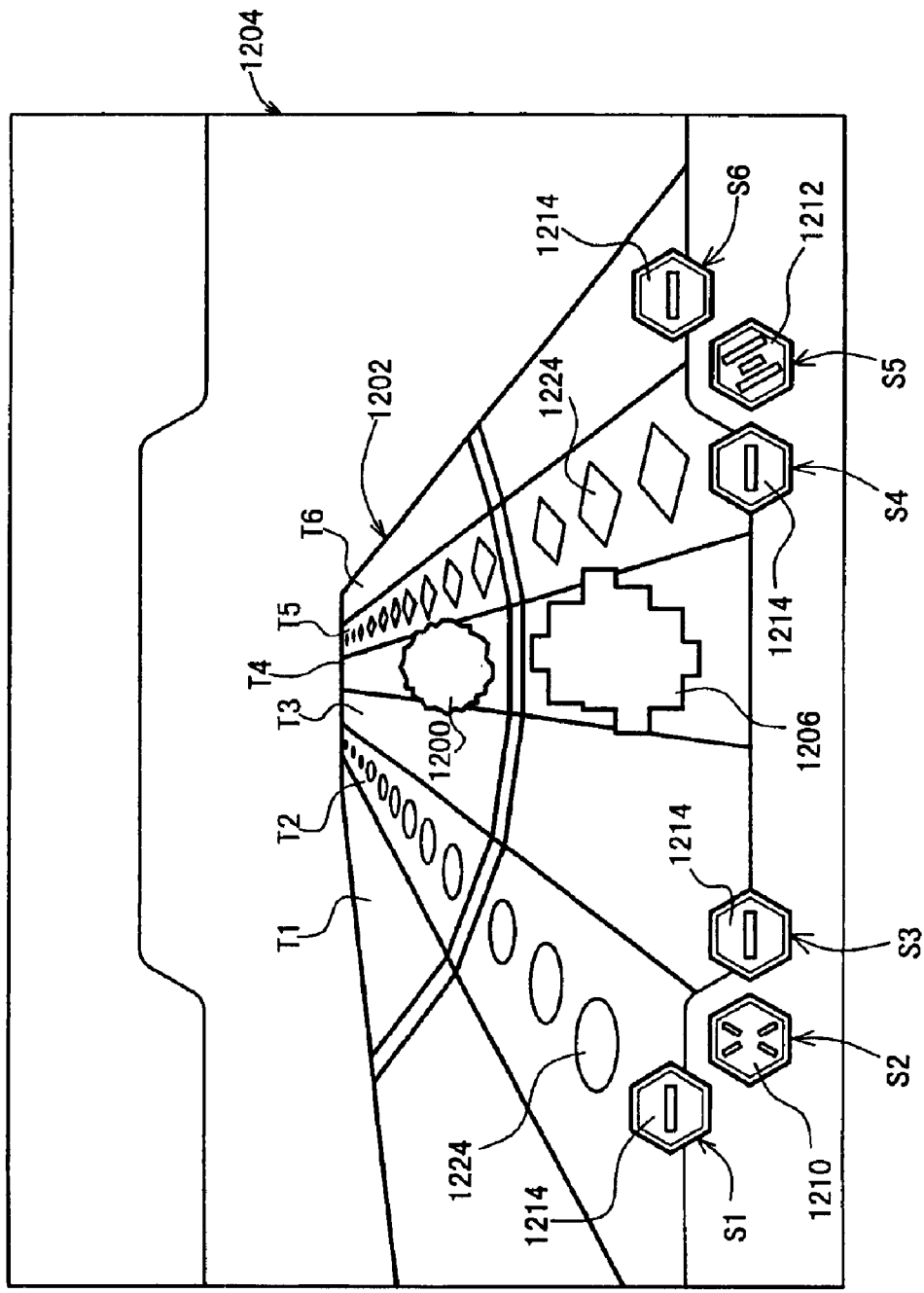
FIG. 50 is a view showing the trial view indicating the coming of the object on the fourth track.

Then, an indicator image 1220 of an array of triangles is displayed on a track where the object 1200 is coming, i.e., the fourth track T4. Thereafter, as shown in FIG. 50, the object 1200 appears on the track T4.

By positioning the acquiring object 1206 on the track, i.e., the fourth track T4, where the indicator image 1220 is displayed, the acquiring object 1206 is going to hit the object 1200 positioned on the track T4. Stated otherwise, the object 1200 positioned on the track T4 relatively moves with respect to the acquiring object 1206, i.e., moves toward the acquiring object 1206.

Figure 51:
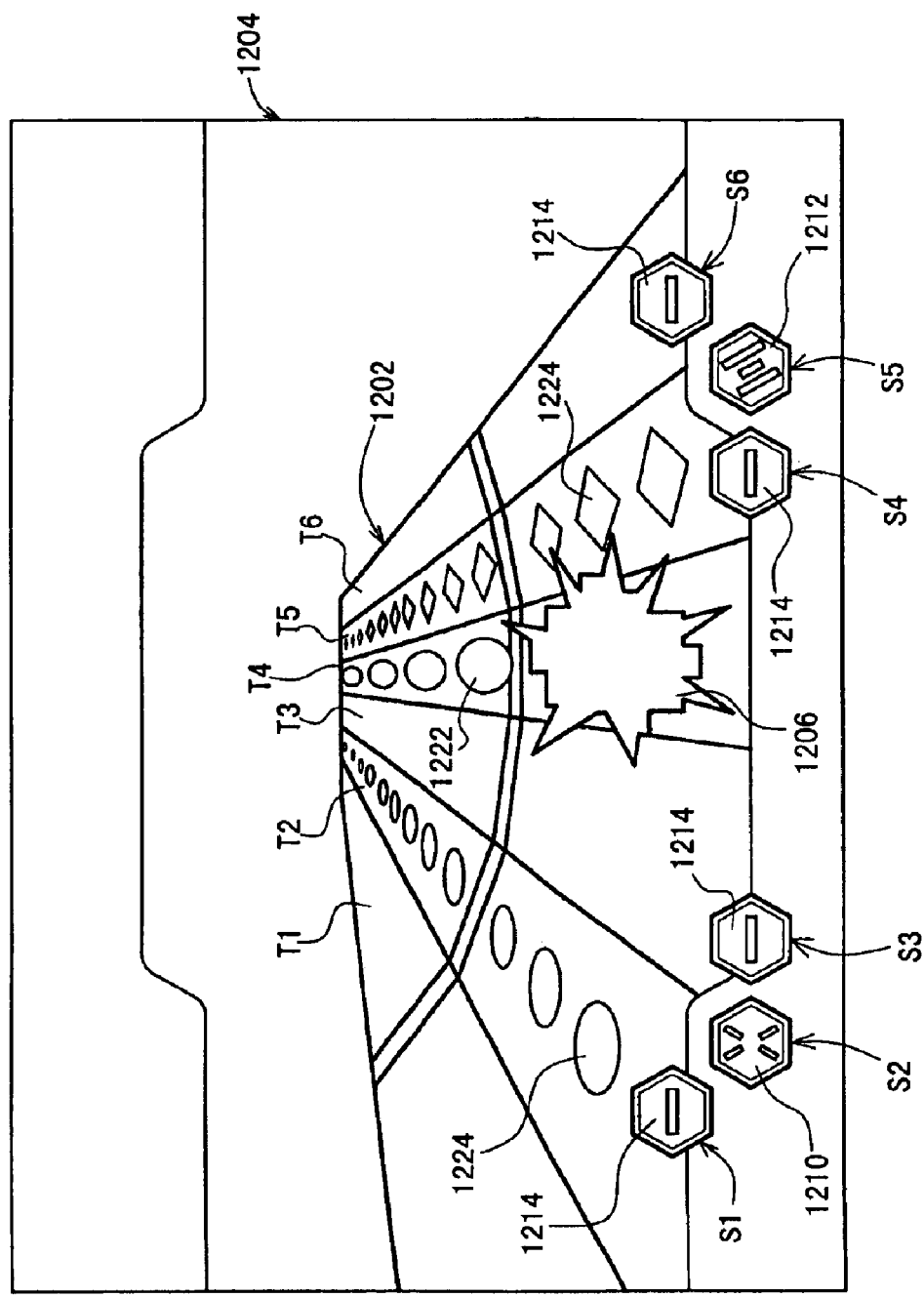
FIG. 51 is a view showing the trial view indicating the acquisition by the acquiring object of the object on the fourth track.

As shown in FIG. 51, when the distance between the acquiring object 1206 and the object 1200 relatively moving thereto falls in a predetermined range, the user presses the control member 112d, functioning as a decision button, to acquire the object 1200.

Different sound patterns are assigned respectively to the tracks T1–T6. When the object 1200 is acquired, the sound pattern assigned to the corresponding track T4 is selected. At this time, of the six displayed symbol images, the symbol image associated with the track T4 where the object 1200 is acquired changes from the initial symbol image 1214 to the symbol image indicative of the sound pattern assigned to the track T4, i.e., the symbol image 1212 indicative of the chord music instrument.

The actual sound pattern is outputted when at least one light spot 1222 that appears following the object 1200 is acquired, as shown in FIG. 51. The light spot 1222 can be acquired by positioning the acquiring object 1206 on the track T4 where the object 1200 is presently acquired. When acquired by the acquiring object 1206, the light spot 1222 changes to a mark image 1224 (see the tracks T2, T5) which is of an elliptical or lozenge shape.

After the sound pattern has been outputted for one track, the user moves the acquiring object 1206 to another track. In this manner, a maximum of six sound patterns can be outputted. These sound patterns are synchronously outputted to complete a piece of music.

At this stage, an evaluation is made. The evaluation is based on the accumulation of distances between the acquiring object 1206 and objects 1200 relatively moving with respect to the acquiring object 1206 at the time a certain control input is entered. The evaluation is higher as the accumulated value of distances is smaller. The evaluation is displayed on the display monitor 18.

At the same time that the evaluation is displayed, an image of the track group 1202 seen from above may be displayed on the display monitor 18. Depending on the evaluation, the color of the acquiring object 1206 may be changed from green to yellow to red to gray, for example.

Figure 52:
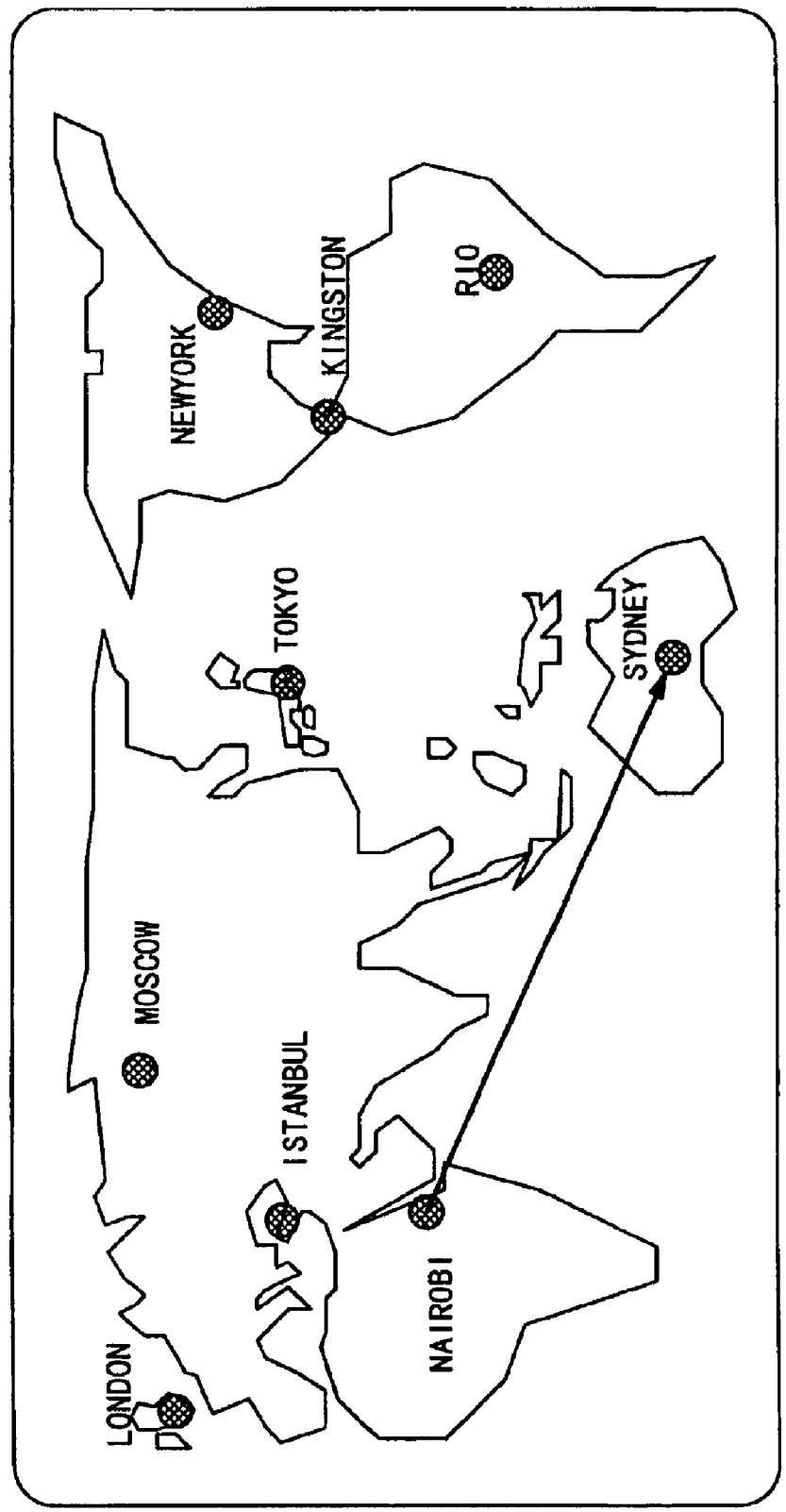
FIG. 52 is a view showing the layout of terminals of various countries.

If the above function is realized as a video game, then, as shown in FIG. 52, a scenario of such a video game may be created for making a circular tour of terminals in nine countries while enjoying pieces of music inherent in those countries. The video game incorporating the above function is much fun for the user to play.

The video game may be designed such that in the terminal of each of the countries, the user is required to try three tasks, for example, and when the user has completed all the tasks, the user can challenge the next terminal.

The video game is made more enjoyable by displaying an image inherent in the country of the terminal that the user is staying, around the track group 1202 displayed on the display monitor 18. When a sound pattern is outputted, the manual controller 16 may be vibrated by the vibration imparting mechanisms 128L, 128R in synchronism with the sound pattern.

The combination of sound patterns generated by the above-described music editing function can be incorporated in the video game. Therefore, a user can compose music and utilize the composed music for the video game. Accordingly, the user hardly loses interest in the video game.

By executing the sound presentation trial processing function, the music composed by the user is gradually presented. The order of presentations of sound patterns registered in the respective tracks may be different from the order of registrations of sound patterns. That is, the atmosphere of combined sound patterns until a piece of music is completely created by the sound presentation trial processing function may differ from the atmosphere of combined sound patterns when the user composed the music. Accordingly, the user's motivation for composing music is further enhanced.

In addition to the above-described functions, the characteristic function of the entertainment system 10 may comprise an audio data processing function for registering audio data extracted from audio data introduced from an external source as one of the sound patterns.

Specifically, audio data from the optical disk 20 loaded in the optical disk drive 70 of the entertainment apparatus 12 or a network connected to the entertainment apparatus 12 is introduced, and desired audio data is extracted from the introduced audio data and used as the sound pattern or a sound source for the entertainment apparatus 12. In this embodiment, audio data is introduced from a music CD (Compact Disc) loaded in the optical disk drive 70.

One example of software (a music information processing means 3000) for performing the above characteristic function will be described below with reference to FIGS. 9 through 80.

The music information processing means 3000 can be supplied to the entertainment system 10 from a randomly accessible recording medium such as a CD-ROM, the memory card 14, or a network. It is assumed in the present embodiment that the music editing means 300 is read from the optical disk 20 such as a CD-ROM into the entertainment apparatus 12.

The music information processing means 3000 is downloaded in advance from the optical disk 20 played back by the entertainment apparatus 12 into the main memory 76 in the control system 60 thereof according to a predetermined process, and executed by the CPU 72 of the control system 60.

Figure 9:
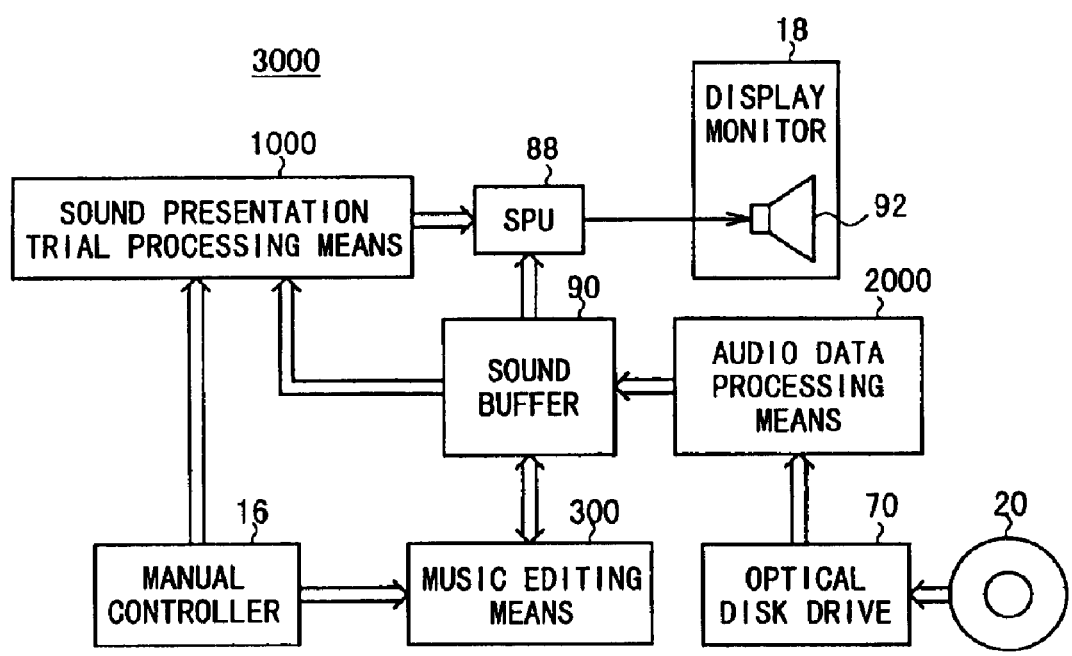
FIG. 9 is a functional block diagram of a music information processing means.

As shown in FIG. 9, the music information processing means 3000 comprises a music editing means 300, a sound presentation trial processing means 1000, and a audio data processing means 2000. The music editing means 300 assigns an arbitrary sound pattern selected from a plurality of sound patterns in the sound buffer 90 to at least one track. The sound presentation trial processing means 1000 outputs the sound pattern assigned to the track when a control input of the user satisfies a predetermined condition. The audio data processing means 2000 registers audio data extracted from audio data introduced from an external source such as a music CD (Compact Disc) loaded in the optical disk drive 70 as one of the sound patterns in a sound pattern file in the sound buffer 90.

The music editing means 300, sound presentation trial processing means 1000, and audio data processing means 2000 constituting the music information processing means 3000 will be described in detail with reference to FIGS. 10 through 80.

Figure 10:
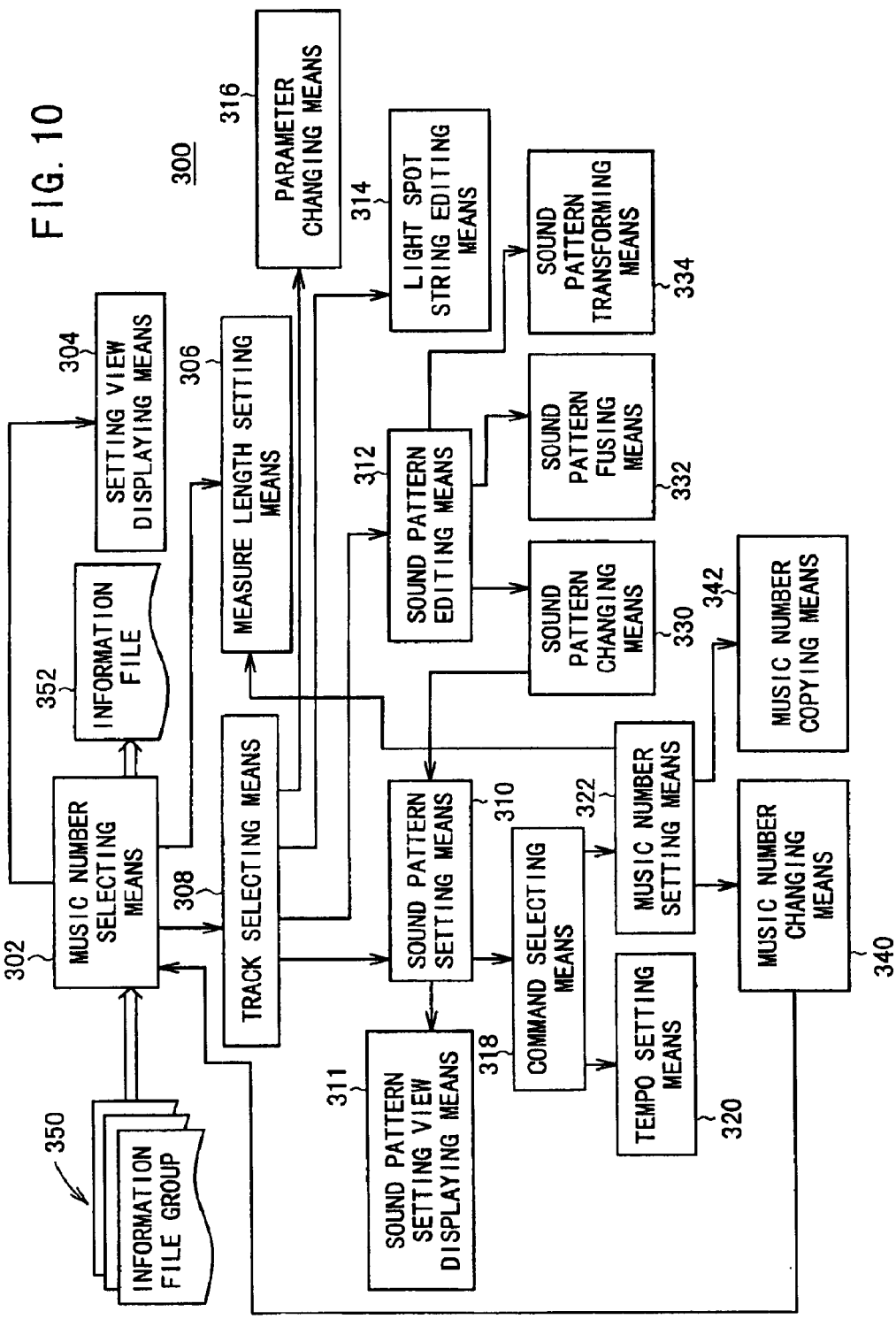
FIG. 10 is a functional block diagram of a music editing means.

As shown in FIG. 10 the music editing means 300 has a music number selecting means 302 for selecting a music number based on a control input from the manual controller 16, a setting view displaying means 304 for displaying a setting view 202 (see FIG. 28) on the display monitor 18, a measure length setting means 306 for setting a measure length for a selected music number, a track selecting means 308 for selecting a track based on a control input from the manual controller 16, a sound pattern setting means 310 for setting a sound pattern to be registered in a selected track, a sound pattern editing means 312 for editing a sound pattern set in a track, a light spot string editing means 314 for editing a light spot string displayed for each of the tracks Tr1–Tr6, a parameter changing means 316 for changing various parameters such as a sound volume, PANPOT, etc., a command selecting means 318 for selecting a command based on a control input from the manual controller 16, a tempo setting means 320 for setting a tempo for a selected music number, and a music number setting means 322 for making various settings for a music number.

The sound pattern setting means 310 has a sound pattern setting view displaying means 311 for displaying a sound pattern setting view 416 (see FIGS. 30 and 31) having a pallet display area 420 which contains a plurality of symbol images. The setting view 202 displayed by the setting view displaying means 304 and the sound pattern setting view 416 jointly make up a single editing view. Therefore, the setting view displaying means 304 and the sound pattern setting view displaying means 311 jointly serve as an editing view displaying means.

The sound pattern editing means 312 has a sound pattern changing means 330 for changing sound patterns, a sound pattern fusing means 332 for fusing a plurality of selected sound patterns, and a sound pattern transforming means 334 for transforming the sound of a sound pattern.

The music number setting means 322 has a music number changing means 340 for changing a selected music number with another music number, a music number copying means 342 for copying a selected music number to a copying destination, and the measure length setting means 306.

Figure 11:
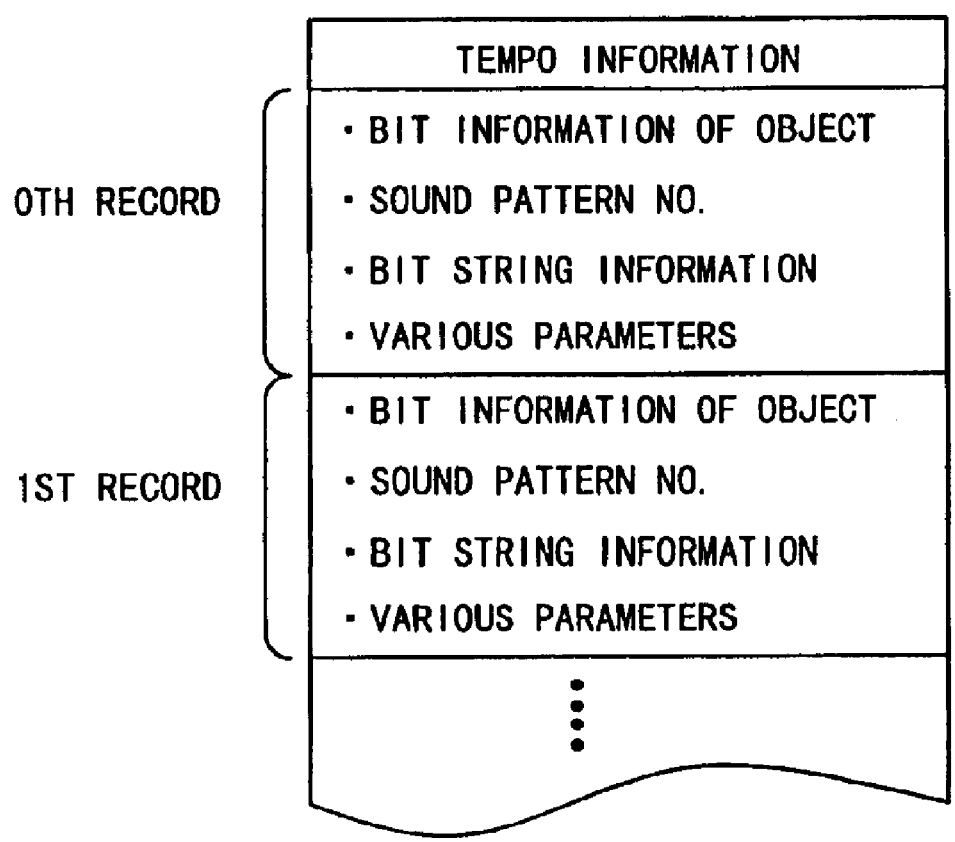
FIG. 11 is a diagram showing details of an information table.

The music editing means 300 reads a necessary information file 352 from an information file group 350 for the user and edits music numbers. The information file group 350 comprises an array of information files 352 for each country. As shown in FIG. 11, each of the information files 352 stores a performance rate (tempo) of sound patterns in its leading end and also stores six records associated with the respective tracks T1–T6. Each of the records stores a sound pattern number, bit string information, various parameters such as a sound volume, PANPOT, etc.

The bit string information is determined by a measure length, and each measure comprises an array of eight bits. Measure lengths include "4", "8", and "16". Therefore, bit strings are set to 4×8=32 bits, 8×8=64 bits, and 16×8=128 bits.

The sound of each sound pattern is outputted repeatedly usually for a time length determined by 128 bits. If a measure length is set to "4", then the sound of each sound pattern is outputted repeatedly for a time length determined by 32 bits, and if a measure length is set to "8", then the sound of each sound pattern is outputted repeatedly for a time length determined by 64 bits.

The information of each bit indicates the outputting or non-outputting of the sound pattern; "1" representing the outputting of the sound pattern and "0" representing the non-outputting of the sound pattern.

The bit information of the object 1200 represents bit information, of the above bit string information, indicative of the appearance of the object 1200. The bit information of the object 1200 comprises the bit numbers of leading ends of respective trains of consecutive bits "1".

Specifically, if the bit train information comprises "1111111100001111110000111 . . . " from LSB to MSB, then the bit information of the object 1200 comprises "0th bit", "13th bit", "24th bit".

The sound pattern number represents the address of an array variable area where a sound pattern, from a sound pattern group stored in the sound buffer 90, is to be outputted.

Figure 12:
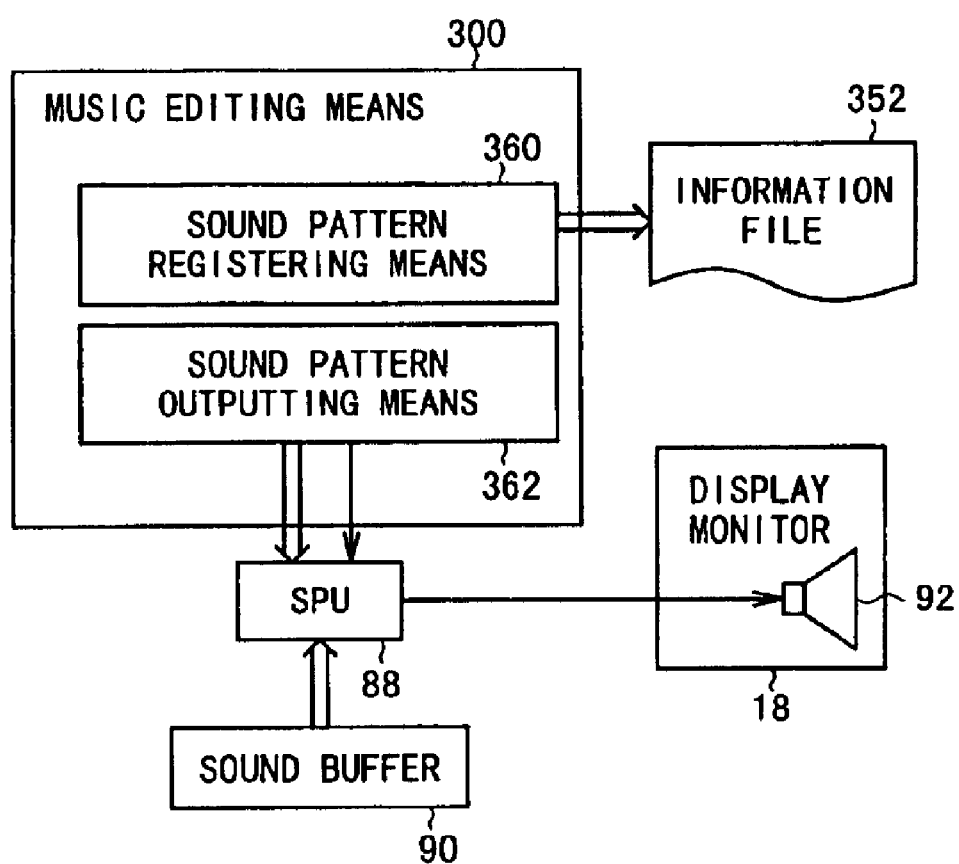
FIG. 12 is a functional block diagram showing the principle of the outputting of sound from the music editing means.

As shown in FIG. 12, the music editing means 300 has a sound pattern registering means 360 for registering tempos, sound patterns, and various parameters which have been set by the above various means in information files 352, and a sound pattern outputting means 362 for outputting the number of a set sound pattern (sound pattern number) to the SPU 88, and controlling the SPU 88 to output the sound of a set sound pattern at a given tempo according to various parameters and the attribute of bit string information.

As shown in FIG. 12, when the SPU 88 receives a sound pattern number delivered from the sound pattern outputting means 362, the SPU 88 reads a sound pattern corresponding to the sound pattern number from the sound buffer 90. Under the control of the sound pattern outputting means 362, the SPU 88 outputs the sound pattern at a rate depending on a preset tempo to the speaker 92 for a period indicated by the bits "1" of the bit string information according to various parameters.

The parameters include a sound volume (VOL), a horizontal sound image position (PAN), a sound pitch (PIT), a periodic horizontal sound displacement period (APN), a delay (DEL), a reverberation (REV), a modulation (MOD), and fade-in/fade-out (FAD).

A processing sequence of the music editing means 300 will be described below with reference to FIGS. 10 and 13 through 47.

Figure 13:
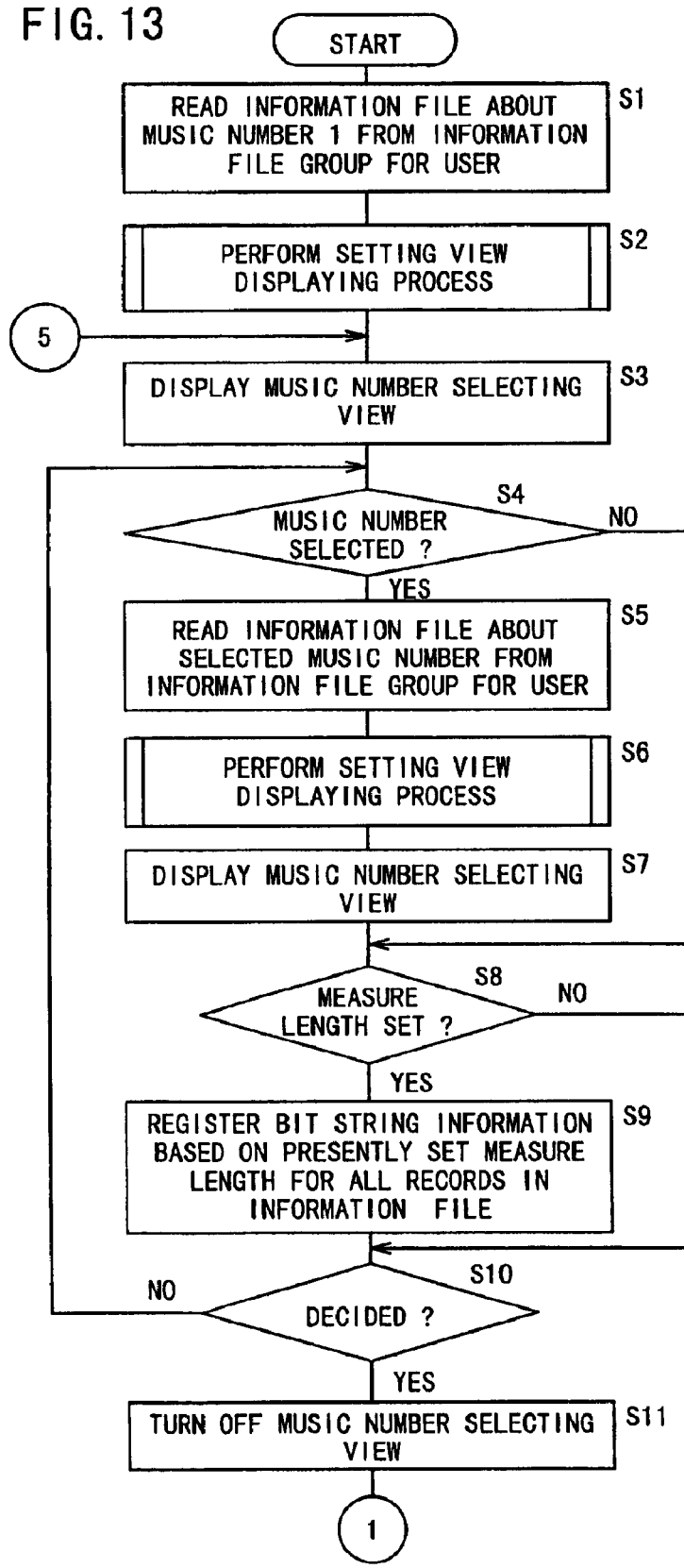
FIGS. 13 through 15 are a flowchart of a processing sequence of the music editing means.

In step S1 shown in FIG. 13, the music number selecting means 302 reads an information file 352 about a music number 1 (SONG01) from the information file group 350 for the user.

Figure 15:
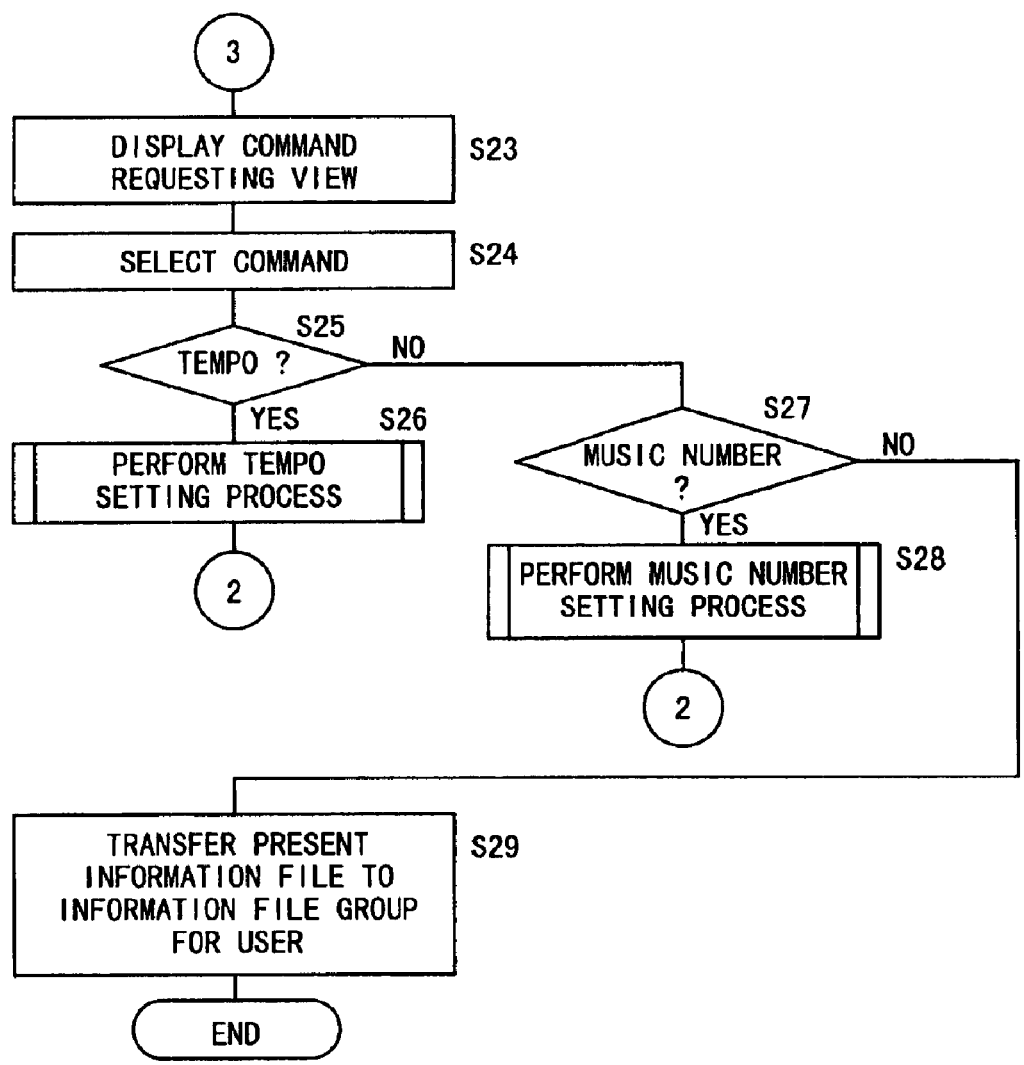

In step S2, the setting view displaying means 304 performs its own processing sequence. The processing sequence of the setting view displaying means 304 is shown in FIG. 15. In step S101 shown in FIG. 16, the setting view displaying means 304 displays a setting view 202 having a track group 200 on the display monitor 18 as shown in FIG. 28.

Figure 32:
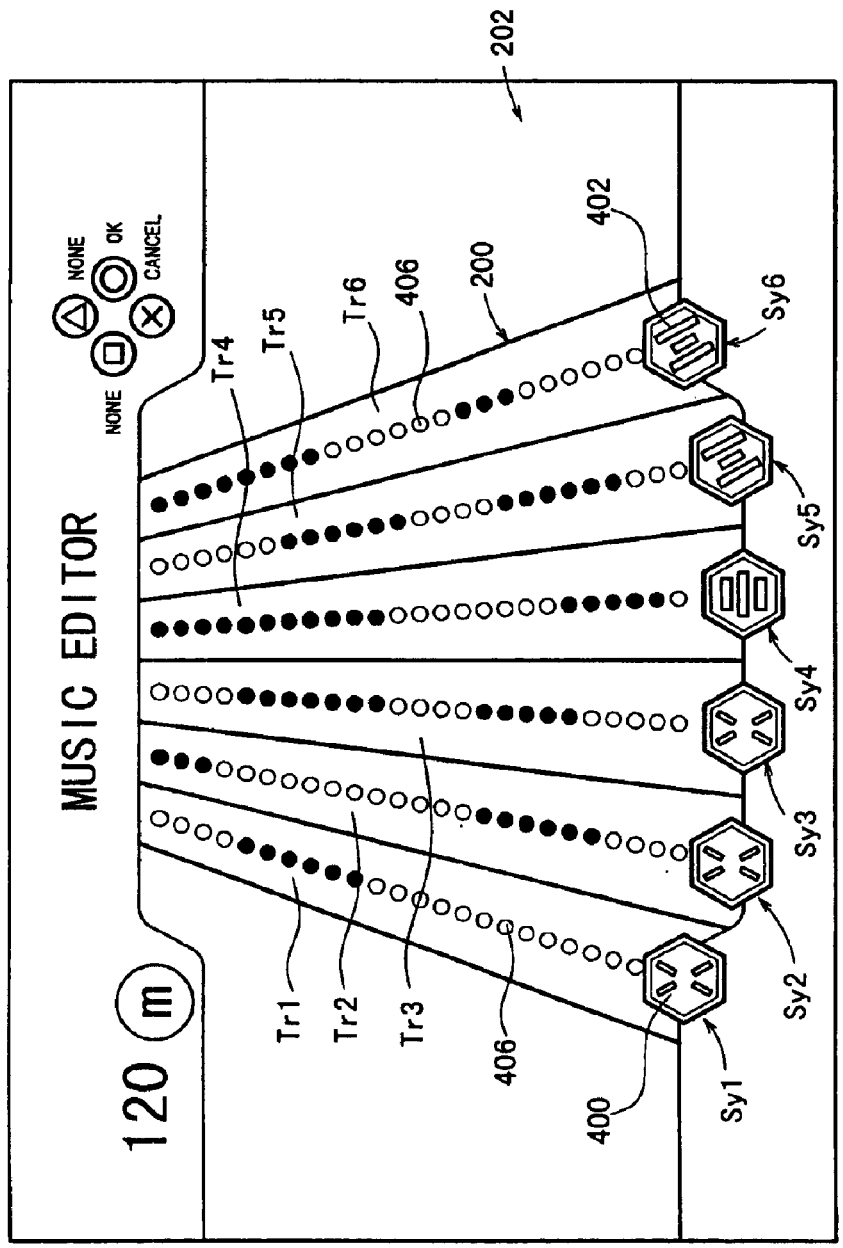
FIG. 32 is a view showing a setting view with sound patterns set for respective tracks.

As shown in FIG. 28, the setting view 202 includes six symbol display areas Sy1–Sy6 displayed in lower left and right regions thereof in association with the respective tracks Tr1–Tr6. Sound patterns of rhythm instruments are registered in the respective first through third tracks Tr1–Tr3, and, as shown in FIG. 32, symbol images 400 indicative of rhythm instruments are displayed in the first through third symbol display areas Sy1–Sy3 when the sound patterns of the rhythm instruments are registered. The symbol images 400 indicative of rhythm instruments include a symbol image indicative of a drum instrument, and a symbol image indicative of a percussion, for example.

Sound patterns of chord instruments are registered in the respective fourth through sixth tracks Tr4–Tr6, and, as shown in FIG. 32, symbol images 402 indicative of chord instruments are displayed in the fourth through six symbol display areas Sy4–Sy6 when the sound patterns of the chord instruments are registered. The symbol images 402 indicative of chord instruments include a symbol image indicative of a melody/harmony, and a symbol image indicative of a base instrument, for example.

The symbol images also include a symbol image indicative of a sound pattern prepared by the user, other than the symbol images 400, 402.

As shown in FIG. 28, symbol images 404 of "-" (initial symbol images) are displayed in the symbol display areas Sy1–Sy6 that correspond to tracks where no sound patterns have been registered yet.

In step S101 shown in FIG. 28, the setting view displaying means 304 displays the track group 200 and initial symbol images 404 in the respective symbol display areas Sy1–Sy6.

Figure 16:
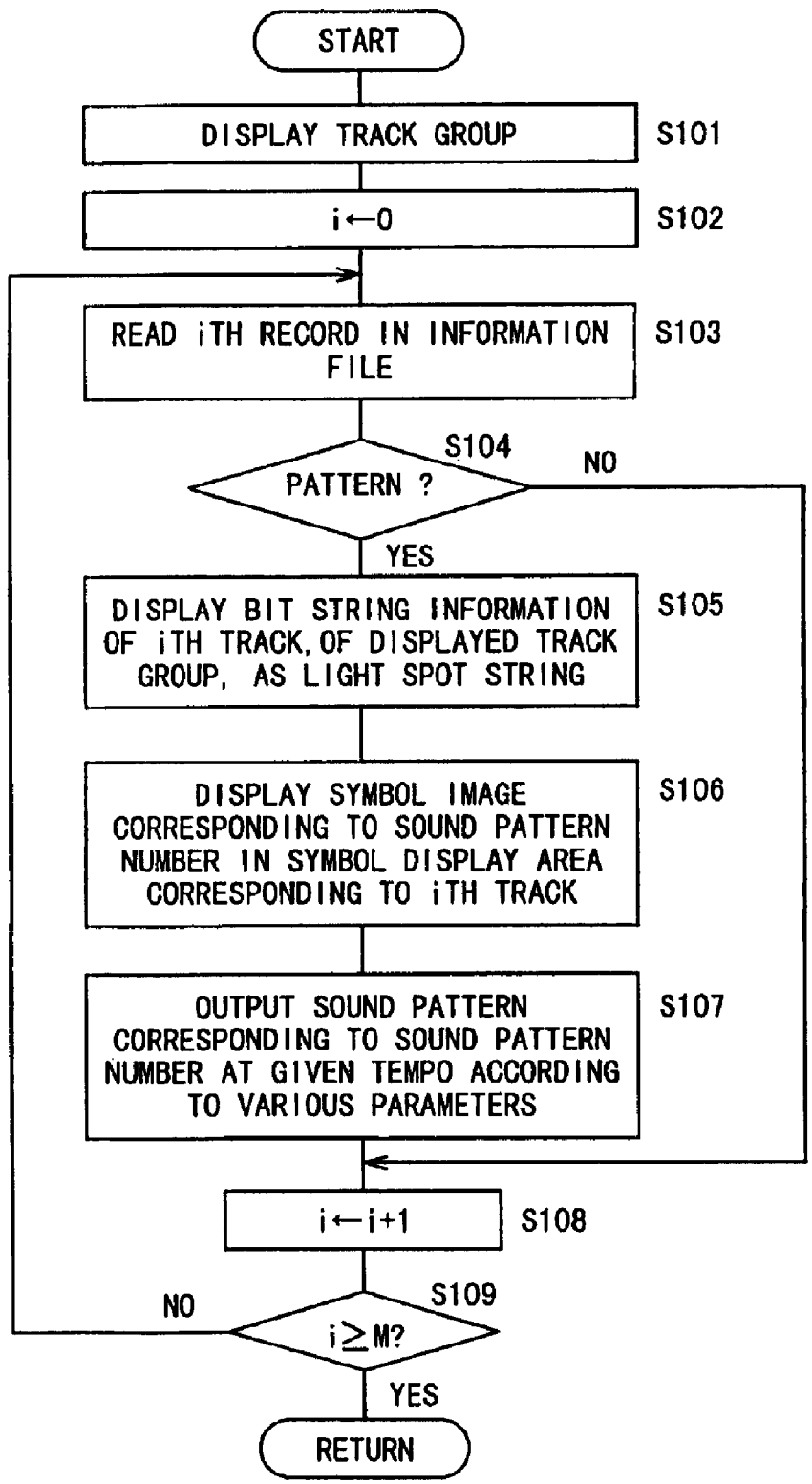
FIG. 16 is a flowchart of a processing sequence of a setting view displaying means.

In step S102 shown in FIG. 16, the setting view displaying means 304 stores an initial value "0" in an index register i used to retrieve tracks, thus initializing the index register i.

In step S103, the setting view displaying means 304 reads an ith record from the read information file 352. In step S104, the setting view displaying means 304 determines whether a sound pattern number is registered in the ith record or not.

If a sound pattern number is registered in the ith record, then control goes to step S105 in which, as shown in FIG. 32, the setting view displaying means 304 displays the bit string information of an ith track Tri of the displayed track group 200 as a string of light spots 406. At this time, of the bit string information, light spots 406 relative to a bit string of logic "1" are turned on and light spots 406 relative to a bit string of logic "0" are turned off.

In step S106, the setting view displaying means 304 displays a symbol image corresponding to the sound pattern number, e.g., a symbol image 400 indicative of a rhythm instrument or a symbol image 402 indicative of a chord instrument, in the symbol display area Syi corresponding to the ith track Tri.

In step S107, the sound pattern outputting means 362 outputs the sound of the sound pattern corresponding to the sound pattern at a given tempo according to various parameters. The given tempo is a tempo registered in the information file 352.

In step S108, the setting view displaying means 304 increments the value of the index register i by +1. In step S109, the setting view displaying means 304 determines whether the above processing has been completed for all the tracks Tr1–Tr6 or not based on whether or not the value of the index register i is equal to or greater than the number M of tracks (six in this embodiment).

If the processing has not been completed for all the tracks Tr1–Tr6, then control returns to step S103 to process a next track. If the processing has been completed for all the tracks Tr1–Tr6, then the processing sequence of the setting view displaying means 304 is ended.

Control then goes back to the main routine shown in FIG. 13. In step S3, the music editing means 300 displays a music number selecting view 408 as shown in FIG. 28. The music number selecting view 408 comprises a window view having a music number display area 410 containing a plurality of music numbers (SONG01–SONG10) and a guidance display area 412 containing a reduced version of the setting view 202.

The user can select a music number by pressing the L1 button 114a, the L2 button 114b, and the button 112d as a decision button of the manual controller 16. Specifically, when the user presses the L1 button 114a and the L2 button 114b, a cursor 414 in the music number display area 410 is moved, and when the user presses the decision button 112d, a music number where the cursor 414 is positioned is selected.

In step S4, the music editing means 300 determines whether a music number has been selected or not. If a music number has been selected, control goes to step S5 in which the music editing means 300 reads an information file 352 relative to the selected music number from the information file group 350.

In step S6, the setting view displaying means 304 performs its own processing sequence. In the processing sequence of the setting view displaying means 304, a setting view 202 with respect to the selected music number is displayed on the display monitor 18. In step S7, the music editing means 300 displays a music number selecting view 408 on the display monitor 18.

After step S7 or if a music number has not been selected in step S4, then control goes to step S8 in which the measure length setting means 306 determines whether a measure length has been set or not. A measure length is set by the user pressing the left button 110d or the right button 110b while the music number selecting view 408 is being displayed. As described above, a measure length is set to "4", "8", or "16".

If a measure length has been set, then control goes to step S9 in which the sound pattern registering means 360 registers bit string information based on the presently set measure length for all the records in the read information file 352.

After step S9 or if a measure length has not been set in step S8, then control goes to step S10 in which the music editing means 300 determines whether a music number has been decided or not based on whether the user has pressed the X button 112c or not.

If a music number has not been decided, then control goes back to step S4 to select a music number. If a music number has been decided, then control goes to step S11 in which the music editing means 300 turns off the music number selecting view 408. The display monitor 18 now displays only the setting view 202.

If the Δ button 112a, for example, is pressed while the setting view 202 is being displayed, then only the sound of the sound pattern registered in the selected track is outputted, and the other tracks are muted. If the □ button 112b is pressed, then only the selected track is muted.

Figure 14:
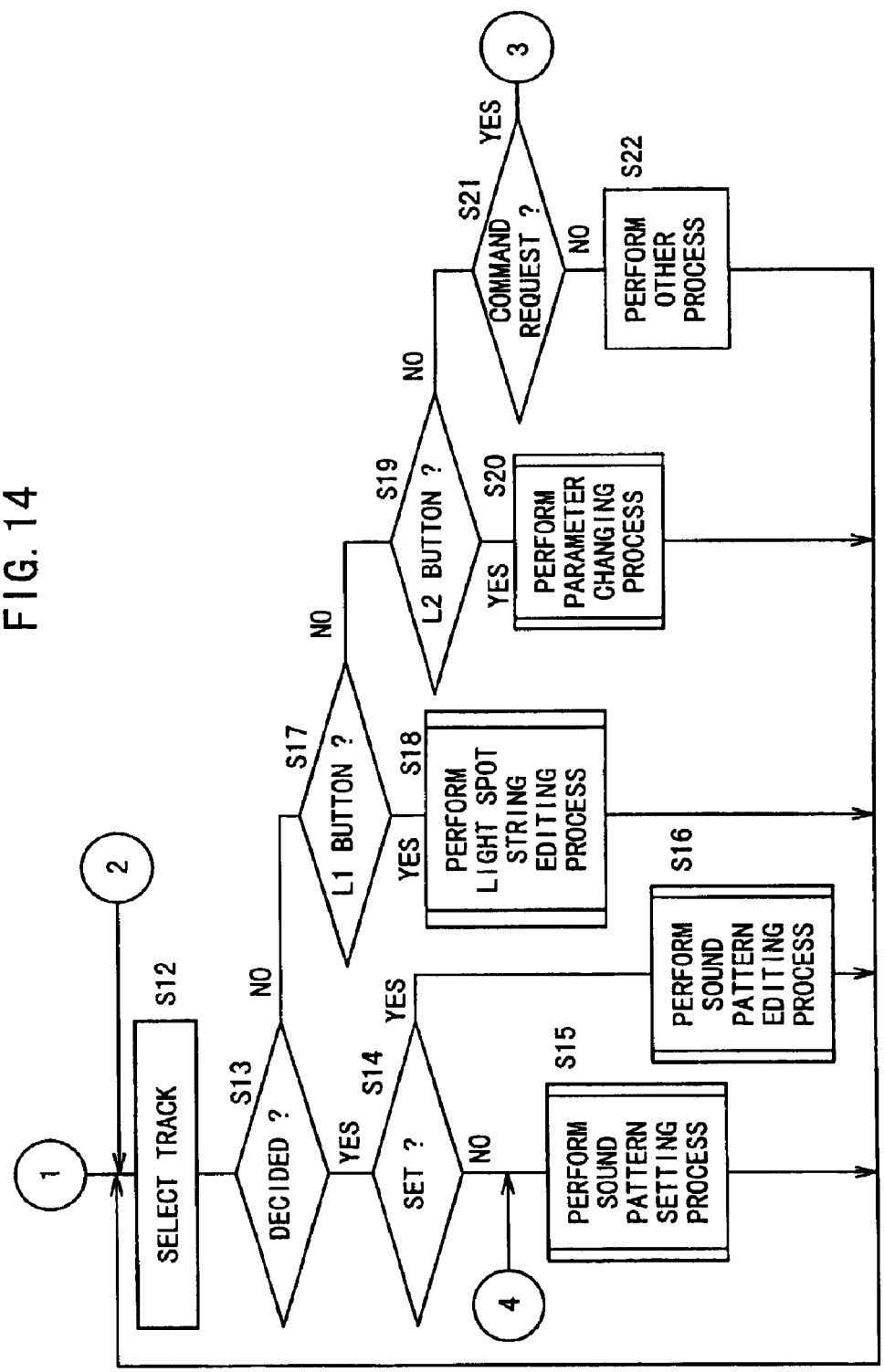

In step S12 shown in FIG. 14, the track selecting means 308 selects a track based on a command from the manual controller 16 which is produced by the user pressing the left button 10d or the right button 110b and the decision button 112d. Specifically, when the user presses the L1 button 114a and the L2 button 114b, a cursor (not shown) is moved, and when the user presses the decision button 112d, a track where the cursor is positioned is selected.

If the user presses the L1 button 114a while a track is being selected, a process of editing a light spot string is performed for the track where the cursor is positioned. If the user presses the L2 button 114b, a process of changing various parameters is performed. These processes will be described later on.

In step S13, the track selecting means 308 determines whether the decision button 112d has been pressed or not.

If the decision button 112d has been pressed, the track selecting means 308 decides a track where the cursor is positioned.

In step S14, the music editing means 300 determines whether the selected track has been set or not, i.e., whether a sound pattern has been set in the selected track or not, based on whether a sound pattern has been registered in the record corresponding to the track in the information file 352 or not.

If a sound pattern has not been set in the selected track, then control goes to step S15 in which a processing sequence of the sound pattern setting means 310 is performed. The processing sequence of the sound pattern setting means 310 is shown in FIG. 17.

Figure 17:
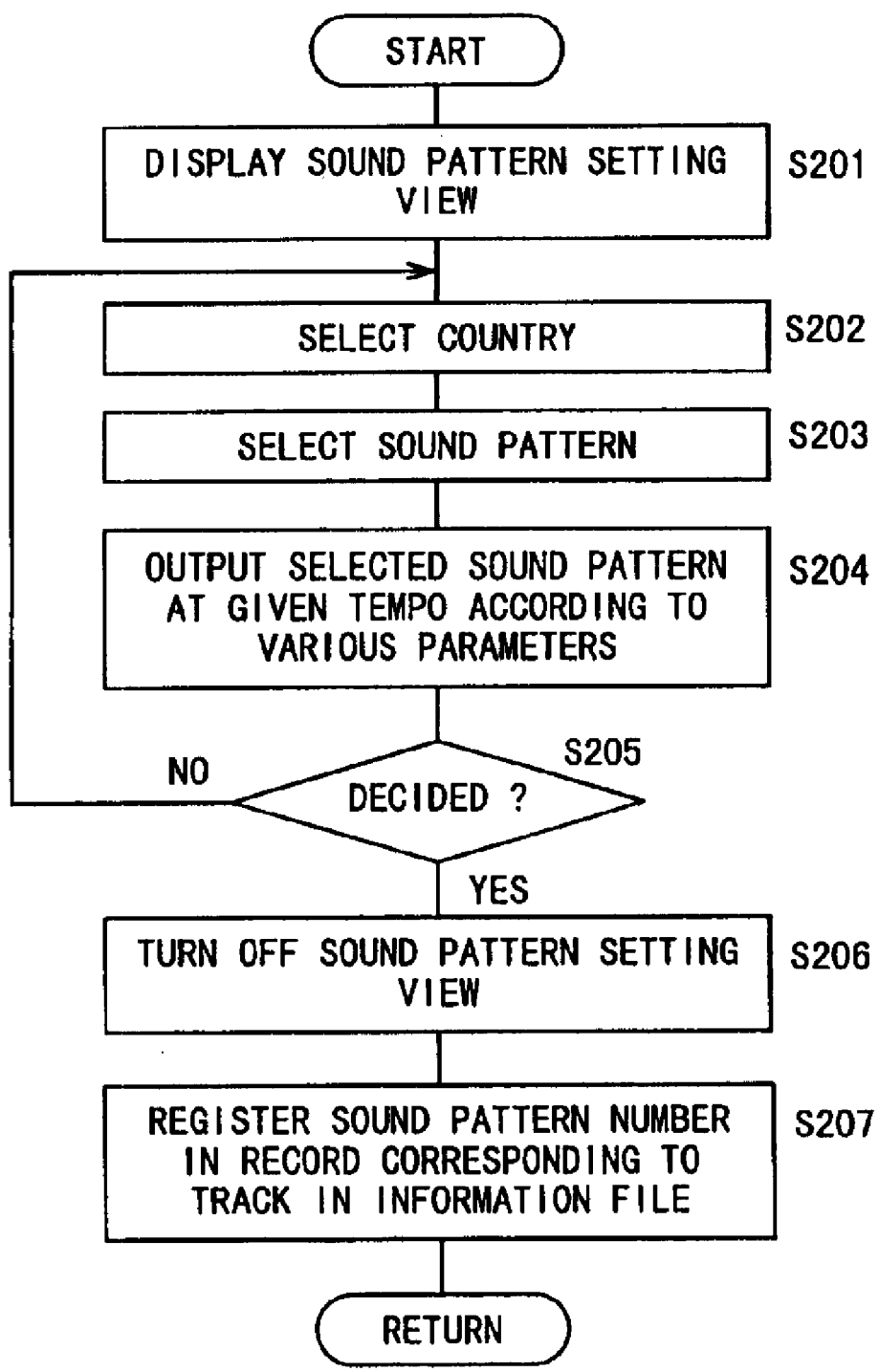
FIG. 17 is a flowchart of a processing sequence of a sound pattern setting means.
Figure 30:
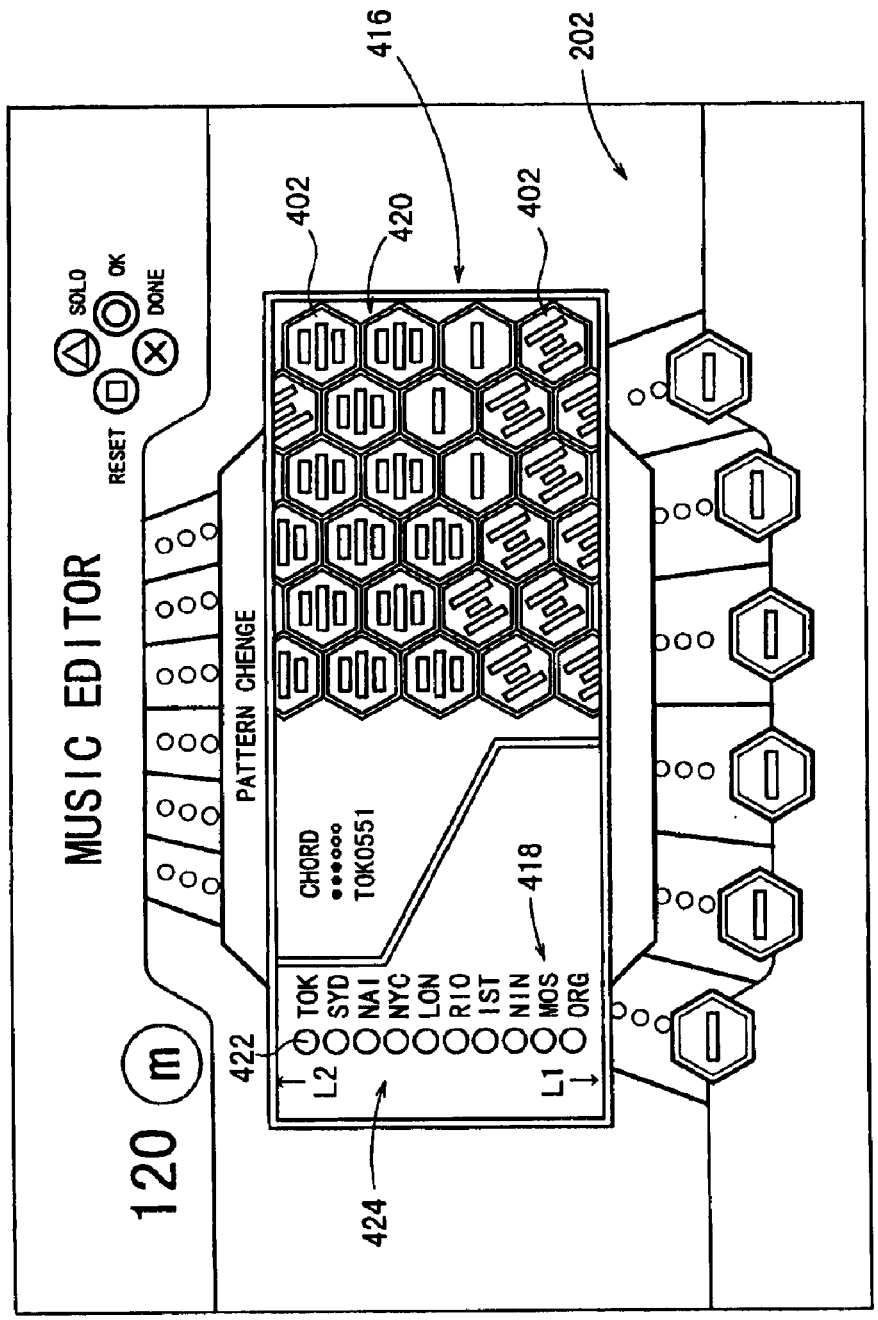
FIG. 30 is a view showing a sound pattern setting view as a window view.
Figure 31:
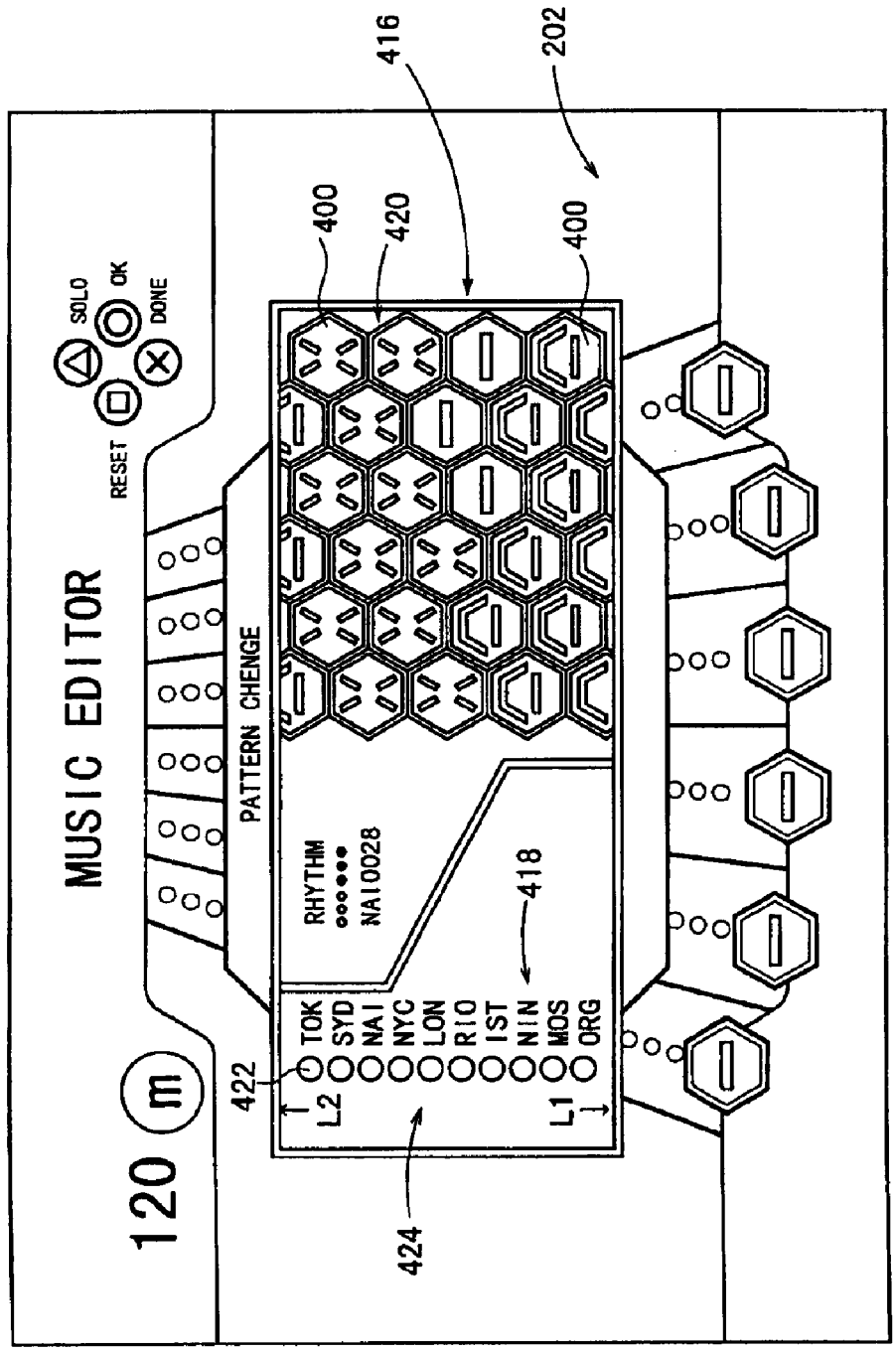
FIG. 31 is a view showing another sound pattern setting view as a window view.

In step S201 shown in FIG. 17, the sound pattern setting means 310 displays a sound pattern setting view 416 as shown in FIGS. 30 and 31. The sound pattern setting view 416 has an abbreviation display area 418 containing the abbreviations of the names of cities in a plurality of countries, e.g., TOK, SYD, NAI, NYC, LON, RIO, IST, KIN, MOS, ORG, and a pallet display area 420 containing a number of symbol images 400 or 402 of sound patterns. The abbreviation display area 418 includes, in addition to the abbreviations, a light spot display area 424 for displaying light spots 422 indicative of selections.

The sound pattern setting view 416 also has, in its upper left area, a name (CHORD or RHYTHM) indicative of the type of a sound pattern (chord instrument or rhythm instrument), six light spot groups corresponding to the respective tracks Tr1–Tr6 and selectively turned on and off depending on the types of sound patterns, and a selected sound pattern number. These displayed pieces of information allow the user to easily recognize which sound pattern is presently being selected.

In step S202, the user selects a country by pressing the L1 button 114a and the L2 button 114b of the manual controller 16. When the user presses the L1 button 114a and the L2 button 114b, the light spot 422 that is turned on is moved, and at the same time, the pallet display area 420 displays symbol images 400 or 402 indicative of a number of sound patterns corresponding to the selected country.

In FIG. 30, the pallet display area 420 displays symbol images 400 of chord instruments indicative of sound patterns corresponding to Asian countries. In FIG. 31, the pallet display area 420 displays symbol images 402 of rhythm instruments indicative of sound patterns corresponding to Nairobi and surrounding countries.

The sound pattern setting view 416 may display a world map between the abbreviation display area 418 and the pallet display area 420 for the user to easily recognize the selected country.

In step S203, the user selects a sound pattern by pressing the left button 110d, the right button 110b, the up button 110a, the down button 110c, and the decision button 112d of the manual controller 16. When the direction buttons 110d are pressed, a cursor (not shown) is moved, and when the decision button 112d is pressed, a sound pattern where the cursor is positioned is selected.

If the Δ button 112a is pressed while a country and a sound pattern are being selected, then only the sound of the presently selected sound pattern is outputted, letting the user easily recognize the attributes of the sound pattern, e.g., the type of the instrument, the melody, and the harmony.

If the □ button 112b is pressed while a country and a sound pattern are being selected, then the sound pattern that is presently registered in the selected track is accessed. Therefore, the user is not required to search for the presently registered sound pattern.

When the sound pattern is selected, control goes to step S204 in which the sound pattern outputting means 362 outputs the sound of the selected sound pattern at a given tempo according to various parameters.

In step S205, the sound pattern setting means 310 determines whether the sound pattern has been decided or not based on whether the X button 112c has been pressed or not.

If the sound pattern has not been decided, then control goes back to step S202 to select a sound pattern again. If the sound pattern has been decided, then control goes to step S206 in which the sound pattern setting view 416 is turned off. The display monitor 18 now displays the setting view 202 only.

In step S207, the sound pattern registering means 360 registers the number of the selected sound pattern in the record corresponding to the track in the information file 352. After step S207, the processing sequence of the sound pattern setting means 310 is ended.

In this manner, the user sets desired sound patterns in the respective tracks Tr1–Tr6. As shown in FIG. 32, sound patterns of rhythm instruments are registered in the first through third tracks Tr1–Tr3, and at the same time, symbol images 400 indicative of the rhythm instruments are displayed as the selected sound patterns in the respective first through third symbol display areas Sy1–Sy3. Sound patterns of chord instruments are registered in the fourth through sixth tracks Tr4–Tr6, and at the same time, symbol images 402 indicative of the chord instruments are displayed as the selected sound patterns in the respective fourth through sixth symbol display areas Sy4–Sy6.

Control goes back to the main routine shown in FIG. 14. If the selected track has been set in step S14, then control goes to step S16 in which the sound pattern editing means 312 performs its own processing sequence. The processing sequence of the sound pattern editing means 312 is shown in FIG. 18.

Figure 18:
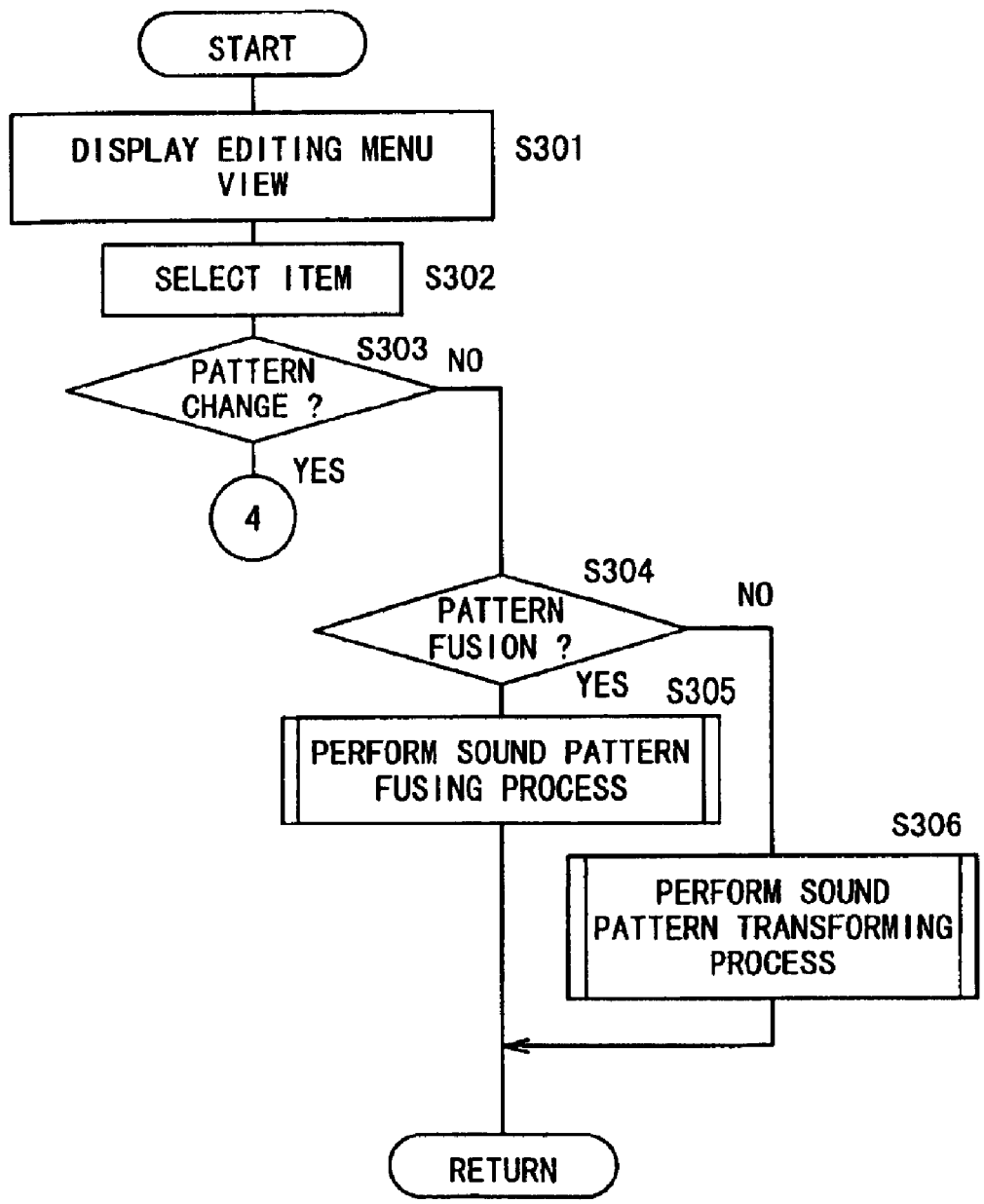
FIG. 18 is a flowchart of a processing sequence of a sound pattern editing means.
Figure 33:
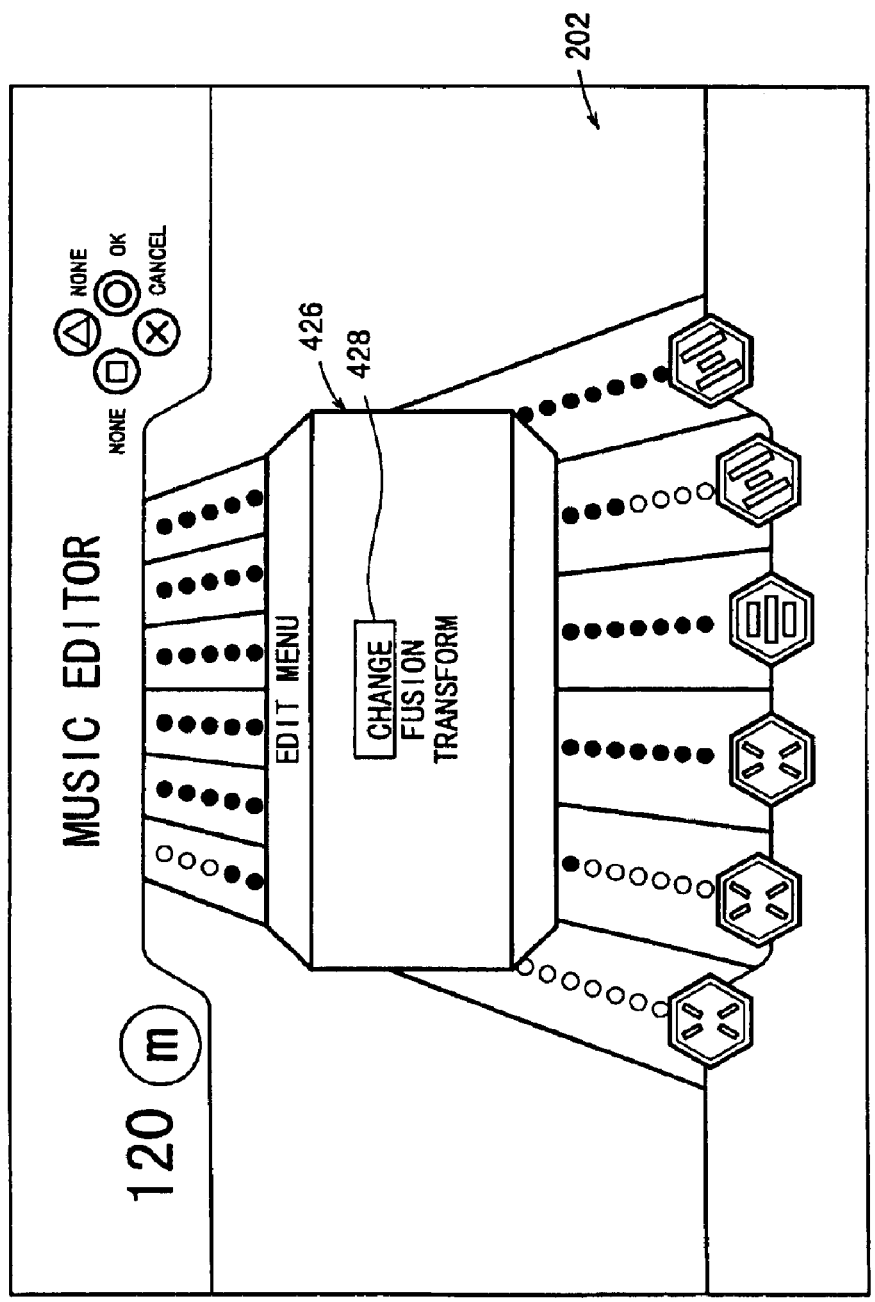
FIG. 33 is a view showing an editing menu view as a window view.

In step S301 shown in FIG. 18, the sound pattern editing means 312 displays an editing menu view 426 as shown in FIG. 33. The editing menu view 426 is a window image including three items. These three items represent changing of sound patterns (CHANGE), fusion of sound patterns (FUSION), and transformation of sound patterns (TRANSFORM).

In step S302, the user selects one of the three items by pressing the up button 110a, the down button 110c, and the decision button 112. Specifically, when the user presses the up button 110a and the down button 110b, a cursor 428 is moved, and when the user presses the decision button 112d, an item where the cursor 428 is positioned is selected.

In step S303, the sound pattern editing means 312 determines whether the selected item represents changing sound patterns or not. If the selected item represents changing sound patterns, then the sound pattern changing means 330 performs its own processing sequence.

Figure 34:
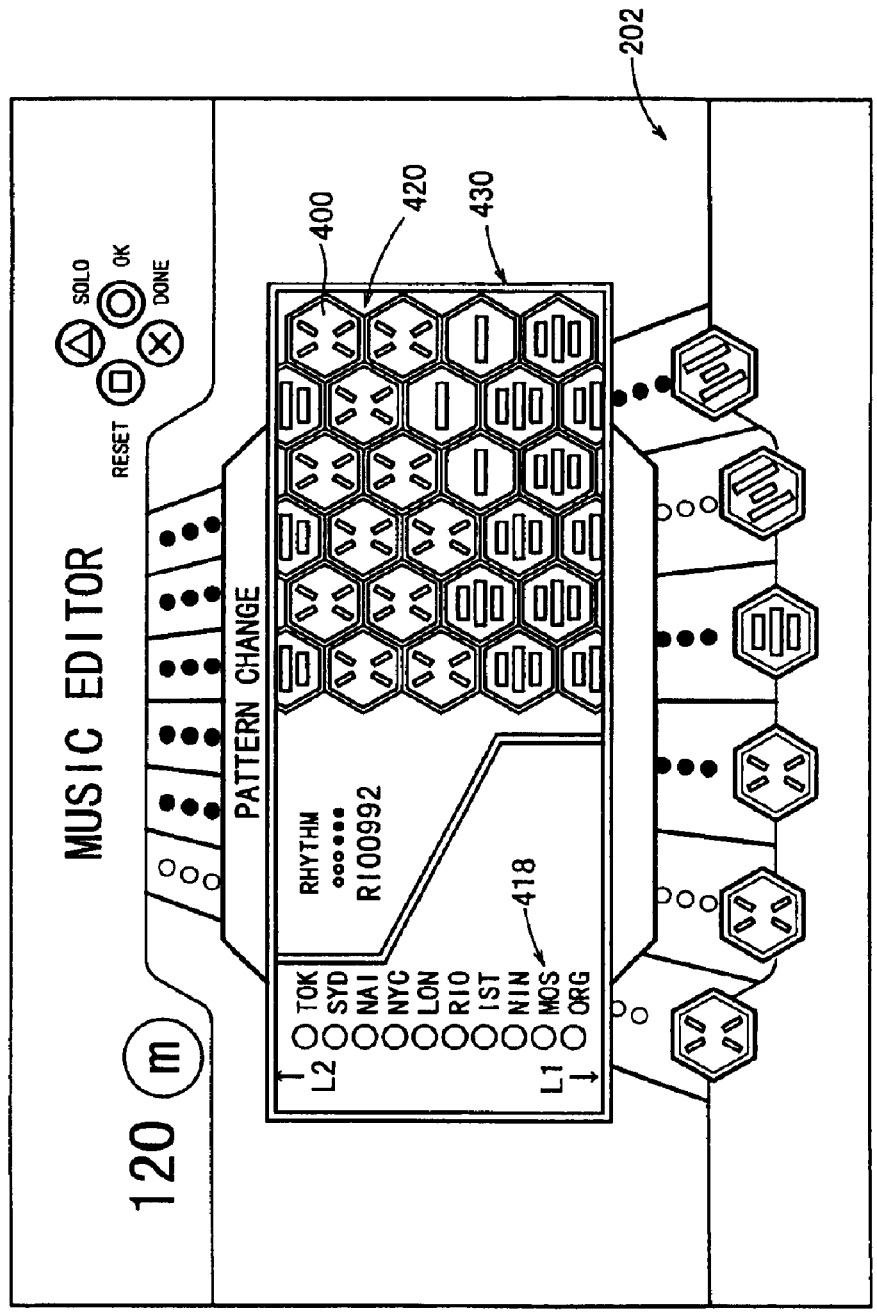
FIG. 34 is a view showing a sound pattern changing view as a window view.
Figure 35:
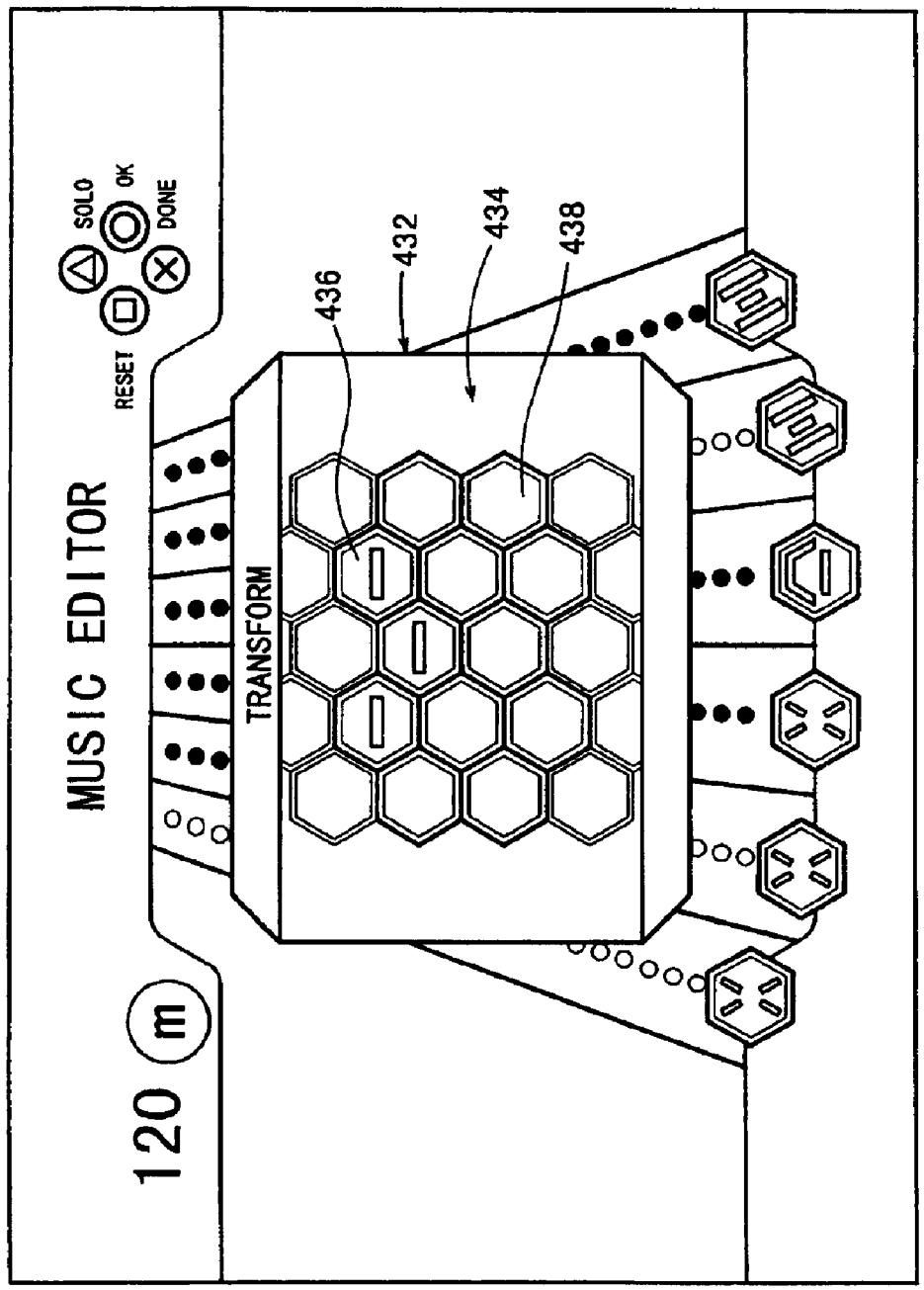
FIG. 35 is a view showing a sound pattern transforming view as a window view.

Control goes to step S15 shown in FIG. 14 in which the processing sequence of the sound pattern setting means 310 is performed to set a sound pattern, i.e., change sound patterns. In the sound pattern changing process, as shown in FIG. 34, the display monitor 18 displays a sound pattern changing view 430 which is essentially the same as the sound pattern setting view 416 (see FIG. 31). Specific details of the sound pattern changing process are identical to those of the sound pattern setting process described above, and will not be described below.

If the selected item does not represent changing sound patterns in step S303, then the sound pattern editing means 312 determines whether the selected item represents fusion of sound patterns or not in step S304. If the selected item represents fusion of sound patterns, then control goes step S305 in which the sound pattern fusing means 332 performs its own processing sequence.

The processing sequence of the sound pattern fusing means 332 is shown in FIG. 18. In step S401 shown in FIG. 19, the sound pattern fusing means 332 displays a sound pattern fusing view (not shown). The sound pattern fusing view is substantially the same as the sound pattern setting view 416 shown in FIG. 31 and the sound pattern changing view 430 shown in FIG. 34.

In step S402, the user selects a country by pressing the L1 button 114a and the L2 button 114b.

In step S403, the user selects a sound pattern by pressing the left button 110d, the right button 110b, the up button 110a, the down button 110c, and the decision button 112d.

When the decision button 112d is pressed, control goes to step S404 in which the sound pattern fusing means 332 fuses the sound pattern registered in the track and the presently selected sound pattern with each other.

In step S405, the sound pattern outputting means 362 outputs the sound of the fused sound pattern at a given tempo according to various parameters. The sounds of the sound pattern registered in the track and the presently selected sound pattern are now outputted together.

In step S406, the sound pattern fusing means 332 determines whether the fused sound pattern has been decided or not based on whether the X button 112c has been pressed or not. If the fused sound pattern has not been decided, then control goes back to step S402 to select a sound pattern to be fused.

If the fused sound pattern has been decided in step S406, then control goes to step S407 in which the sound pattern registering means 360 registers the fused sound pattern as a sound pattern of the user (user pattern) in a sound pattern file in which a number of sound patterns are registered.

In step S408, the sound pattern registering means 360 registers the number of the present sound pattern (user pattern) in the record corresponding to the track in the information file 352. Thereafter, in step S409, the sound pattern registering means 360 turns off the sound pattern fusing view. The processing sequence of the sound pattern fusing means 332 is now ended.

Control then goes back to the processing sequence of the sound pattern editing means 312. If the selected item does not represent fusion of sound patterns in step S304, then control goes to step S4306 in which the sound pattern transforming means 334 performs its own processing sequence.

Figure 19:
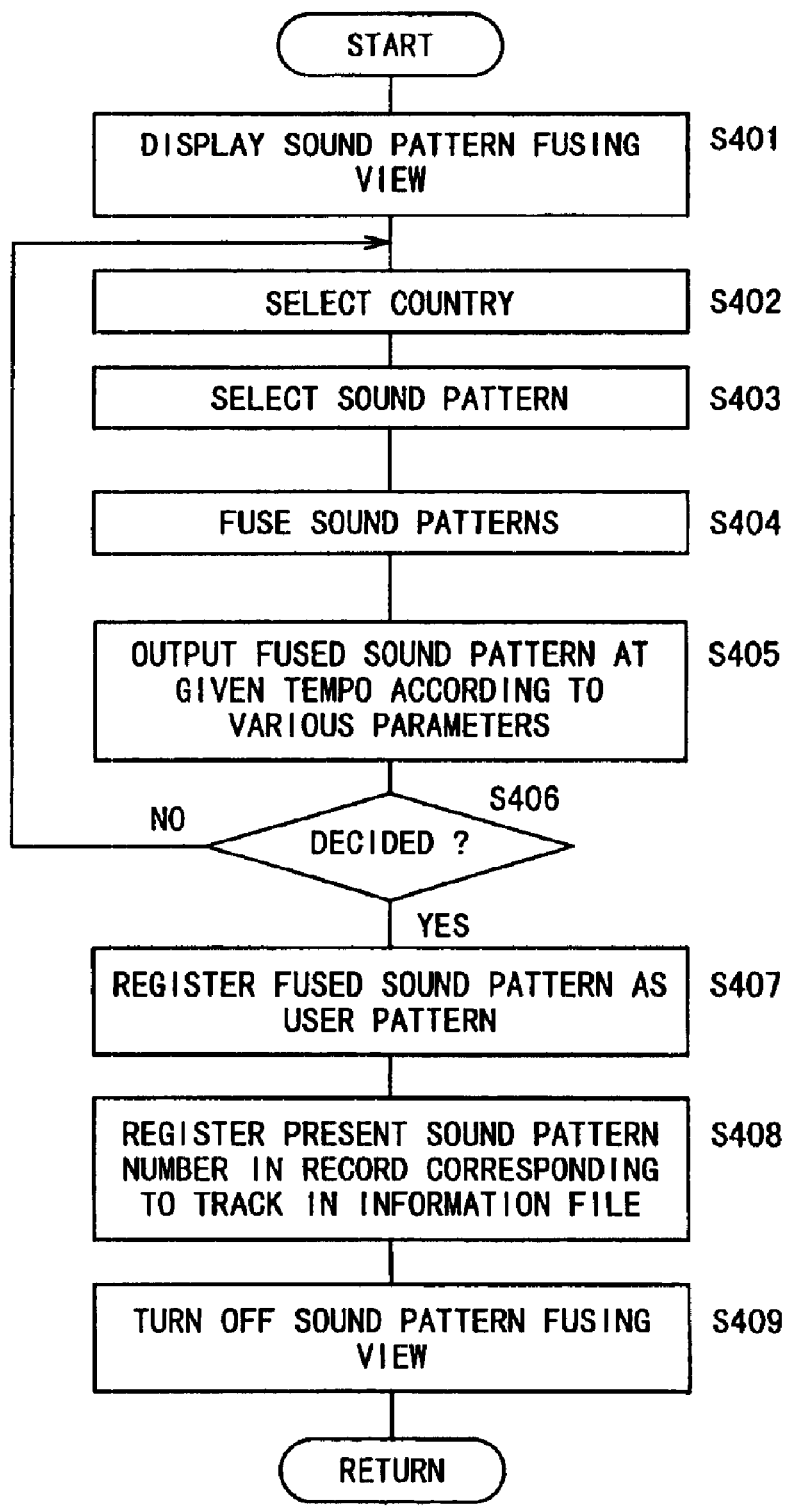
FIG. 19 is a flowchart of a processing sequence of a sound pattern fusing means.
Figure 20:
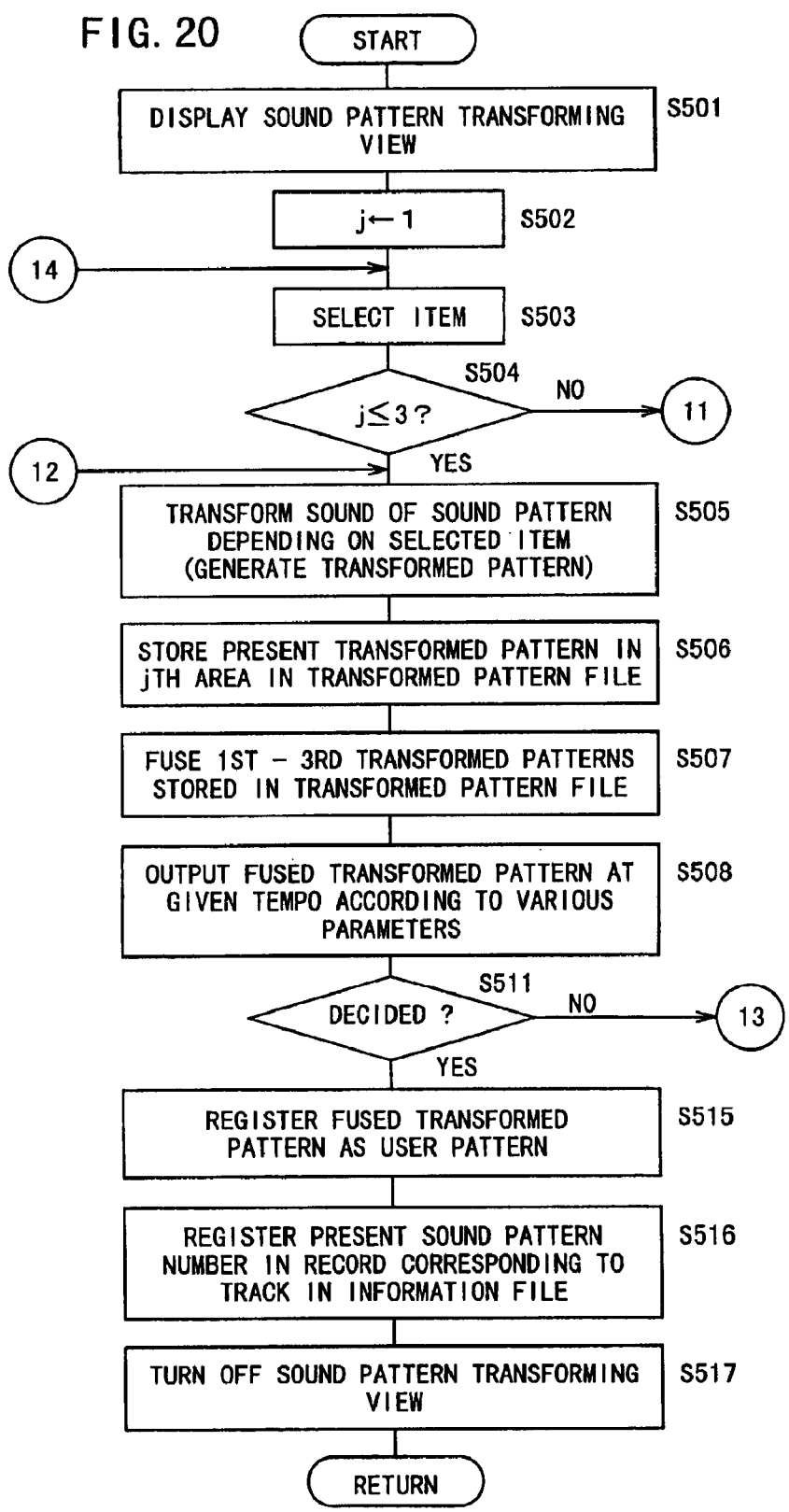
FIGS. 20 through 22 are a flowchart of a processing sequence of a sound pattern transforming means.
Figure 21:
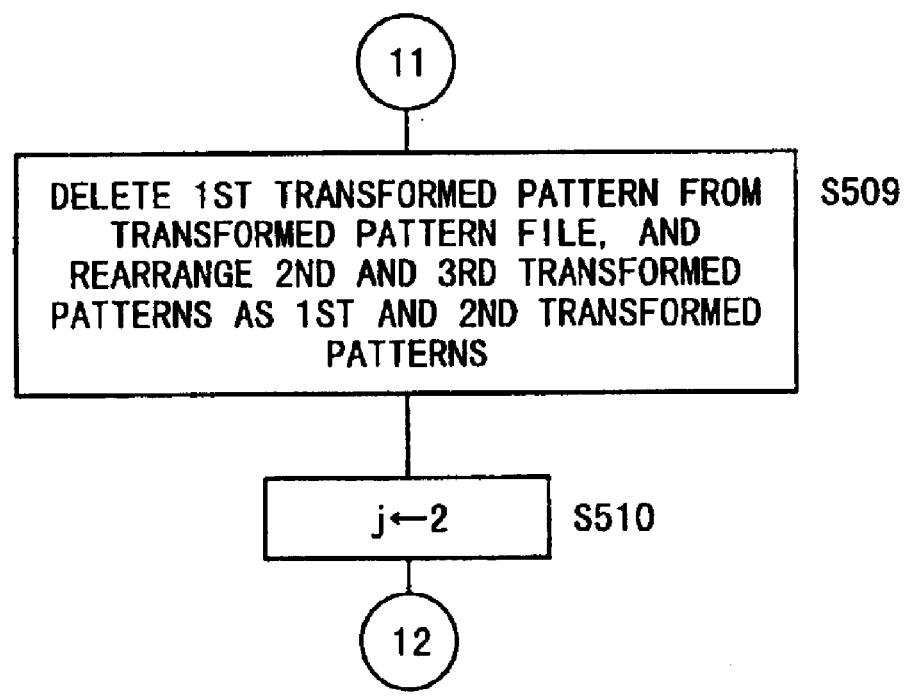

The processing sequence of the sound pattern transforming means 334 is shown in FIGS. 19 through 21. In step S501 shown in FIG. 20, the sound pattern transforming means 334 displays a sound pattern transforming view 432 shown in FIG. 35. The sound pattern transforming view 432 has a pallet display area 434 containing twelve items arranged in a staggered pattern and each represented by a hexagonal symbol image.

Symbol images 436 each represented by a hexagonal shape with a symbol "-", for example, are displayed in selected items, and images 438 each represented by a hexagonal shape only are displayed in unselected items. Up to three items can be selected at the same time. When items are successively selected, the oldest selected item is reset to an unselected state.

The twelve items represent:
(1) Rearrangement of notes in each measure: type 1
(2) Spacing notes (by greater degree)
(3) Increasing the tempo of each measure twice
(4) Rearrangement of notes in each measure: type 2
(5) Inversely performing notes in each measure: type 1
(6) Rearrangement of notes in each measure: type 3
(7) Inversely performing notes in each measure: type 2
(8) Reducing the tempo of each measure to half
(9) Rearrangement of notes in each measure: type 4
(10) Rearrangement of sound pitches in each measure: type 1
(11) Spacing notes (by smaller degree)
(12) Rearrangement of sound pitches in each measure: type 2

In step S502, the sound pattern transforming means 334 stores an initial value "0" in an index register j used to select items, thus initializing the index register J.

In step S503, the user selects an item by pressing the left button 110d, the right button 110b, the up button 110a, the down button 110c, and the decision button 112d. Specifically, when the direction buttons 110a–110d are pressed, a cursor (not shown) is moved, and when the decision button 112d is pressed, an item where the cursor is positioned is selected.

In step S504, the sound pattern transforming means 334 determines whether or not the number of selected items is 3 or less based on whether or not the value of the index register j is 3 or less.

If the number of selected items is 3 or less, then control goes to step S505 in which the sound pattern transforming means 334 transforms the sound pattern depending on the selected item or items, generating a transformed pattern. Thereafter, in step S506, the sound pattern transforming means 334 stores the presently transformed pattern in a jth area in a transformed pattern file.

In step S507, the sound pattern transforming means 334 fuses together one or more (up to three) transformed patterns stored in the transformed pattern file. In step S508, the sound pattern outputting means 362 outputs the sound of the fused sound pattern at a given tempo according to various parameters.

If the number of selected items exceeds 3 in step S504, then control goes to step S509 shown in FIG. 21 in which the sound pattern transforming means 334 deletes the first transformed pattern from the transformed pattern file and rearranges the second and third transformed patterns as the first and second transformed patterns, respectively.

In step S510, the sound pattern transforming means 334 stores "2" in the index register j. Thereafter, control goes to step S505 shown in FIG. 20 to repeat the processing from step S505.

In step S511, the sound pattern transforming means 334 determines whether the transformation of the sound pattern has been decided or not based on whether the user has pressed the X button 112c or not.

Figure 22:
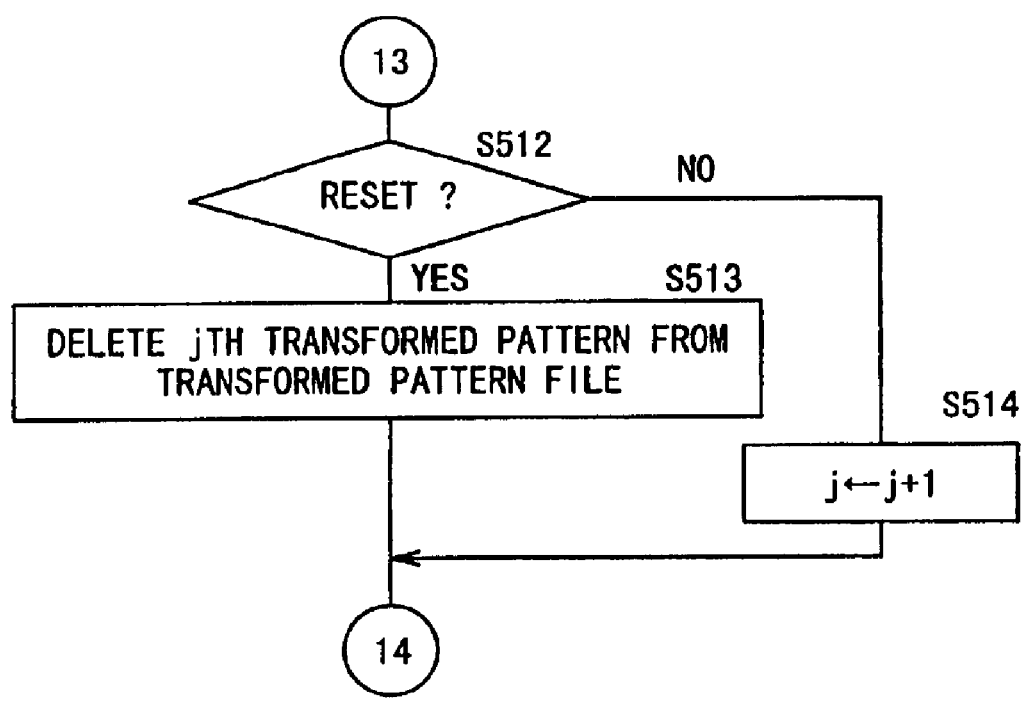

If the transformation of the sound pattern has not been decided, then control goes to step S512 shown in FIG. 22 in which the sound pattern transforming means 334 determines whether the user has pressed the □ button 112b indicative of resetting or not. If the □ button 112b has been pressed, then control goes to step S513 in which the sound pattern transforming means 334 deletes the jth transformed pattern from the transformed pattern file.

If the □ button 112b has not been pressed, then control goes to step S514 in which the sound pattern transforming means 334 increments the value of the index register j by +1.

After step S513 or S514, control goes to step S503 shown in FIG. 20 to select a next item.

If the transformation of the sound pattern has been decided in step S511, then control goes to step S515 in which the sound pattern registering means 360 registers the fused transformed pattern as a sound pattern of the user (user pattern) in the sound pattern file in which a number of sound patterns are registered.

In step S516, the sound pattern registering means 360 registers the number of the present sound pattern (user pattern) in the record corresponding to the track in the information file 352. Thereafter, in step S517, the sound pattern transforming means 334 turns off the sound pattern transforming view 432. The processing sequence of the sound pattern transforming means 334 is now ended.

After the processing sequence of the sound pattern changing means 330 (the sound pattern setting means 310), or the processing in step S305 in FIG. 18 by the sound pattern fusing means 332, or the processing in step S306 in FIG. 18 by the sound pattern transforming means 334, the processing sequence of the sound pattern editing means 312 is ended. Control goes back to step S12 shown in FIG. 14 to repeat the processing from step S12.

If the decision button 112d has not been pressed in step S13 as shown in FIG. 14, then control goes to step S17 which determines whether the L1 button 114a has been pressed or not. If the L1 button 114a has been pressed, then control goes to step S18 in which the light spot string editing means 314 performs its own processing sequence.

Figure 23:
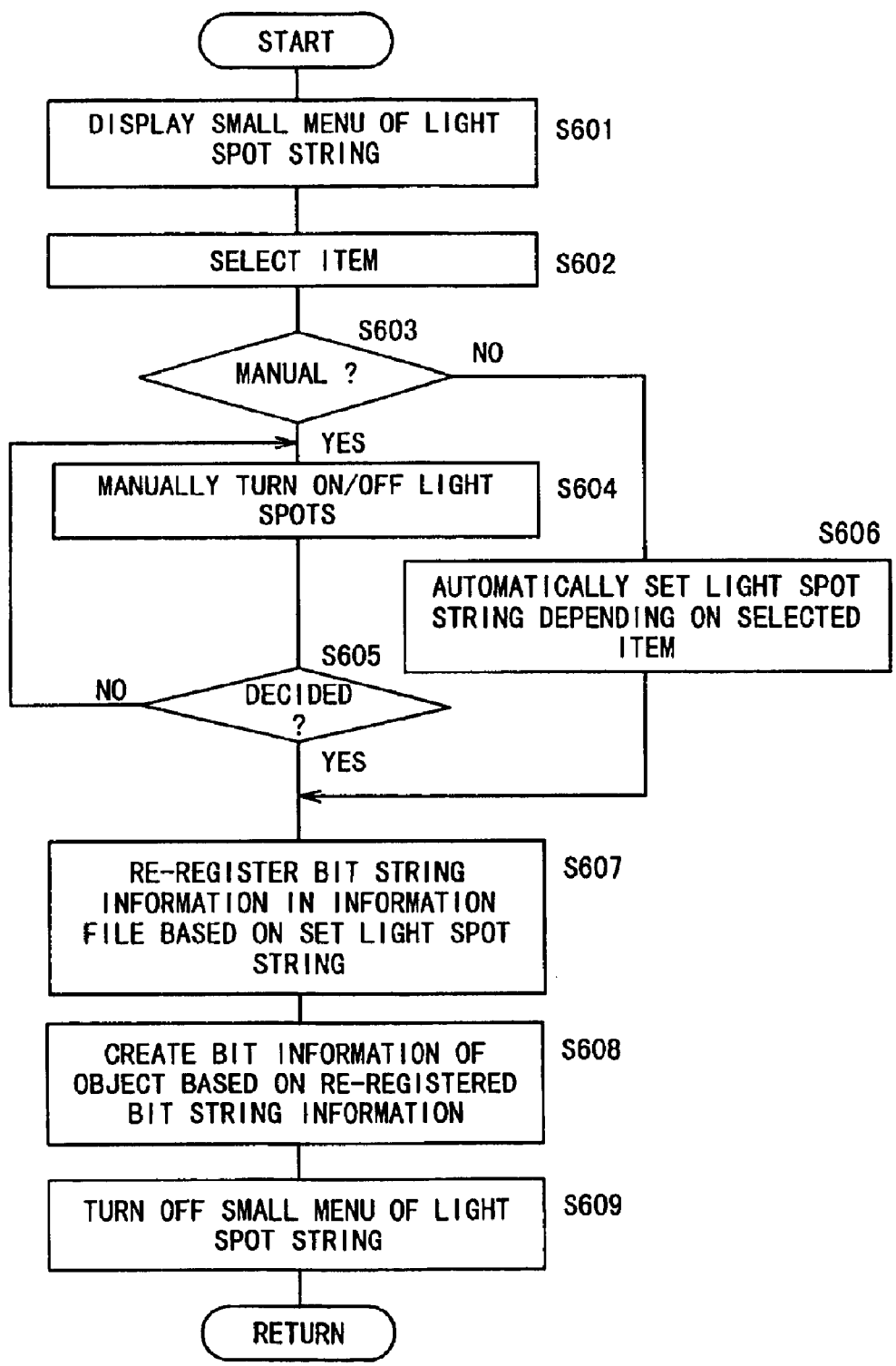
FIG. 23 is a flowchart of a processing sequence of a light spot string editing means.

The processing sequence of the light spot string editing means 314 is shown in FIG. 23. In step S601 shown in FIG. 23, the light spot string editing means 314 displays a small menu view of a light spot string (not shown) in the vicinity of the symbol display area corresponding to the selected track. The menu view contains seven items representing MANUAL, TYPES 1–5, and CANCEL.

In step S602, the user selects an item by pressing the up button 110a, the down button 110c, and the decision button 112. Specifically, when the user presses the up button 110a and the down button 110b, a cursor (not shown) is moved, and when the user presses the decision button 112d, an item where the cursor is positioned is selected.

In step S603, the light spot string editing means 314 determines whether MANUAL has been selected or not. If MANUAL has been selected, then control goes to step S604 in which light spots are turned on or off manually.

Specifically, as shown in FIG. 32, a string of light spots 406 is displayed on the presently selected track. If MANUAL is selected, a cursor (not shown) is displayed at a desired one of the light spots 406. The user moves the cursor to select a light spot 406 to be turned on or a light spot 406 to be turned off.

The user selects such a light spot 406 by pressing the up button 110a, the down button 10c, the decision button 112, and the X button 112c. Specifically, when the user presses the up button 110a and the down button 10c, the cursor is moved. When the decision button 112d is pressed, the light spot 406 where the cursor is positioned is turned on, and when the X button 112c is pressed, the light spot 406 where the cursor is positioned is turned off. The user repeats the above manual process to edit a string of light spots 406 manually.

In step S605, the light spot string editing means 314 determines whether the editing of a light spot string has been finished or not based on whether the decision button 112d is pressed after the editing of a light spot string or not. If the editing of a light spot string has not been finished, then control goes back to step S604 to continue the editing of a light spot string. If the editing of a light spot string has been finished, then control goes to step S607.

If any one of TYPES 1–5 has been selected in step S603, then control goes to step S606 in which a string of light spots 406 in the track is automatically set depending on the selected item which corresponds to the selected one of TYPES 1–5. If CANCEL has been selected in step S603, then the small menu view of a light spot string is turned off, and the processing sequence of the light spot string editing means 314 is forcibly ended.

If the editing of a light spot string has been finished in step S605, or after step S606, control goes to step S607 in which the sound pattern registering means 360 reregisters bit string information in the information file 352 based on the set light spot string. Then, in step 608, bit information of an object is created based on the reregistered bit string information.

In step S609, the small view of a light spot string is turned off, and the processing sequence of the light spot string editing means 314 is ended. Thereafter, control goes back to step S12 shown in FIG. 14 to repeat the processing from step S12.

If the L1 button 114a has not been pressed in step S17, then control goes to step S19 which determines whether the L2 button 114b has been pressed or not. If the L2 button 114b has been pressed, then control goes to step S20 in which the parameter changing means 316 performs its own processing sequence.

Figure 24:
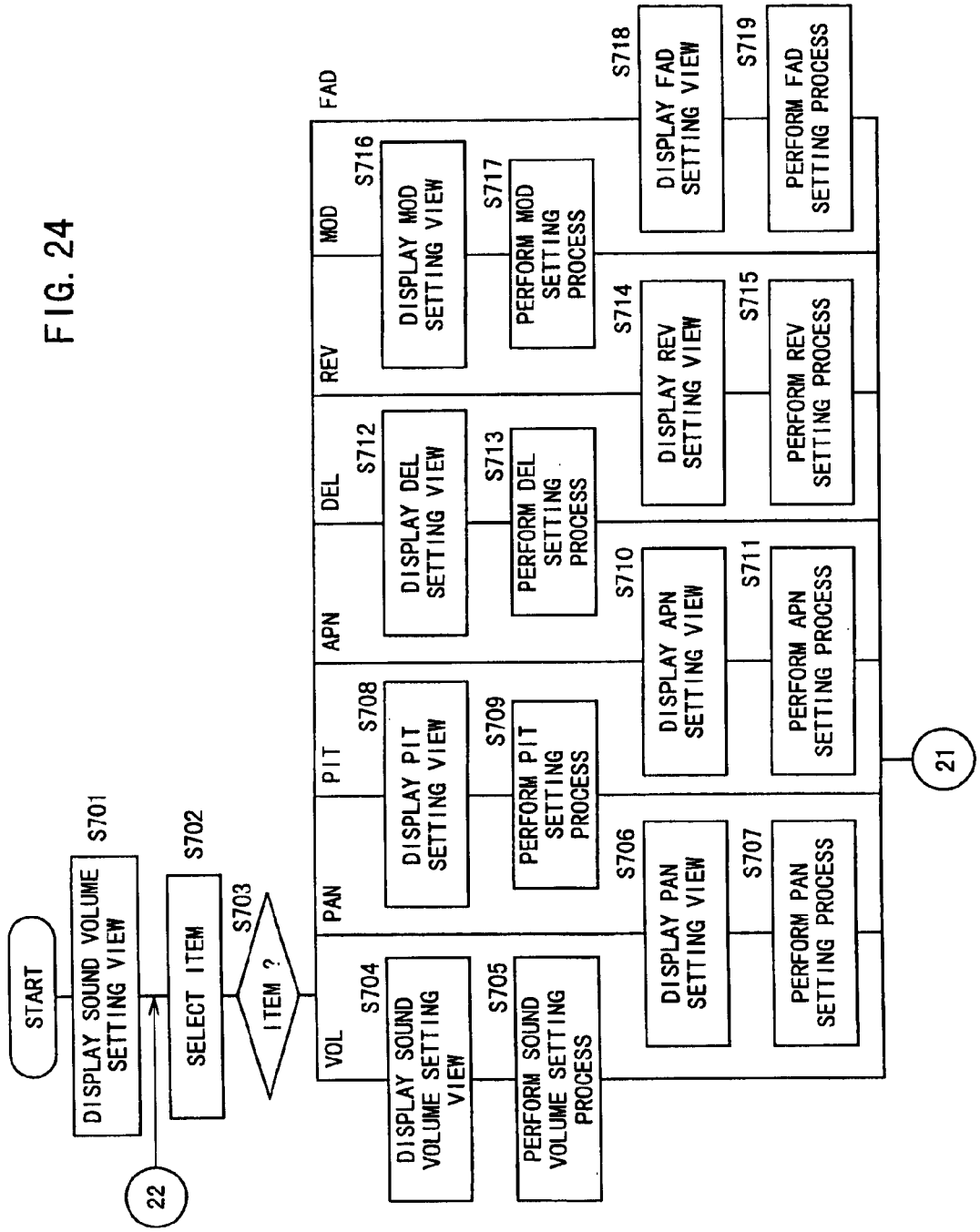
FIGS. 24 and 25 are a flowchart of a processing sequence of a parameter changing means.

The processing sequence of the parameter changing means 316 is shown in FIG. 24. In step S701 shown in FIG. 24, the parameter changing means 316 displays a sound volume setting view 440 shown in FIG. 36.

Figure 42:
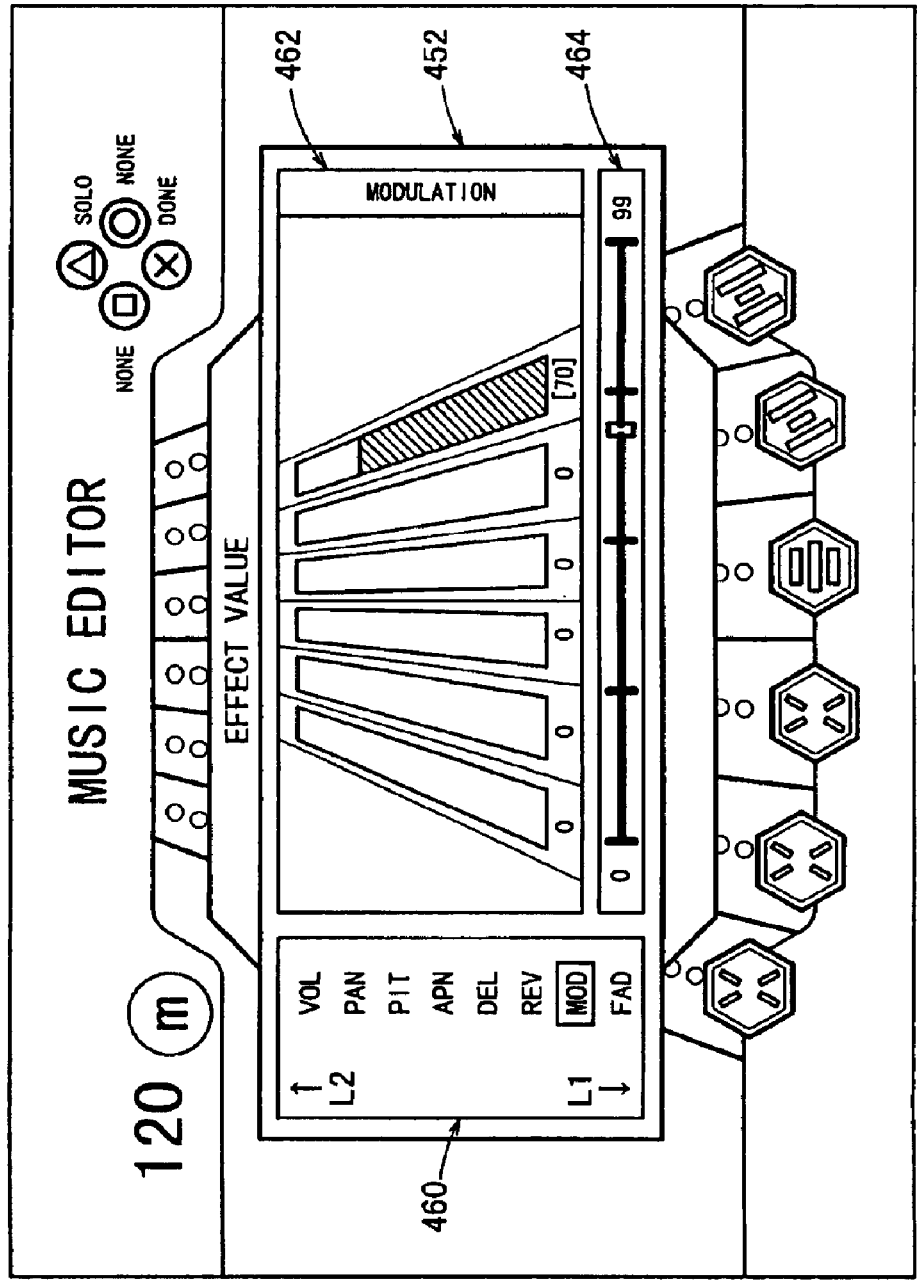
FIG. 42 is a view showing a MOD setting view as a window view.
Figure 43:
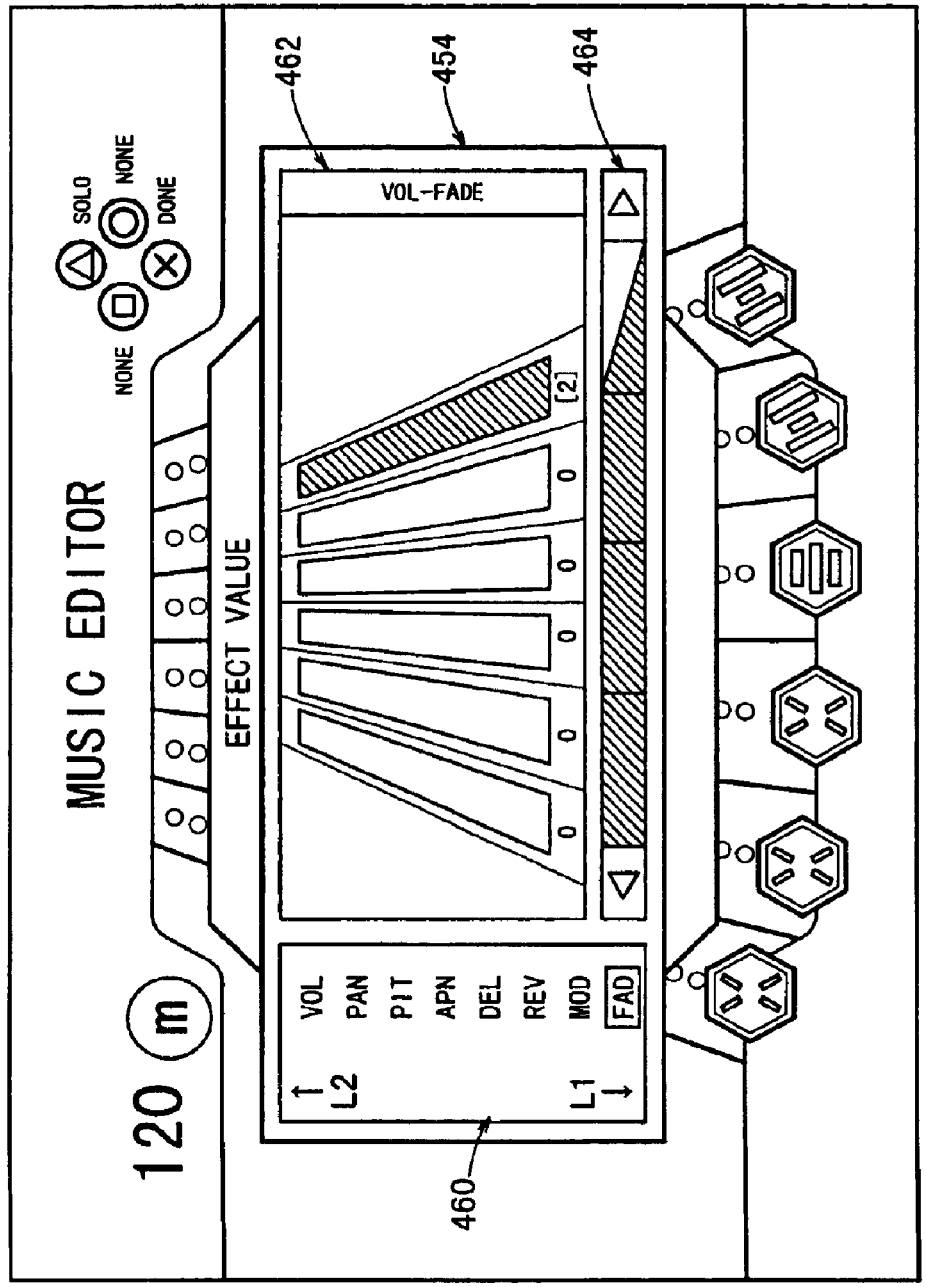
FIG. 43 is a view showing a FAD setting view as a window view.

The parameter changing means 316 uses, in addition to the sound volume setting view 440, a PAN setting view 442 (see FIG. 37), a PIT setting view 444 (see FIG. 38), an APN setting view 446 (see FIG. 39), a DEL setting view 448 (FIG. 40), a REV setting view 450 (see FIG. 41), a MOD setting view 452 (see FIG. 42), and a FAD setting view 454 (see FIG. 43).

Figure 36:
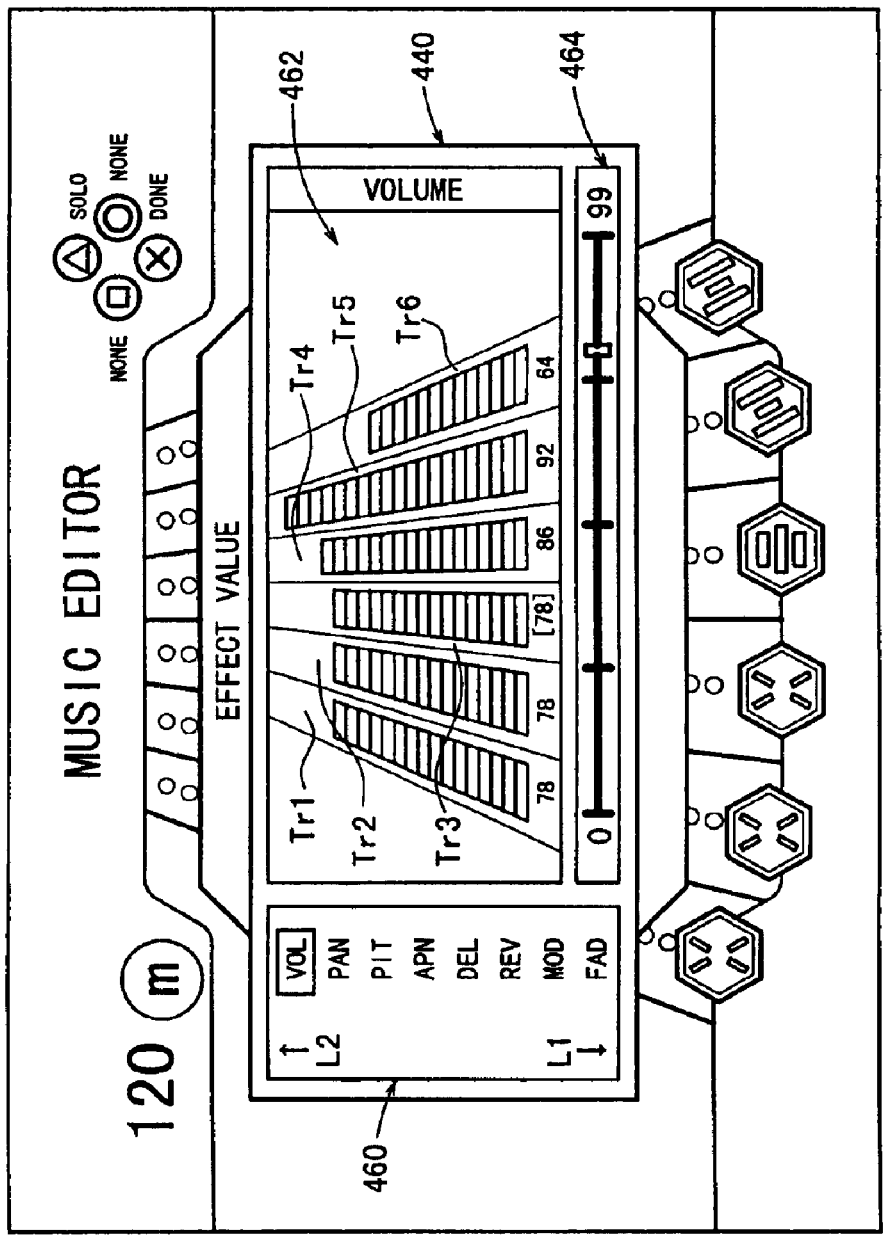
FIG. 36 is a view showing a sound volume setting view as a window view.

The sound volume setting view 440 shown in FIG. 36, which exemplifies the other setting views described above, has an item display area 460 including the items of various parameters that can be changed, a parameter display area 462 displaying details of the tracks Tr1–Tr6 at a selected parameter as bars, and an individual parameter display area 464 for indicating the value of a parameter, as it changes, in the selected track with another display attribute.

In step S702, the user selects an item by pressing the L1 button 114a and the L2 button 114b to move a cursor. In step S703, the parameter changing means 316 determines whether an item has been selected or not. If an item has been selected, then the parameter changing means 316 performs a process depending on the selected item.

If "VOL" is selected, then control goes to step S704 in which the parameter changing means 316 displays the sound volume setting view 440. If the sound volume setting view 440 has already been displayed, step S704 is skipped. In step S705, the parameter changing means 316 performs a process of setting a sound volume. Specifically, the user selects a track with the left button 110d and the right button 110b, and then changes the sound volume of the selected track by pressing the up button 110a and the down button 110c. In the example shown in FIG. 36, the sound volumes of the first through third tracks Tr1–Tr3 are set to "78", the sound volume of the fourth track Tr4 is changed to "86", the sound volume of the fifth track Tr5 is changed to "92", and the sound volume of the sixth track Tr6 is changed to "64". The sound volume of each of the tracks can be changed from "0" to "99".

If a sound volume is changed, the sound volume data of the various parameters registered in the record corresponding to the selected track in the information file 352 is changed to the presently changed sound volume data.

Figure 37:
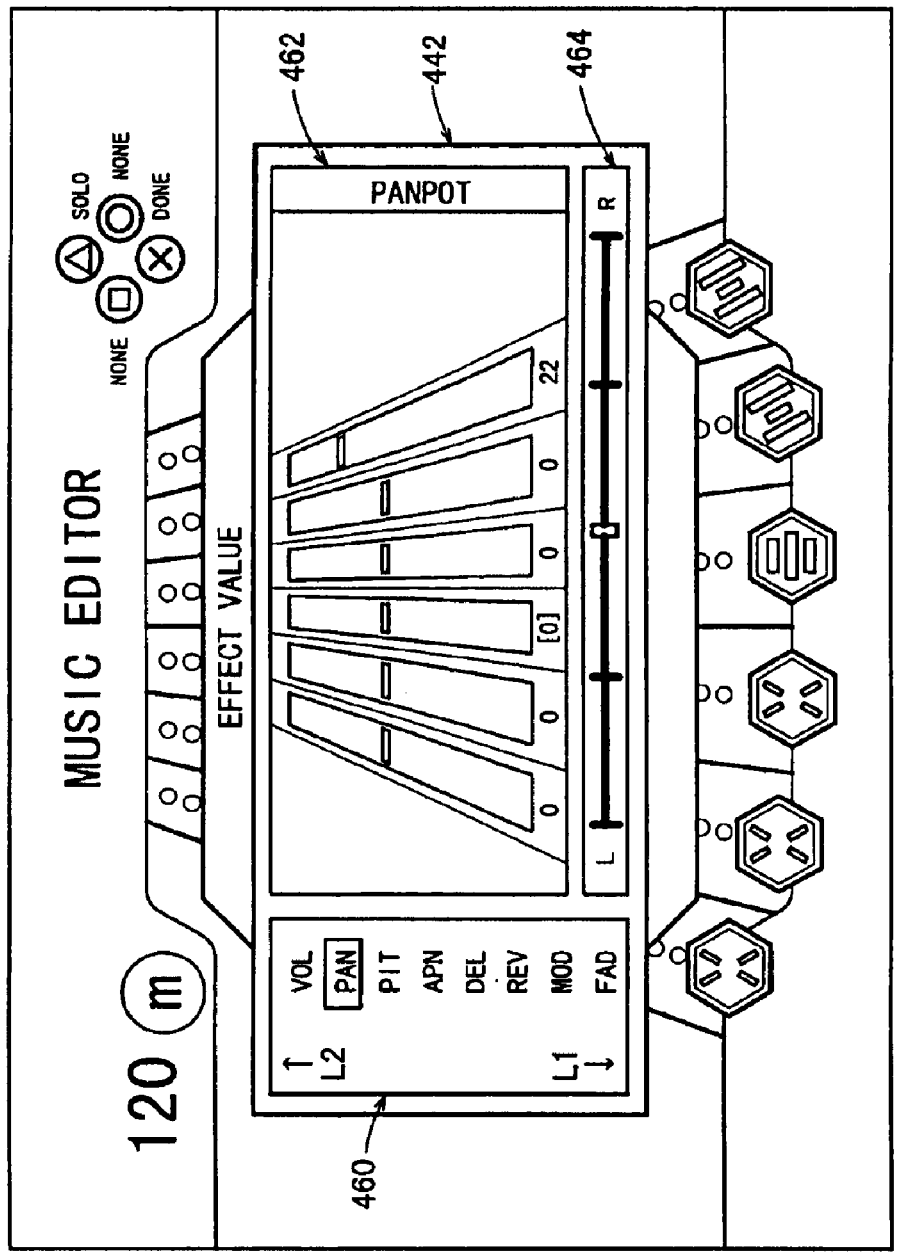
FIG. 37 is a view showing a PAN setting view as a window view.

If SPANK is selected, control goes to step S706 in which the parameter changing means 316 displays a PAN setting view 442 shown in FIG. 37. In step S707, the parameter changing means 316 performs a process of setting PANPOT or the horizontal position of a sound image. Specifically, the user selects a track with the left button 110d and the right button 110b, and then changes the horizontal position of a sound image in the selected track by pressing the up button 110a and the down button 110c. In the example shown in FIG. 37, a sound image is set in a central position in each of the first through fifth tracks Tr1–Tr5, and a sound image is shifted to the right by "22" in the sixth track Tr6. PANPOT can be changed from "0" to "50" on the right, and from "0" to "50" on the left.

When PANPOT is changed, the PANPOT data of the various parameters registered in the record corresponding to the selected track in the information file 352 is changed to the presently changed PANPOT data.

Figure 38:
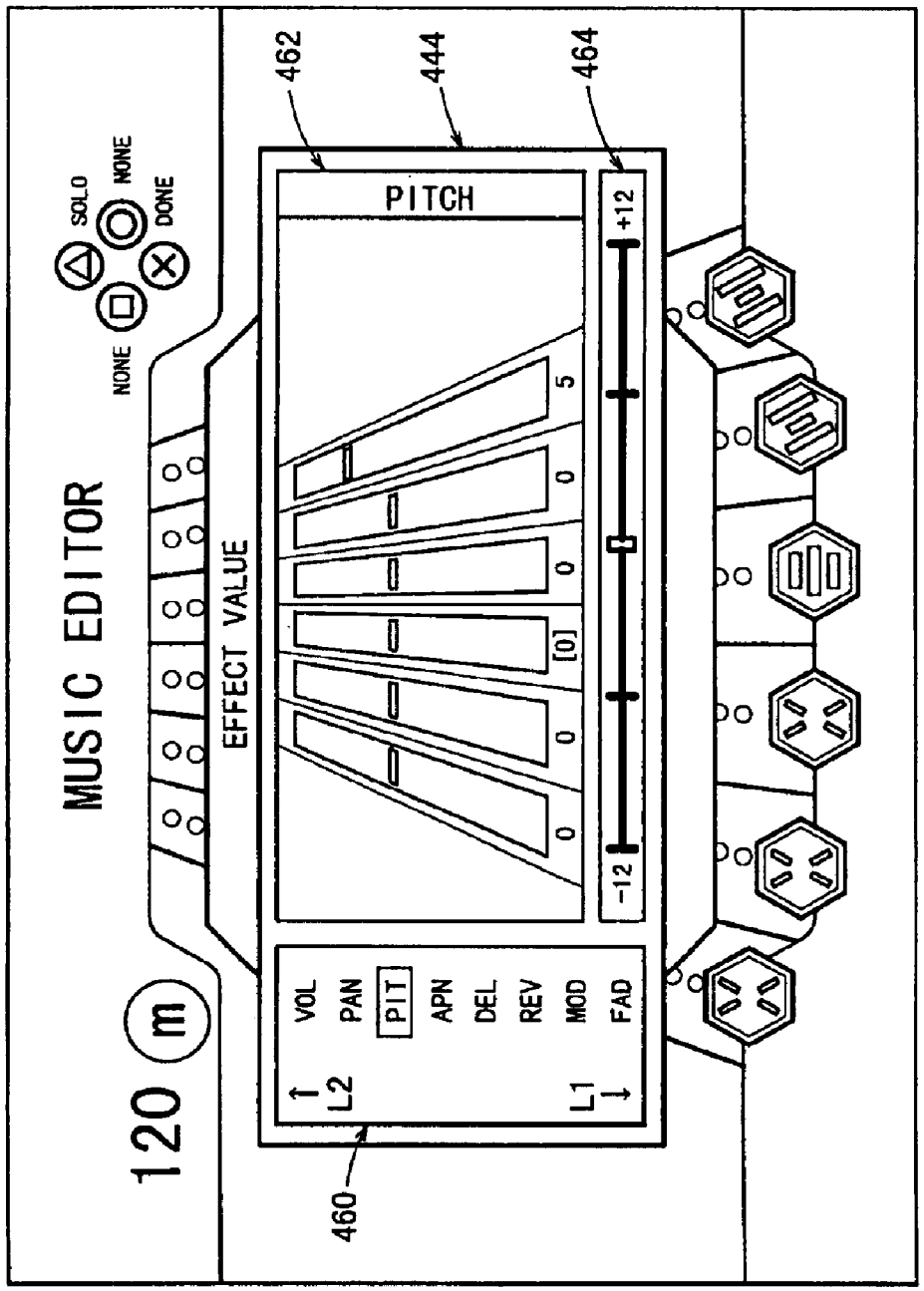
FIG. 38 is a view showing a PIN setting view as a window view.

If "PIT" is selected, control goes to step S708 in which the parameter changing means 316 displays a PIT setting view 444 shown in FIG. 38. In step S709, the parameter changing means 316 performs a process of setting a pitch. Specifically, the user selects a track with the left button 110d and the right button 110b, and then changes the pitch of sound in the selected track by pressing the up button 110a and the down button 110c. In the example shown in FIG. 38, the pitch of sound is normal in each of the first through fifth tracks Tr1–Tr5, and the pitch of sound is increased by "5" in the sixth track Tr6. The pitch of sound can be increased from "0" to "+12" and reduced from "0" to "−12".

When the pitch of sound is changed, the pitch data of the various parameters registered in the record corresponding to the selected track in the information file 352 is changed to the presently changed pitch data.

Figure 39:
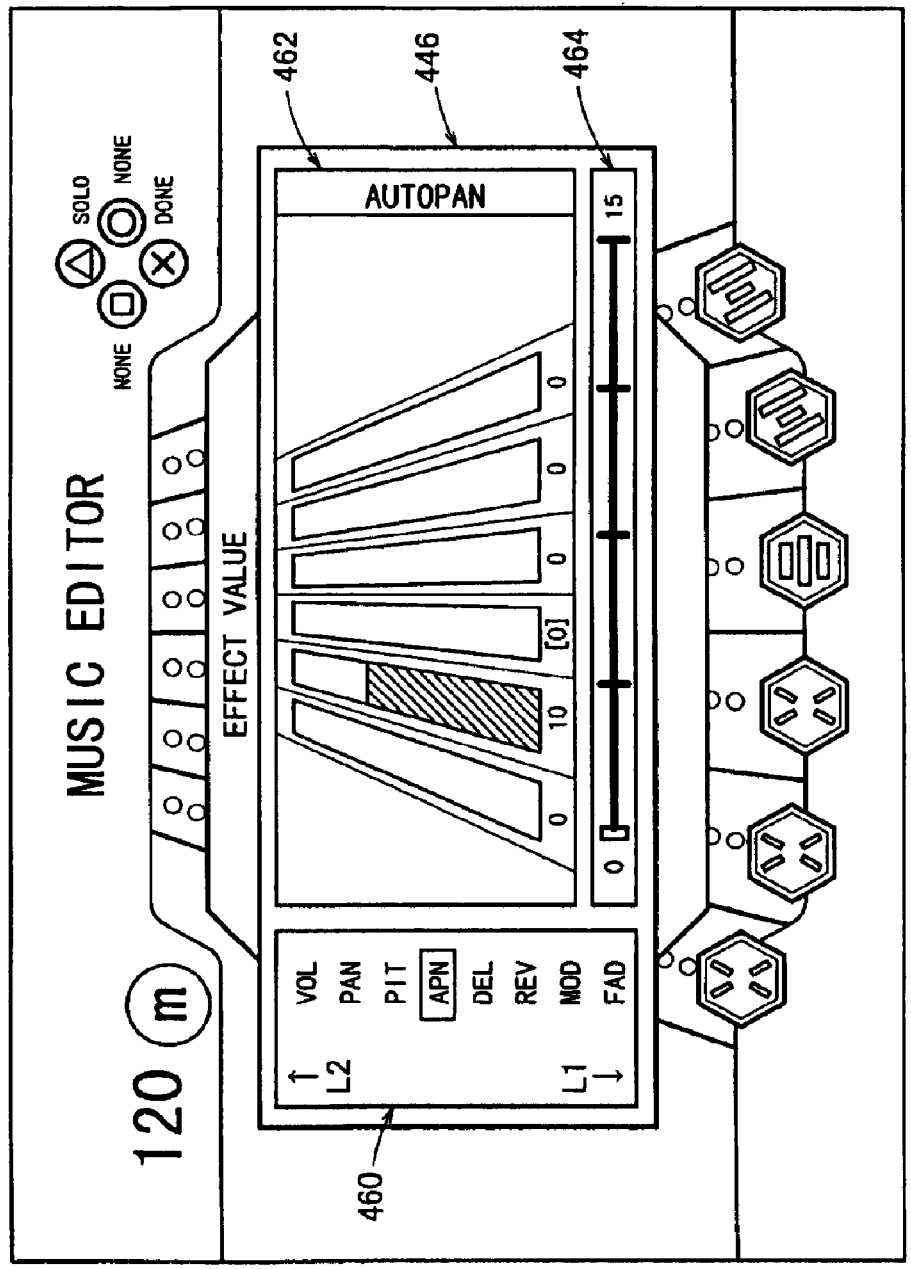
FIG. 39 is a view showing an APN setting view as a window view.

If "APN" is selected, control goes to step S710 in which the parameter changing means 316 displays an APN setting view 446 shown in FIG. 39. In step S711, the parameter changing means 316 performs a process of setting the period of a periodically horizontally displaced sound. Specifically, the user selects a track with the left button 110d and the right button 110b, and then changes the period of a periodically horizontally displaced sound in the selected track by pressing the up button 110a and the down button 110c. In the example shown in FIG. 39, the sound is not horizontally displaced periodically in the first, third through sixth tracks Tr1, Tr3–Tr5, and the sound is horizontally displaced periodically in ten periods in ten seconds, for example, in the second track Tr2. The period of the sound can be changed from "0" to "15" periods in ten seconds, for example.

When the period of a periodically horizontally displaced sound is changed, the period data of the various parameters registered in the record corresponding to the selected track in the information file 352 is changed to the presently changed period data.

Figure 40:
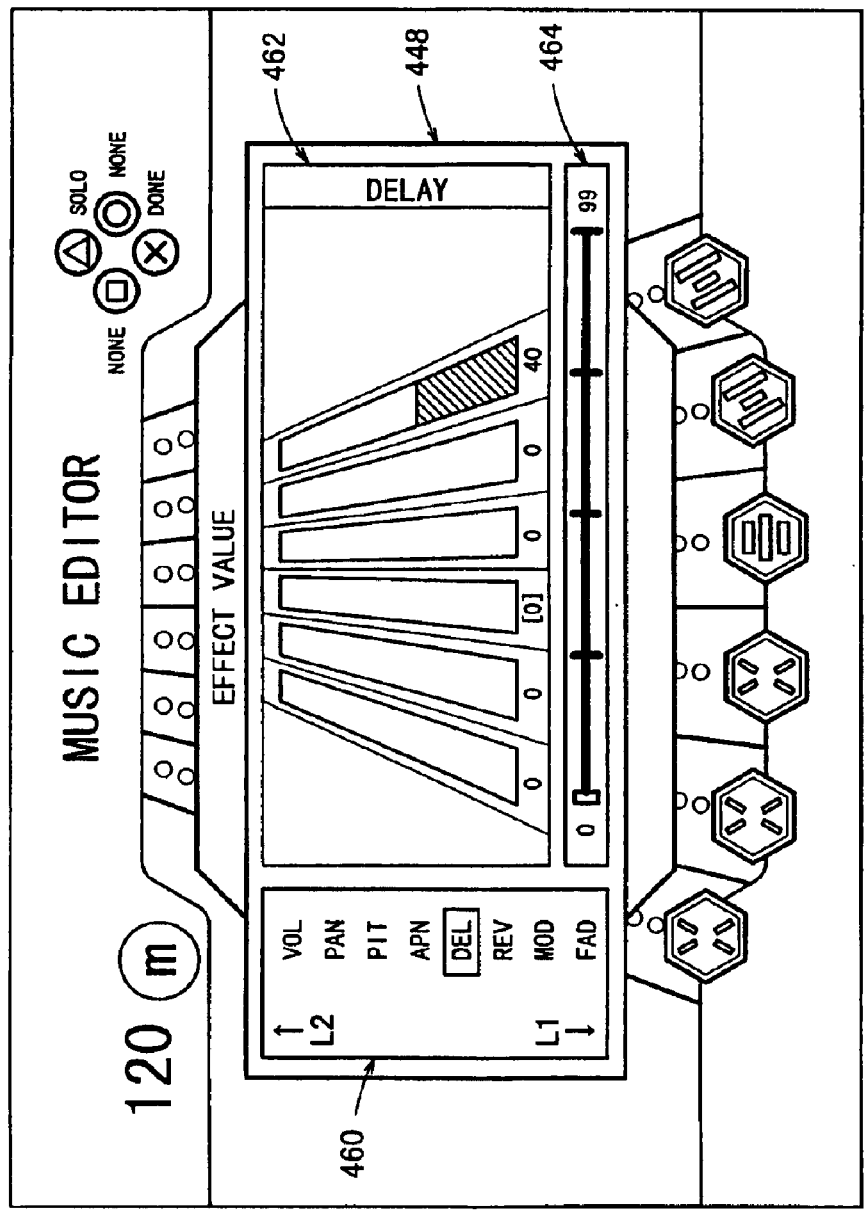
FIG. 40 is a view showing a DEL setting view as a window view.

If "DEL" is selected, control goes to step S712 in which the parameter changing means 316 displays a DEL setting view 448 shown in FIG. 40. In step S713, the parameter changing means 316 performs a process of setting a delay. Specifically, the user selects a track with the left button 110d and the right button 110b, and then changes the delay of a sound in the selected track by pressing the up button 110a and the down button 110c. In the example shown in FIG. 40, the sound is not delayed in each of the first through fifth tracks Tr1–Tr5, and the sound is delayed 40 sec., for example, in only the sixth track Tr6. The sound can be delayed from "0" to "99" msec., for example.

When the delay of a sound is changed, the delay data of the various parameters registered in the record corresponding to the selected track in the information file 352 is changed to the presently changed delay data.

Figure 41:
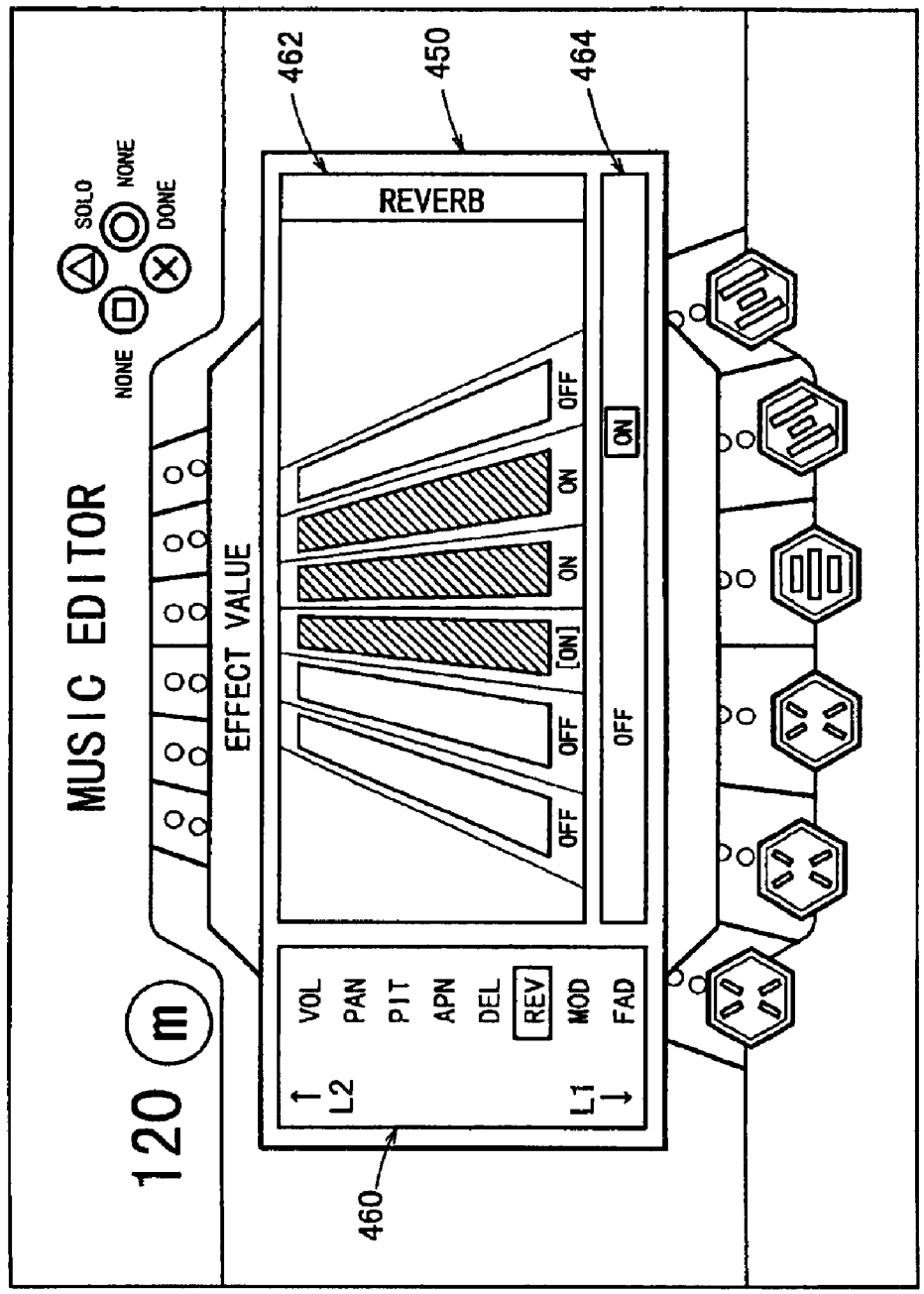
FIG. 41 is a view showing a REV setting view as a window view.

If "REV" is selected, control goes to step S714 in which the parameter changing means 316 displays a REV setting view 450 shown in FIG. 41. In step S715, the parameter changing means 316 performs a process of setting a reverberation. Specifically, the user selects a track with the left button 110d and the right button 110b, and then sets a reverberation in the selected track by pressing the up button 110a and the down button 110c. In the example shown in FIG. 41, the sound is not reverberated in each of the first, second, and sixth tracks Tr1, Tr2. Tr6, and the sound is reverberated in the third, fourth, and fifth tracks Tr3, Tr4, Tr5.

When a reverberation is changed, the reverberation data of the various parameters registered in the record corresponding to the selected track in the information file 352 is changed to the presently changed reverberation data.

If "MOD" is selected, control goes to step S716 in which the parameter changing means 316 displays a MOD setting view 452 shown in FIG. 42. In step S717, the parameter changing means 316 performs a process of setting a modulation. Specifically, the user selects a track with the left button 110d and the right button 110b, and then sets a modulation in the selected track by pressing the up button 110a and the down button 110c.

Modulations include a tremolo effect, a vibrato effect, a wow effect, etc. Depending on how a sound is modulated, the frequency of an LFO (Low Frequency Oscillator) is changed to change those effects.

In the example shown in FIG. 42, the sound is not modulated in each of the first through fifth tracks Tr1–Tr5, and the sound is modulated 70% by the tremolo effect in only the sixth track Tr6. The modulation in each of the above effects can be changed from "0" to "99" %.

When a modulation is changed, the modulation data of the various parameters registered in the record corresponding to the selected track in the information file 352 is changed to the presently changed modulation data.

If "FAD" is selected, control goes to step S718 in which the parameter changing means 316 displays a FAD setting view 454 shown in FIG. 43. In step S719, the parameter changing means 316 performs a process of setting the type of a fade-in and a fade-out. Specifically, the user selects a track with the left button 110d and the right button 110b, and then sets the type of a fade-in and a fade-out in the selected track by pressing the up button 110a and the down button 110c. In the example shown in FIG. 43, the sound is not faded in and faded out in each of the first through fifth tracks Tr1–Tr5, and the sound is faded in and faded out with a second type in the sixth track Tr6.

When the type of a fade-in and a fade-out is changed, the fade-in/fade-out type data of the various parameters registered in the record corresponding to the selected track in the information file 352 is changed to the presently changed fade-in/fade-out type data.

Figure 25:
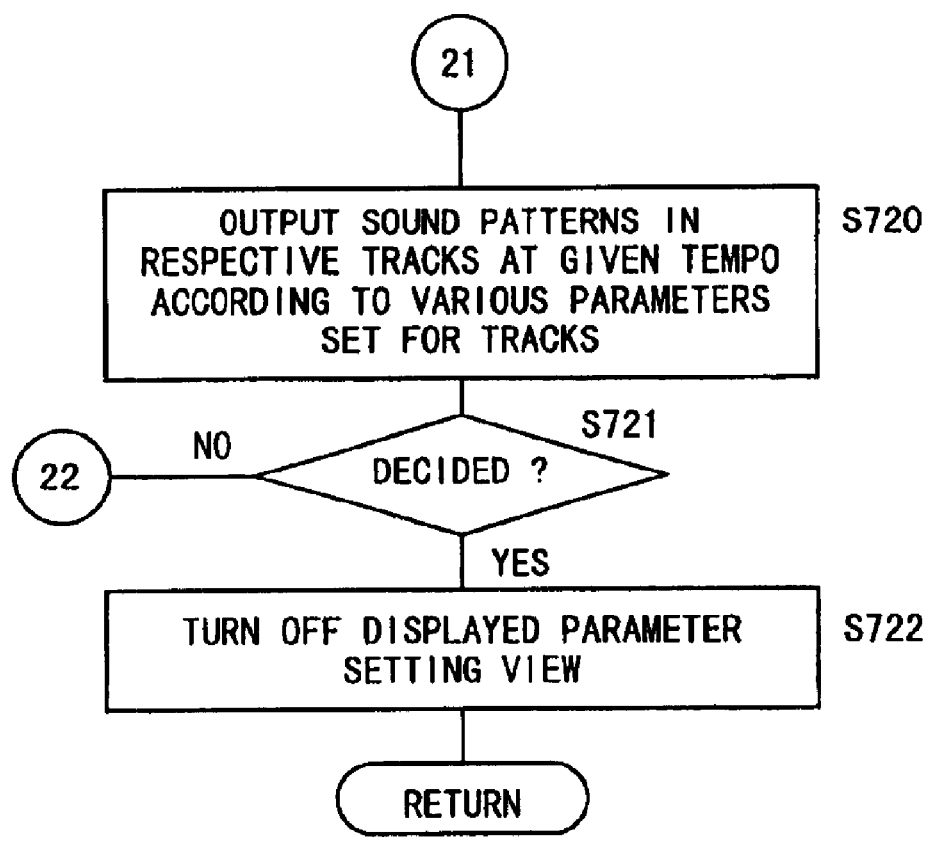

When any one of the above setting processes is finished, control goes to step S720 shown in FIG. 25 in which the sound pattern outputting means 362 outputs the sounds of sound patterns in the tracks at a given tempo according to various parameters set for the tracks.

In step S721, it is determined whether the changing of parameters has been decided or not based on whether the user has pressed the X button 112c or not.

If the changing of parameters has not been decided, then control goes back to step S702 shown in FIG. 24 to perform the process of setting parameters again. If the changing of parameters has been decided, then control goes to step S722 shown in FIG. 25 to turn off the parameter setting view that is being displayed. The processing sequence of the parameter changing means 316 is now ended. Then, control returns to step S12 shown in FIG. 14 to repeat the processing from step S12.

If the L2 button 114b has not been pressed in step S19 shown in FIG. 14, then control goes to step S21 in which determines whether there is a command request or not based on whether the selection button 42 of the manual controller 16 has been pressed or not. If the selection button 42 has not been pressed, then control goes to step S22 in which another process depending on the control input is carried out.

Figure 44:
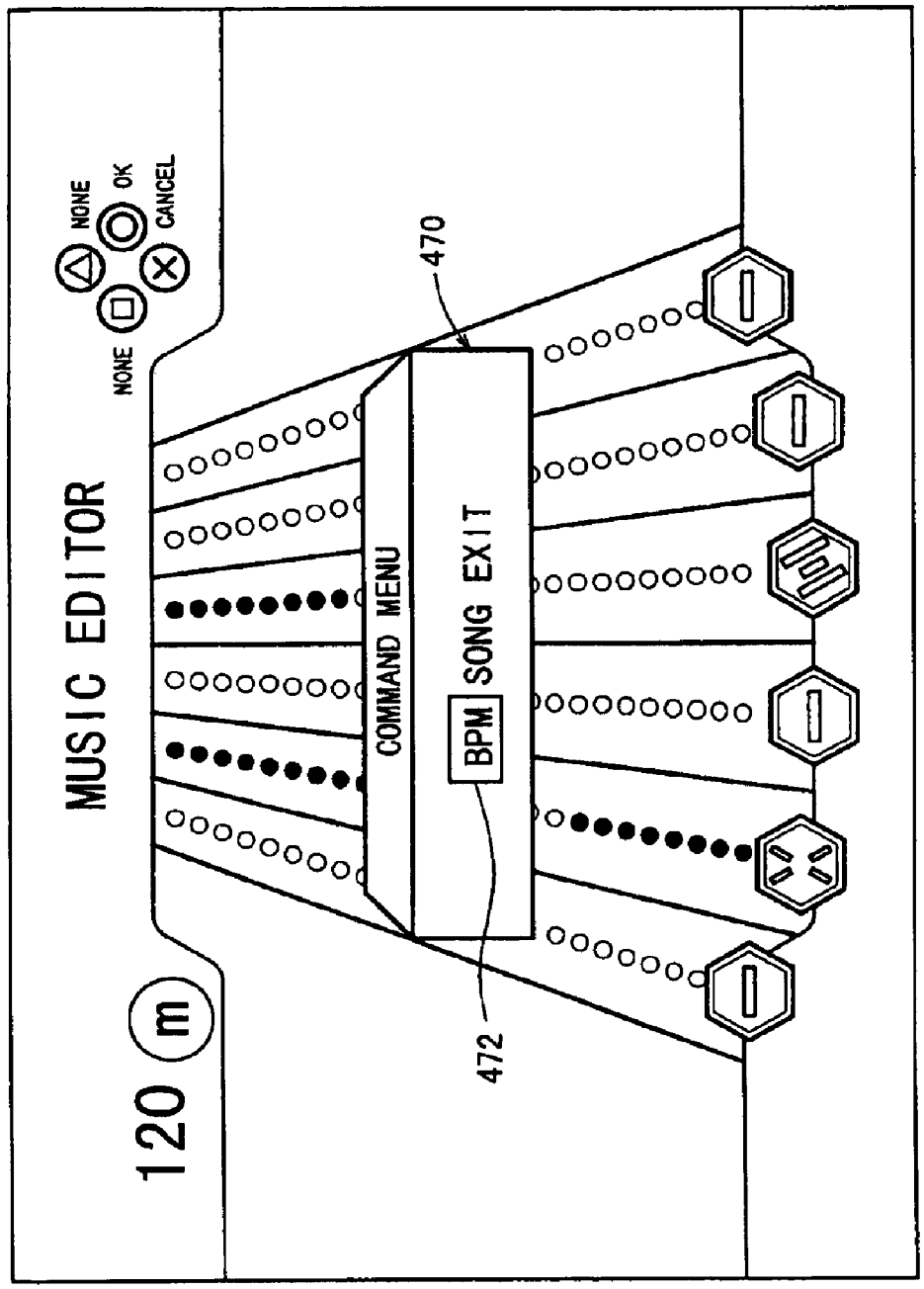
FIG. 44 is a view showing a command requesting view as a window view.
Figure 45:
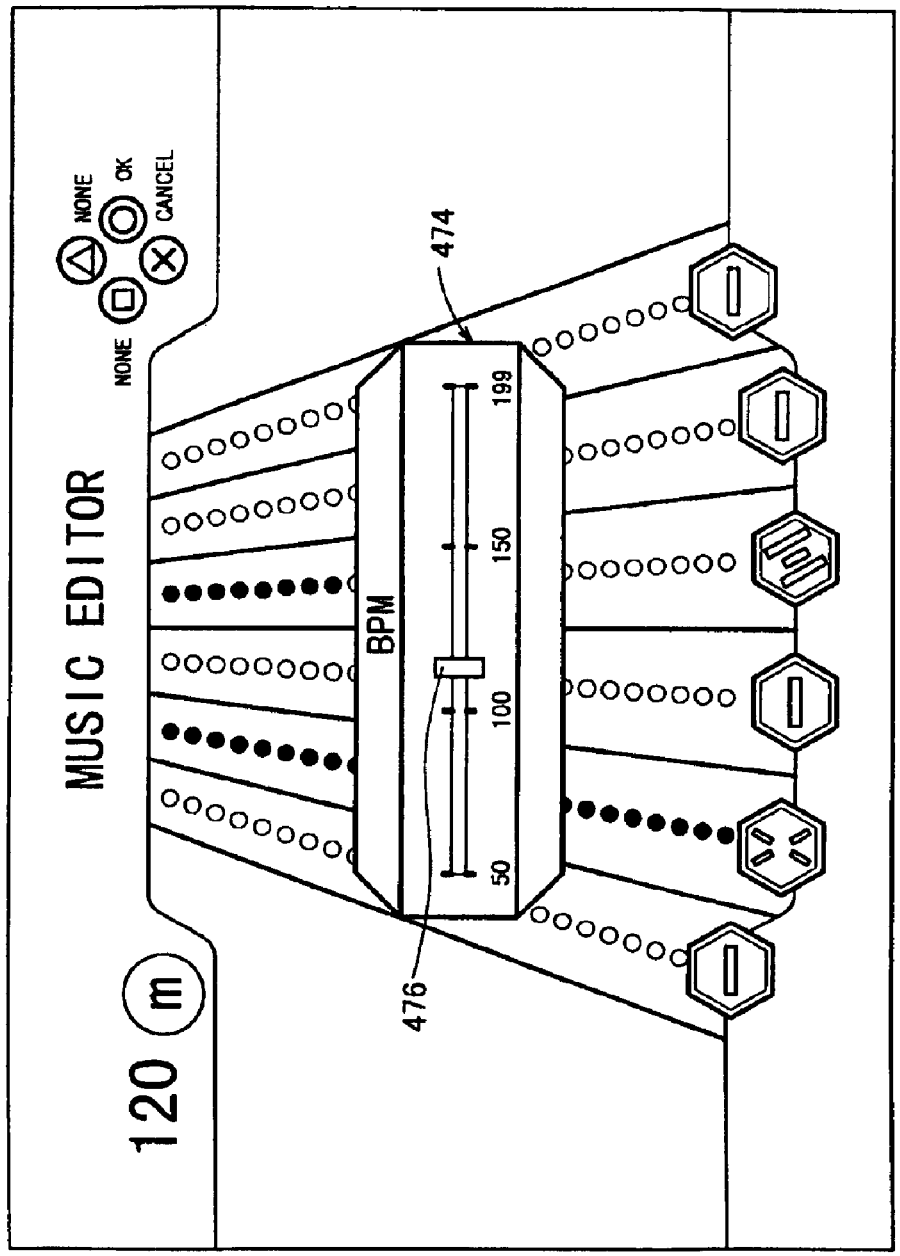
FIG. 45 is a view showing a tempo setting view as a window view.
Figure 46:
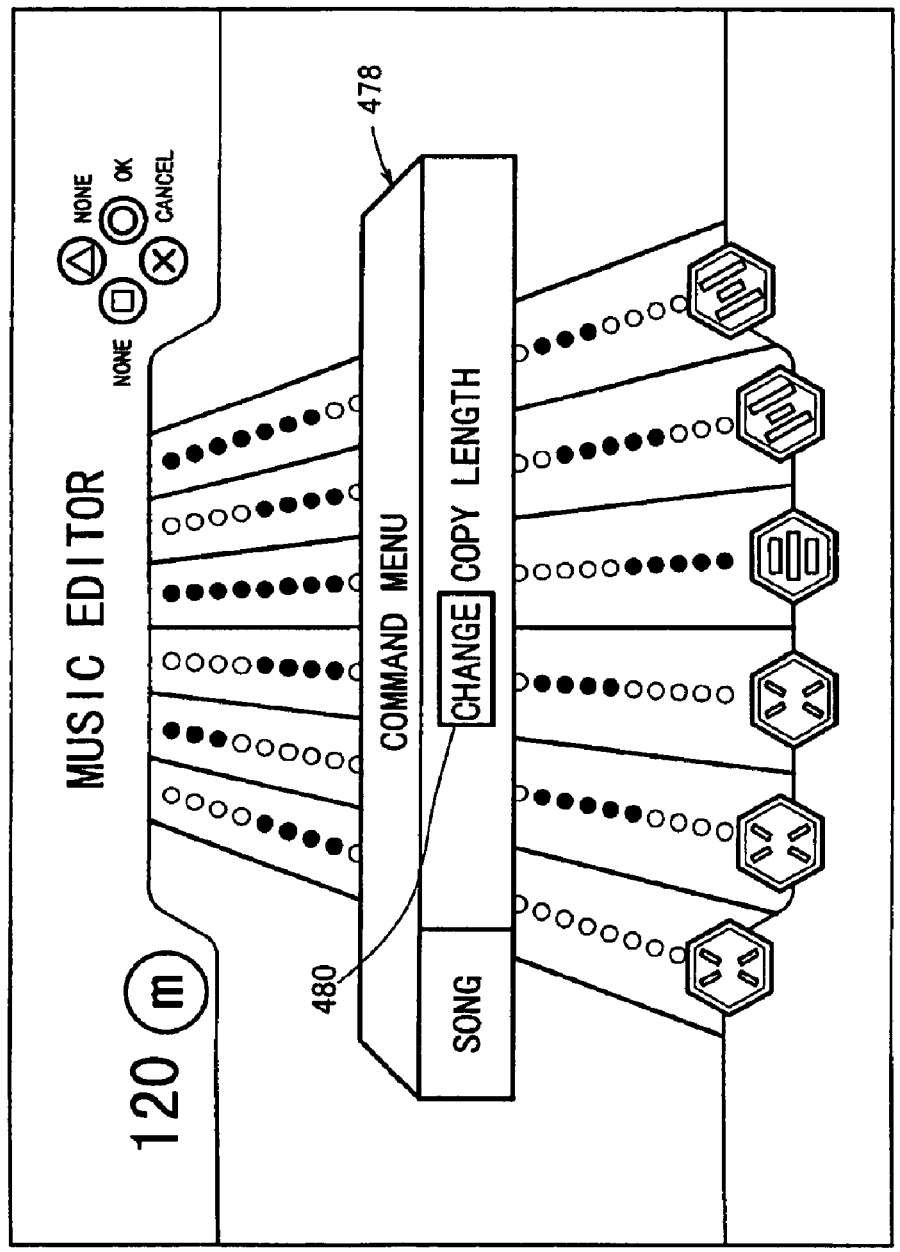
FIG. 46 is a view showing a music number setting view as a window view.

If the selection button 42 has been pressed, then control goes to step S23 shown in FIG. 15 in which the music editing means 300 displays a command requesting view 470 shown in FIG. 44. The command requesting view 470 is a window view displaying a horizontal array of three commands including the setting of a command (BPM), the setting of a music number (SONG), and an end (EXIT).

Then, the user selects a command in step S24 by pressing the left button 110d, the right button 110b, and the decision button 112d. Specifically, when the user presses the left button 110d and the right button 110b, a cursor 472 is moved, and when the user presses the decision button 112d, a command where the cursor 472 is positioned is selected.

In step S25, the music editing means 300 determines whether the selected command represents the setting of a tempo or not. If the selected command represents the setting of a tempo, then control goes to step S26 in which the tempo setting means 320 performs its own processing sequence.

Figure 26:
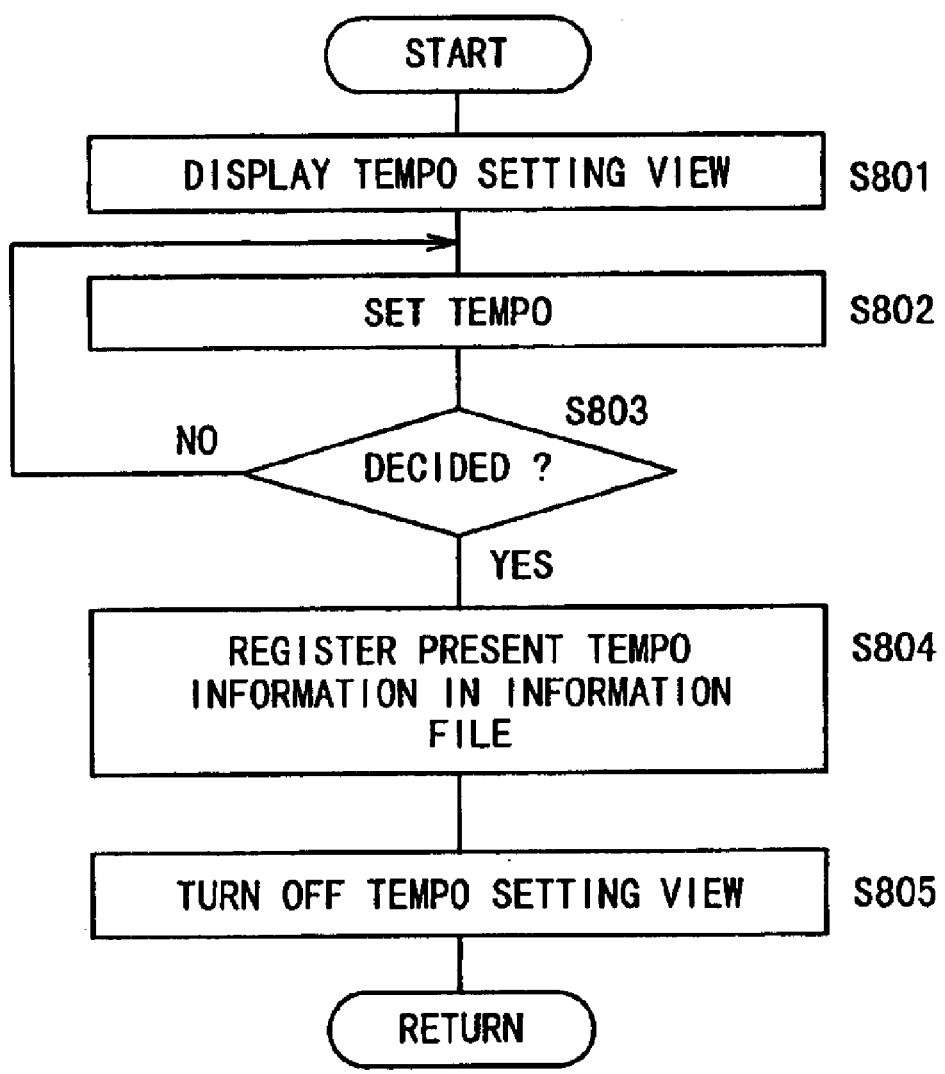
FIG. 26 is a flowchart of a processing sequence of a tempo setting means.

The processing sequence of the tempo setting means 320 is shown in FIG. 26. In step S801 shown in FIG. 26, the tempo setting means 320 displays a tempo setting view 474 shown in FIG. 45. The tempo setting view 474 is a window view displaying a horizontal graduated scale.

In step S802, the user sets a tempo by pressing the left button 110d, the right button 110b, and the decision button 112d. Specifically, when the user presses the left button 110d and the right button 110b, a pointer 476 moves along the graduated scale, and when the user presses the decision button 112d, a tempo at the spot on the graduated scale where the pointer 476 is positioned is set. In the example shown in FIG. 45, a tempo of "120" is set.

In step S803, the tempo setting means 320 determines whether a tempo has been set or not based on whether the user has pressed the decision button 112d or not. If a tempo has not been set, then control goes back to step S802 to perform the above tempo setting process again.

If a tempo has been set, then the sound pattern registering means 360 register the information of the set tempo in the information file 352 in step S804. In step S805, the tempo setting means 320 turns off the tempo setting view 474, after which the processing sequence of the tempo setting means 320 is ended.

Then, control returns to the main routine shown in FIG. 15. In step S27 shown in FIG. 15, the music editing means 300 determines whether the selected command represents the setting of a music number or not. If the selected command represents the setting of a music number, then control goes to step S28 in which the music number setting means 322 performs its own processing sequence.

Figure 27:
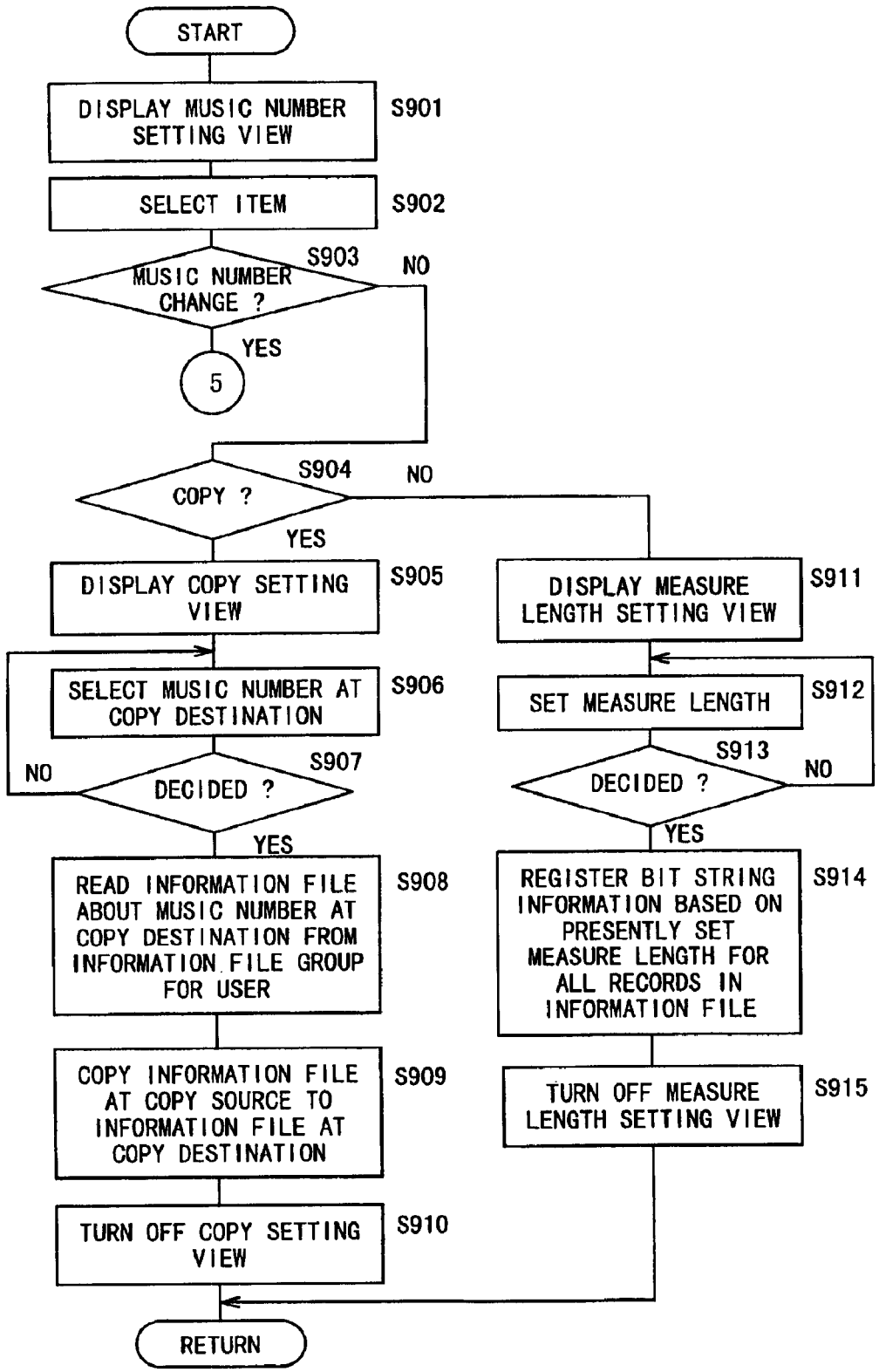
FIG. 27 is a flowchart of a processing sequence of a music number setting means.

The processing sequence of the music number setting means 322 is shown in FIG. 27. In step S901 shown in FIG. 27, the music number setting means 322 displays a music number setting view 478 shown in FIG. 46. The music number setting view 478 is a window view displaying a horizontal array of three items. These three items represent changing of music numbers (CHANGE), copying of a music number (COPY), and a measure length (LENGTH).

In step S902, the user selects one of the three items by pressing the up button 110a, the down button 110c, and the decision button 112. Specifically, when the user presses the up button 110a and the down button 110b, a cursor 480 is moved, and when the user presses the decision button 112d, an item where the cursor 480 is positioned is selected.

Figure 47:
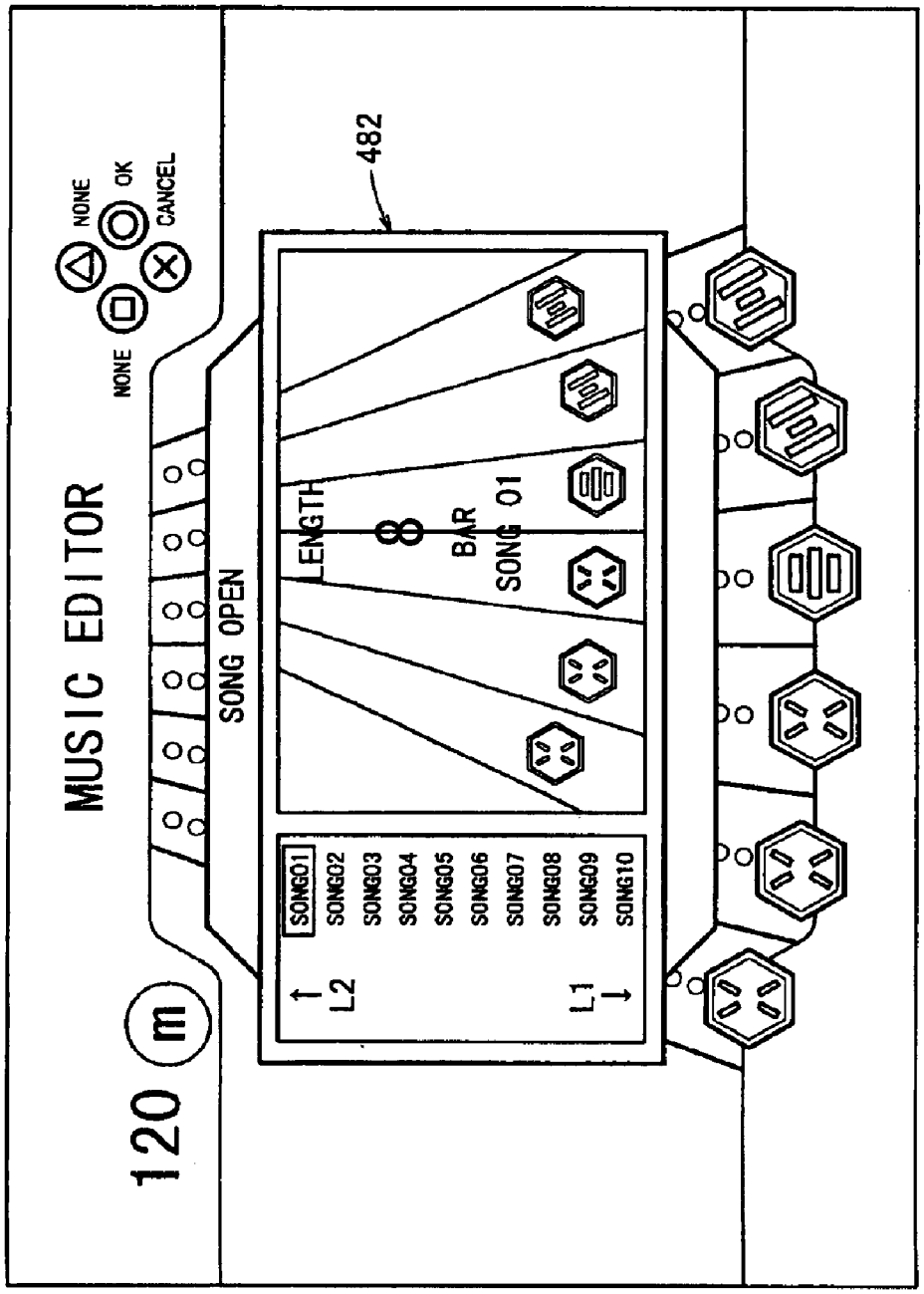
FIG. 47 is a view showing a music number changing view as a window view.

In step S903, the music number setting means 322 determines whether the selected item represents the changing of music numbers or not. If the selected item represents the changing of music numbers, then the music number changing means 340 performs its processing sequence. Control goes to step S3 shown in FIG. 13 to repeat the processing from step S3. Specifically, the music number setting means 322 displays a music number changing view 482 which is essentially the same as the music number selecting view 408 (see FIG. 29), as shown in FIG. 47. Specific details of the music number changing process are identical to those of the processing from step S3 described above, and will not be dew scribed below.

If the selected item does not represent the changing of music numbers in step S903, then control goes to step S904 in which the music number setting means 322 determines whether the selected item represents the copying of a music number or not. If the selected item represents the copying of a music number, then the music number copying means 342 performs its processing sequence.

The processing sequence of the music number copying means 342 will be described below. In step S905 shown in FIG. 27, the music number copying means 342 displays a copy setting view (not shown). Then, in step S906, the user selects a music number as a copy destination by pressing the L1 button 114a and the L2 button 114b.

In step S907, the music number copying means 342 determines whether a copy destination has been decided or not. If a copy destination has not been decided, then control goes back to step S906 to select a copy destination again. If a copy destination has been decided, then control goes to step S908 in which the music number copying means 342 reads an information file 352 relative to the music number at the copy destination from the information file group 350 for the user.

In step S909, the sound pattern registering means 360 copies the information file 352 at a copy source to the information file 352 at the copy destination. Thereafter, in step S910, the music number copying means 342 turns off the copy setting view. The processing sequence of the music number copying means 342 is now ended.

Figure 48:
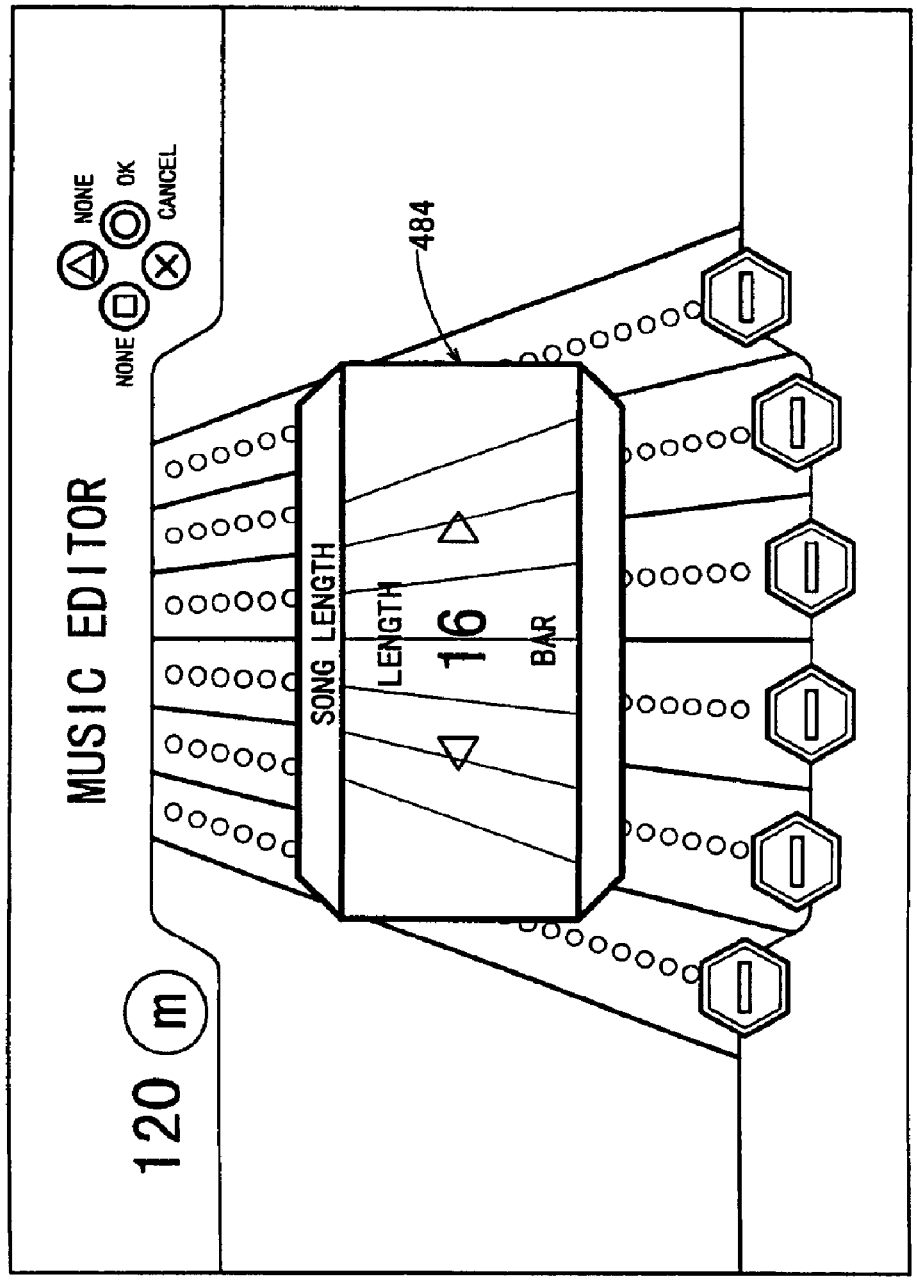
FIG. 48 is a view showing a measure length setting view as a window view.

If the selected item does not represent the copying of a music number in step S904, then the measure length setting means 306 performs its processing sequence. The processing sequence of the measure length setting means 306 will be described below. In step S911, the measure length setting means 306 displays a measure length setting view 484 shown in FIG. 48. The measure length setting view 484 is a window view displaying a number that represents a measure length.

In step S912, the user sets a measure length by pressing the left button 110d, the right button 110b, and the decision button 112d.

In step S913, the measure length setting means 306 determines whether a measure length has been decided or not based on whether the user has pressed the decision button 112d or not. If a measure length has not been decided, then control goes back to step S912 to set a measure length again.

If a measure length has been decided, control goes to step S914 in which the sound pattern registering means 360 registers bit string information based on the presently set measure length in the bit string information in all the records in the information file 352. Thereafter, in step S915, the measure length setting means 306 turns off the measure length setting view 484. The processing sequence of the measure length setting means 306 is now ended.

After step S910 or step S915, the processing sequence of the music number setting means 322 is ended. Control returns to step S12 shown in FIG. 14 to repeat the processing from step S12.

Control goes back to the main routine shown in FIG. 15. If the selected command does not represent the setting of a music number in step S27, i.e., if the selected command represents an end command, then control goes to step S29 in which the music editing means 300 transfers the present information file 352 to the information file group 350 for the user. The processing sequence of the music editing means 300 is now brought to an end.

Next, the sound presentation trial processing means 1000 will be described with reference to FIGS. 49 through 62.

Figure 53:
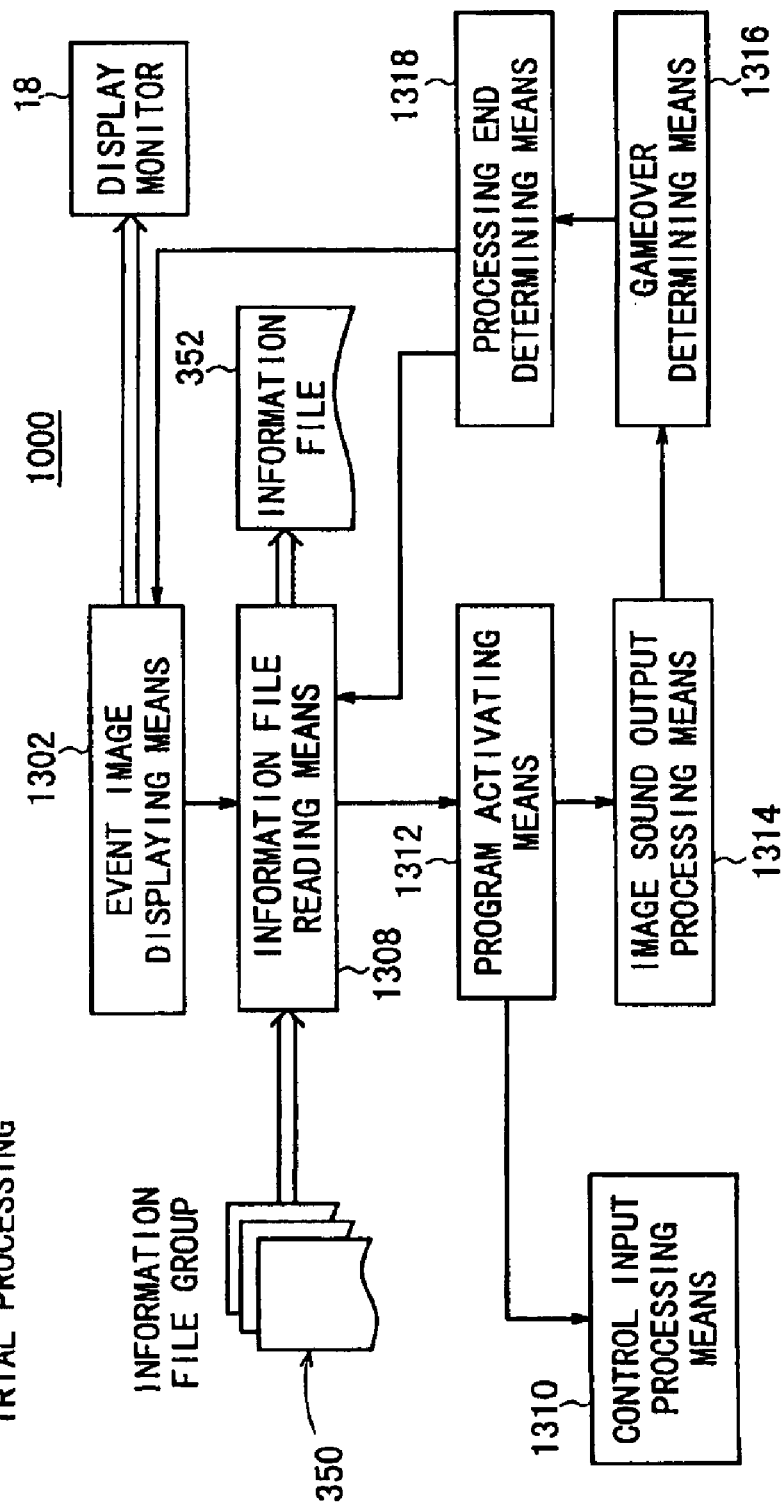
FIG. 53 is a functional diagram of a sound presentation trial processing means.

As shown in FIG. 53, the sound presentation trial processing means 1000 comprises an event image displaying means 1302 for displaying an image of an event depending on each scene on the display monitor 18, an information file reading means 1308 for reading an information file 352 from an information file group 350, a program activating means 1312 for activating a control input processing means 1310, an image sound output processing means 1314 for changing the image of the object 1200 when the acquisition of the object 1200 is detected and outputting a sound according to a predetermined control action, a gameover determining means 1316 for determining whether gameover processings have been performed or not, and a processing end determining means 1318 for determining whether various processings have been ended or not.

Figure 54:
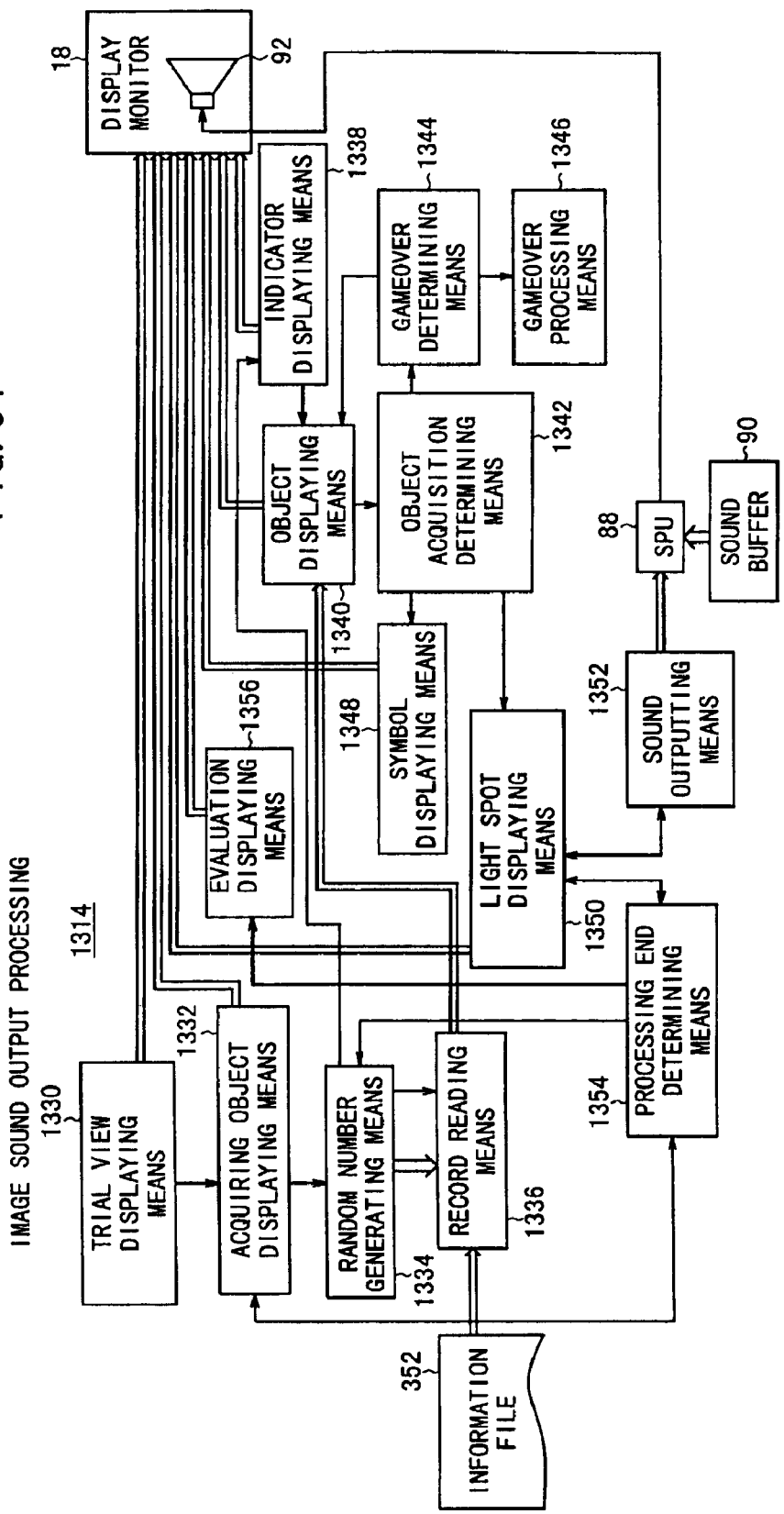
FIG. 54 is a functional diagram of an image sound output processing means.

As shown in FIG. 54, the image sound output processing means 1314 comprises a trial view displaying means 1330 for displaying a trial view 1204 to acquire the object 1200 to present a sound, an acquiring object displaying means 1332 for displaying an acquiring object 1206 in the trial view 204, a random number generating means 1334 for determining a track where the object 1200 is to appear, a record reading means 1336 for reading a record from the information file 352, an indicator displaying means 1338 for displaying an indicator image 1220 that represents the coming of the object 1200, an object displaying means 1340 for displaying the image of the object 1200 on the determined track, an object acquisition determining means 1342 for determining whether the object 1200 has been acquired or not, a gameover determining means 1344 for determining whether a gameover is reached or not, and a gameover processing means 1346 for displaying an image indicative of a gameover, for example.

The image sound output processing means 1314 also comprises a symbol displaying means 1348 for displaying a symbol image indicative of a sound pattern assigned to the object 1200 which has been acquired, in the corresponding symbol display area, a light spot displaying means 1350 for displaying a string of ON bits, i.e., bits "1", related to the acquired object 1200, i.e., a related string of bits, in relative motion as a string of light spots 1222, a sound outputting means 1352 for outputting a sound assigned to light spots 1222 (bits) that have reached the acquiring object 1206, a processing end determining means 1354 for determining whether various processings have been ended or not, and an evaluation displaying means 1356 for displaying an evaluation about a present trial.

Figure 55:
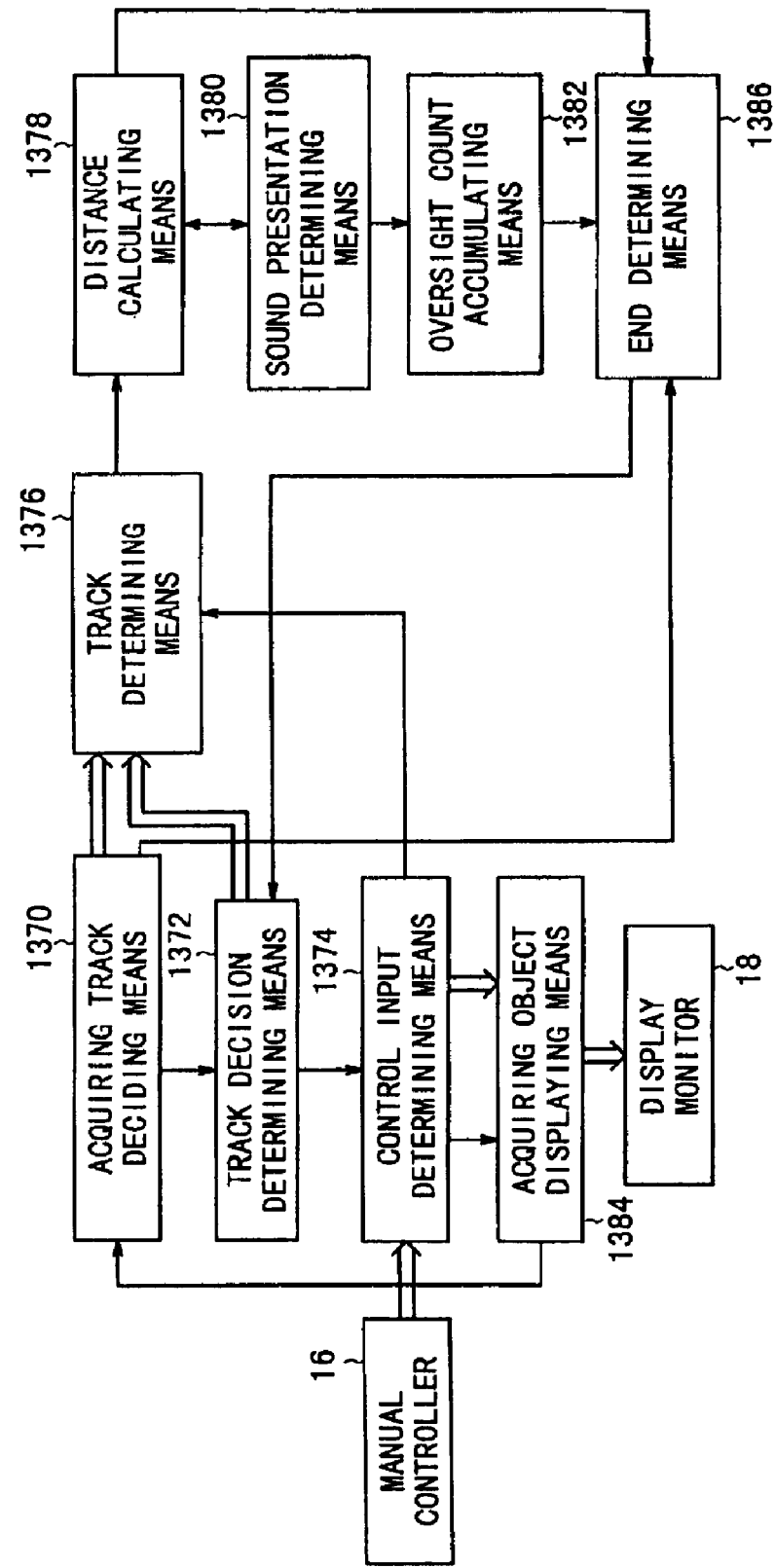
FIG. 55 is a functional diagram of a control input processing means.

As shown in FIG. 55, the control input processing means 1310 that is activated via the sound presentation trial processing means 1000 comprises an acquiring track deciding means 1370 for deciding a track on which the acquiring object 1206 is moving, a track decision determining means 1372 for determining whether a track on which the object 1200 is coming has been decided or not, a control input determining means 1374 for determining a control input from the manual controller 16, a track determining means 1376 for determining agreement between the track on which the acquiring object 1206 is moving and the track on which the object 1200 is coming, a distance calculating means 1378 for calculating the distance between the acquiring object 1206 and an object 1200 that is closest to the acquiring object 1206, a sound presentation determining means 1380 for determining whether a condition to present a sound has been satisfied or not, an oversight count accumulating means 1382 for accumulating an oversight count to decide a gameover, an acquiring object displaying means 1384 for displaying the acquiring object 1206 in motion based on control inputs from direction buttons (including the joysticks 44, 46), and an end determining means 1386 for determining an end request for the control input processing means 1310.

The control input processing means 1310 operates in a multitasking fashion under the management of the sound presentation trial processing means 1000.

A processing sequence of the sound presentation trial processing means 1000 will be described below with reference to FIGS. 56 through 62.

Figure 56:
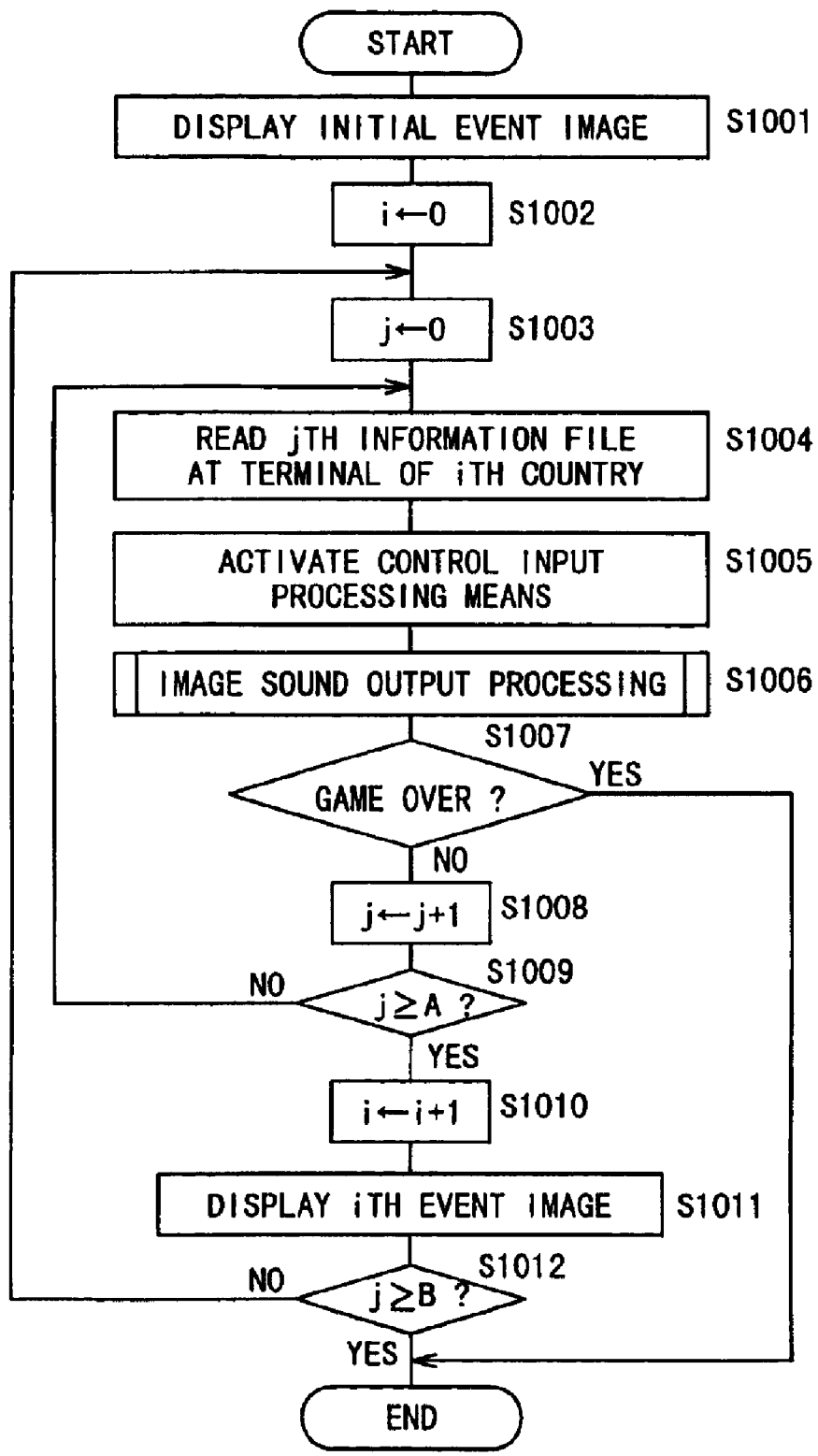
FIG. 56 is a flowchart of a processing sequence of the sound presentation trial processing means.

In step S1001 shown in FIG. 56, the sound presentation trial processing means 1000 displays an initial event image on the display monitor 18. The initial event image comprises images such as an image for guidance to the terminal of a first country, an image for guidance to music composed by a user, and an explanation of how to use the manual controller 16.

In step S1002, the sound presentation trial processing means 1000 stores an initial value "0" in an index register i used to retrieve terminals, thus initializing the index register i. In step S1003, the sound presentation trial processing means 1000 stores an initial value "0" in an index register j used to update a trial count in each terminal, thus initializing the index register J.

In step S1004, the information file reading means 1308 reads an information file 352. Specifically, if the terminal (the image for guidance to the terminal of the first country) in the initial event image is selected by the user, for example, a jth information file of the ith country's terminal in the optical disk 20, i.e., an information file corresponding to an address of an matrix determined by i×j is read by the information reading means 1308. If the user's music (the image for guidance to music composed by a user) is selected by the user, for example, an information file corresponding to an address of an matrix determined by i×j is read by the information reading means 1308 from the user's information file group 350 stored in the memory card 14.

In step S1005, the program activating means 1312 activates the control input processing means 1310. In step S1006, the image sound output processing means 1314 performs its own processing sequence.

The processing sequence of the image sound output processing means 1314 will be described below with reference to FIGS. 57 through 60.

Figure 57:
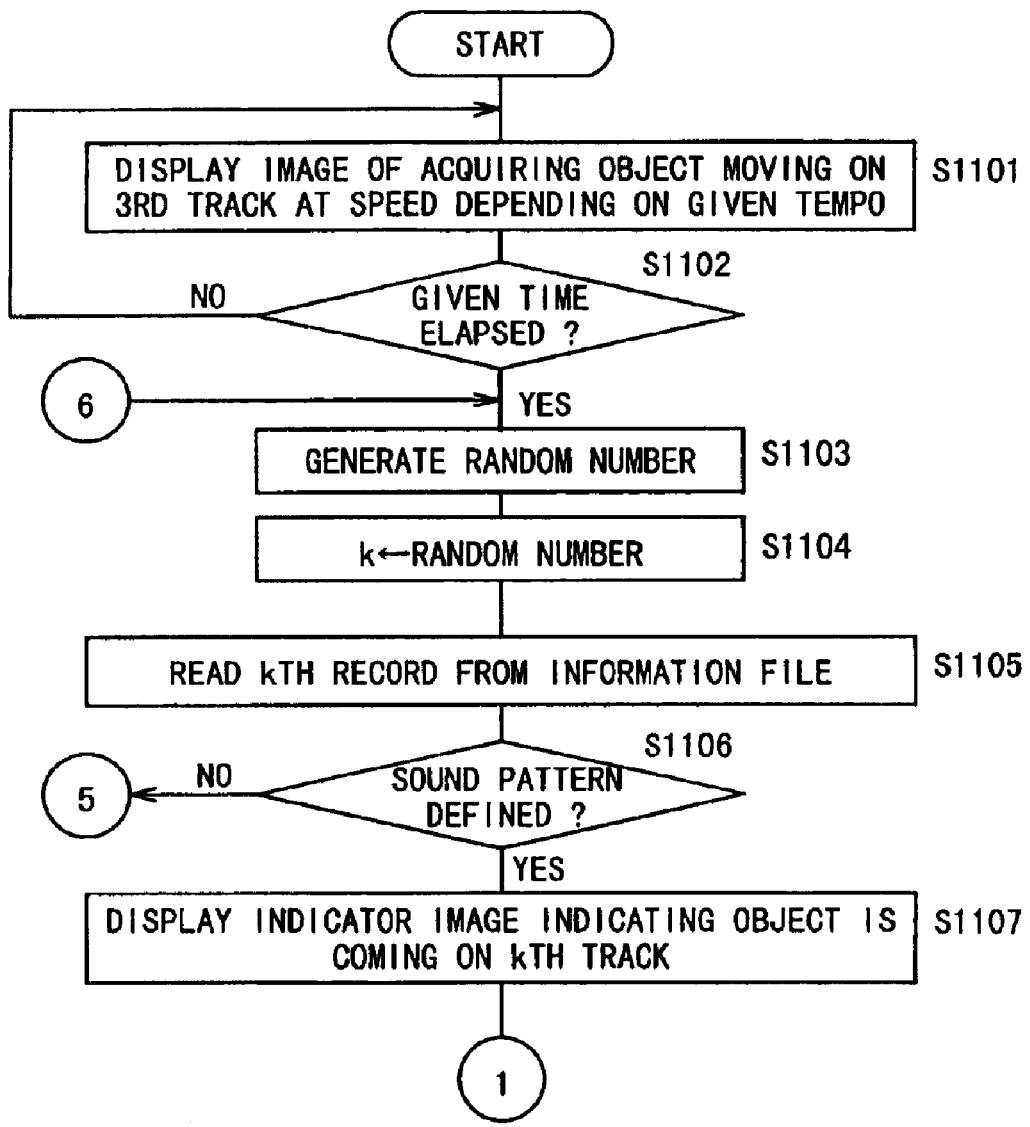
FIGS. 57 through 60 are a flowchart of a processing sequence of image sound output processing means.

In step S1101 shown in FIG. 57, the trial view displaying means 1330 displays a trial view 1204 including a track group 1202 of six tracks T1–T6 on the display monitor 18, and the acquiring object displaying means 1332 displays an image in which an acquiring object 1206 is moving on one track, e.g., the third track T3, at a speed depending on a preset tempo, in the trial view 1204. Information relative to the tempo is registered in the leading end of the information file 352 that has been read.

In step S1102, the image sound output processing means 1314 determines whether a predetermined time, e.g., 2 seconds, has elapsed or not. If the predetermined time has elapsed, control goes to step S1103 in which the random number generating means 1334 generates a random number with respect to a track number which has not been decided, of the track numbers "1"–"6".

In step S1104, the image sound output processing means 1314 stores the generated random number in an index register k used to retrieve records in the information file 352. In step S1105, the record reading means 1336 reads a kth record from the information file 352.

In step S1106, the image sound output processing means 314 determines whether the contents of the read kth record are valid or invalid, i.e., whether a sound pattern is defined in the track corresponding to the read kth record or not.

If a sound pattern is defined in the track, then control proceeds to step S1107 in which the indicator displaying means 1338 displays an indicator image 1220 indicating that the object 1200 is coming on the kth track, as shown in FIG. 49. In the example shown in FIG. 49, the indicator image 1220 is displayed on the fourth track T4.

Figure 58:
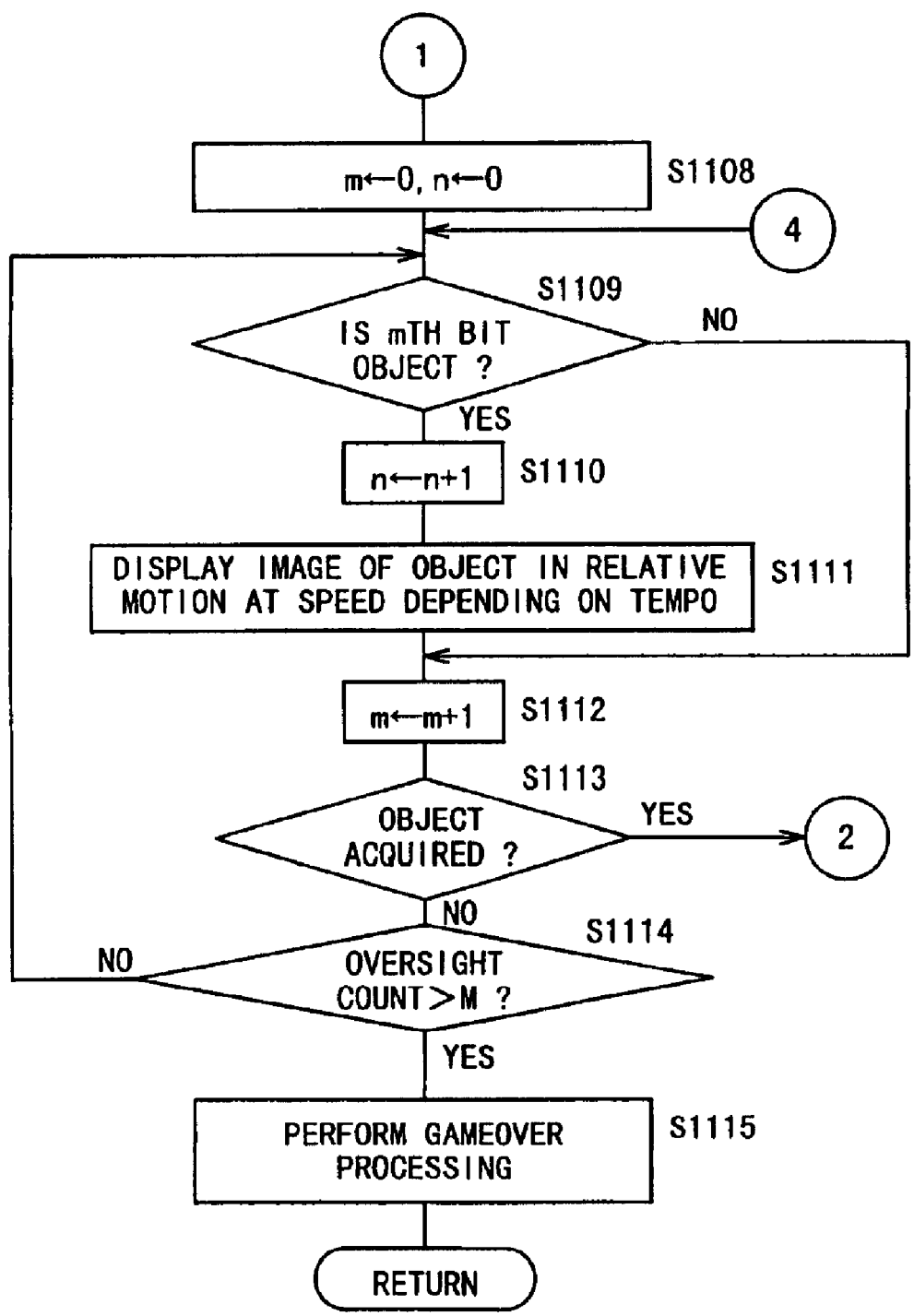
Figure 59:
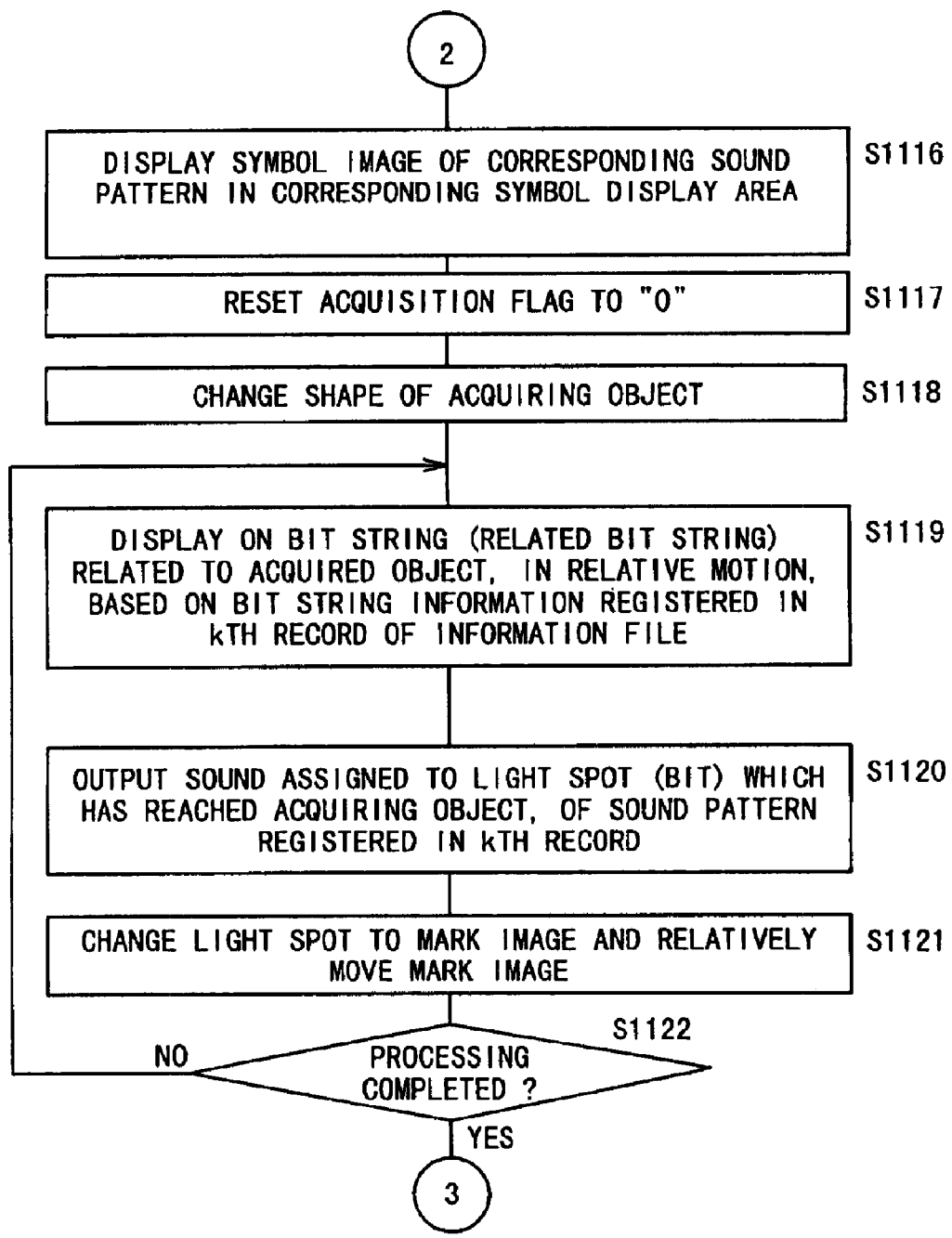

In step S1108 shown in FIG. 58, the image sound output processing means 1314 stores an initial value "0" in each of an index register m used to retrieve bit strings and an index register n used to retrieve objects 1200, thereby initializing these index registers m, n.

In step S1109, the object displaying means 1340 determines whether an mth bit of the bit string information registered in the present record is related to the object 1200 or not, by determining whether the value of the index register m agrees with one of the bit information of the object 1200 registered in the record.

If the mth bit of the bit string information is related to the object 1200, then control goes to step S1110 in which the image sound output processing means 1314 increments the value of the index register n by +1. In step S1111, the object displaying means 1340 displays the image of the object 1200 in relative motion at a speed depending on the preset tempo.

After the processing in step S1111 or if the mth bit of the bit string information is not related to the object 1200 in step S1109, then control goes to step S1112 in which the image sound output processing means 1314 increments the value of the index register m by +1.

In step S1113, the object acquisition determining means 1342 determines whether the object 1200 has been acquired or not, based on an acquisition flag. When the object 1200 is acquired, the acquisition flag is set to "1" by the control input processing means 1310.

If the acquisition flag is not set to "1" and hence the object 1200 is not acquired, then control goes to step S1114 in which the gameover determining means 1344 determines whether an oversight count, i.e., the number of times an object is overlooked, has exceeded a predetermined value M, e.g., "5", or not.

If the oversight count has exceeded the predetermined value M, then control goes to step S1115 in which the gameover processing means 1346 performs various gameover processings, e.g., deletes the trial view 1204 and displays a gameover image.

If the oversight count is smaller than the predetermined value M, then control goes back to step S1109 for processing a next bit. If an object is acquired in step S1113, then control goes to step S1116 shown in FIG. 59. In step S1116, the symbol displaying means 1348 displays a symbol image indicative of a sound pattern assigned to the track in the corresponding symbol display area as shown in FIG. 51.

In the example shown in FIG. 51, the object 1200 relatively moving on the fourth track T4 is acquired, displaying the symbol image 1212 indicative of a chord sound pattern in the symbol display area S4 which corresponds to the fourth track T4.

In step S1117, the image sound output processing means 1314 resets the acquisition flag to "0". Thereafter, in step S1118, the acquiring object displaying means 1332 changes the shape of the acquiring object 1206 as shown in FIG. 51.

In step S1119, the light spot displaying means 1350 displays a string of ON bits, i.e., bits "1", of the bit string information registered in the kth record in the information file 352, related to the acquired object 1200, i.e., a related string of bits, in relative motion as a string of light spots 1222.

In step S1120, the sound outputting means 1352 outputs the sound pattern number registered in the kth record in the information file 352 to the SPU 88, and instructs the SPU 88 to output a corresponding sound for a period indicated by the bits corresponding to the light spots 1222 acquired by the acquiring object 1206, of the bit string information.

When the SPU 88 receives the sound pattern number, the SPU 88 reads a corresponding sound pattern from the sound buffer 90. Then, the SPU 88 outputs the read sound pattern at a rate depending on the preset tempo to the speaker 92 for a period indicated by the bits acquired by the acquiring object 1206, of the bit string information.

In step S1121, the light spot displaying means 1350 displays light spots 1222 that have reached the acquiring object 1206 as being changed to elliptical or lozenge mark images 1224, as indicated on the tracks T2, T5 in FIG. 51.

In step S1122, the processing end determining means 1354 determines whether a processing on the related bit string with respect to the presently acquired object 1200 has been ended or not. If not ended, control goes back to step S1112 in which light spots 1222 and mark images 1224 for a next bit are displayed.

Figure 60:
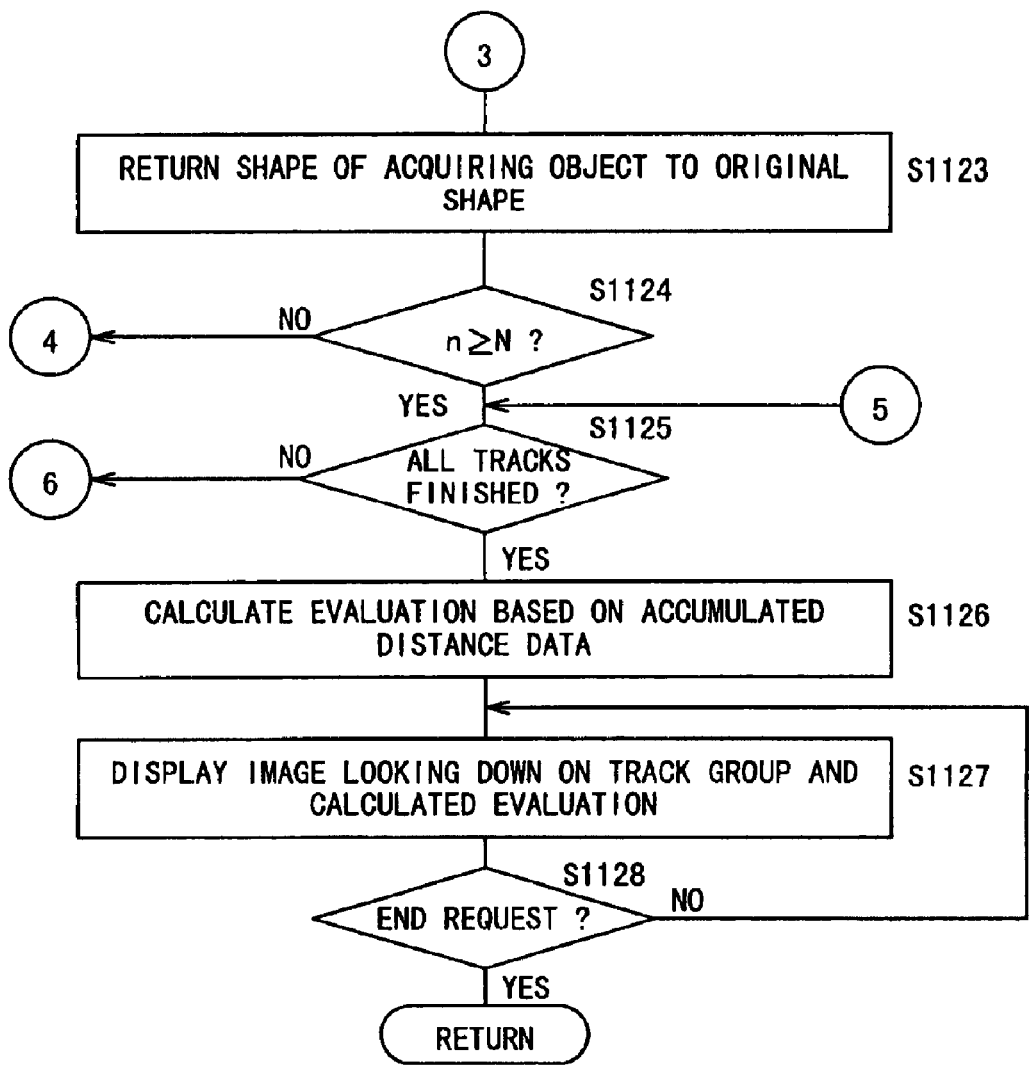

If the processing on the related bit string has been ended, then control goes to step S1123 shown FIG. 60. In step S1123, the acquiring object displaying means 1332 returns the shape of the acquiring object 1206 to its original shape, as shown in FIG. 49.

In step S1124, the processing end determining means 1354 determines whether the processing has been ended for all the objects 1200 or not, based on whether or not the value of the index register n is equal to or greater than the number of objects 1200 registered in the record.

If the processing has not been ended for all the objects 1200, then control goes back to step S1109 shown in FIG. 58 to process a next object 1200. If the processing has been ended for all the objects 1200, or if the record is invalid in step S1106 shown in FIG. 57, then control goes to step S1125 shown in FIG. 60 in which the processing end determining means 1354 determines whether the processing has been ended for all the tracks T1–T6 or not.

If the processing has not been ended for all the tracks T1–T6, then control returns to step S1103 shown in FIG. 57 to process a next track. If the processing has been ended for all the tracks T1–T6, then control proceeds to step S1126 in which the evaluation displaying means 1356 calculates a present evaluation based on accumulated distance data. The evaluation is higher as the accumulated distance is shorter.

In step S1127, the evaluation displaying means 1356 displays an image looking down on the track group 1202 and the calculated evaluation. At this time, the acquiring object 1206 is displayed in a color depending on the evaluation. For example, the acquiring object 1206 is displayed in green if the evaluation ranges from 100% to 76%, yellow if the evaluation ranges from 75% to 51%, red if the evaluation ranges from 50% to 26%, and gray if the evaluation ranges from 25% to 0%.

In step S1128, the processing end determining means 1354 determines whether there is an end request to end the display of the evaluation. If there is no end request, then control goes back to step S1127 to repeat the display of the evaluation. If there is an end request, then the processing sequence of the image sound output processing means 1314 is finished.

A processing sequence of the control input processing means 1310 will be described below with reference to FIGS. 55, 61, and 62.

Figure 61:
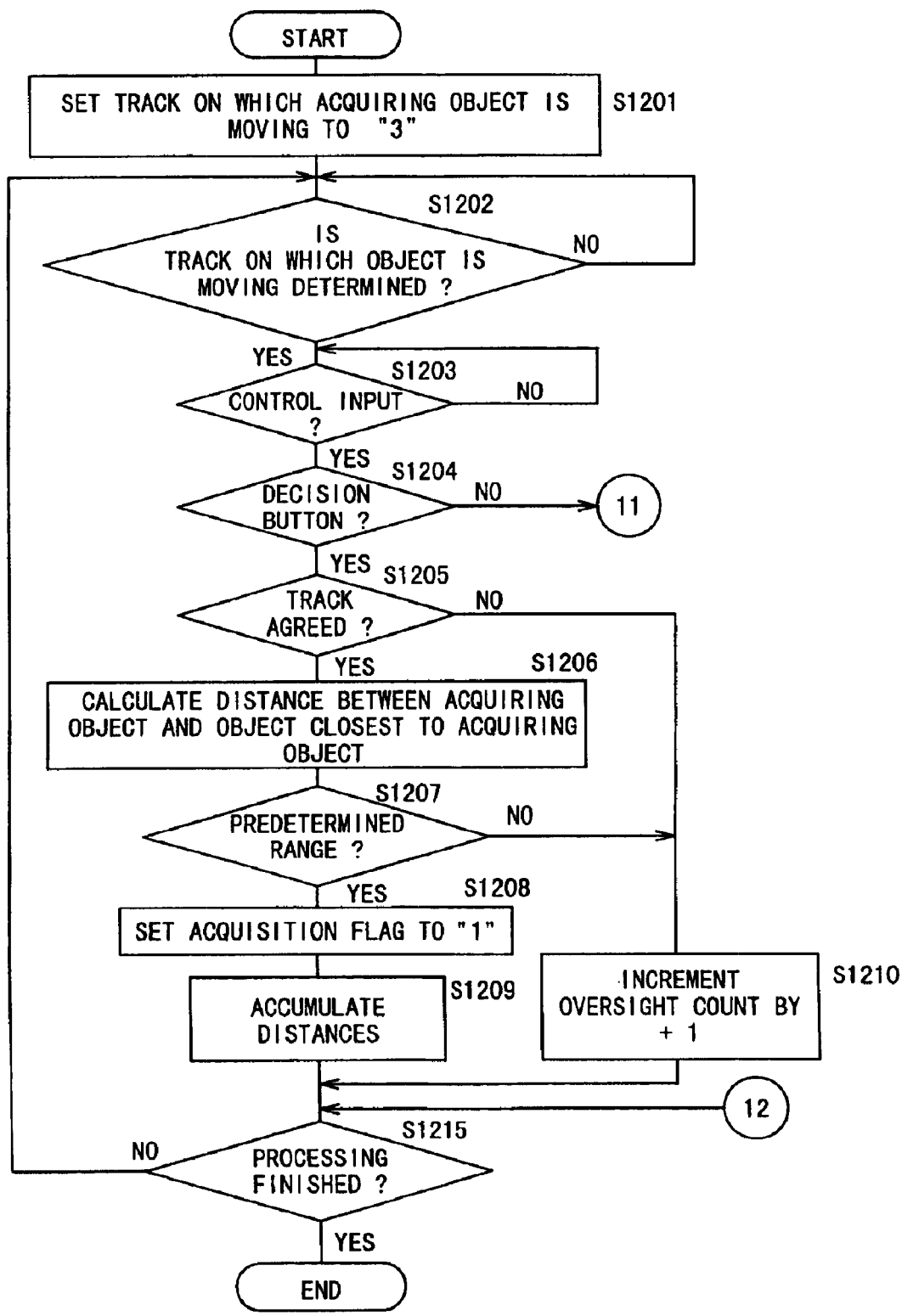
FIGS. 61 and 62 are a flowchart of a processing sequence of the control input processing means.

In step S1201 shown in FIG. 61, the acquiring track deciding means 1370 sets the number of a track on which the acquiring object 1206 moves to "3".

In step S1202, the track decision determining means 1372 determines whether a track on which the object 1200 is positioned has been decided or not. Such a track is decided in step S1103 carried out by the image sound output processing means 1314.

If a track is decided, control proceeds to step S1203 in which the control input determining means 1374 determines whether there is a control input from the manual controller 16 or not. If there is a control input from the manual controller 16, then control goes to step S1204 in which the control input determining means 1374 determines whether the control input comes from the decision button 112d or not.

If the control input comes from the decision button 112d, then control goes to step S1205 in which the track determining means 1376 determines whether the track on which the acquiring object 1206 is moving is in agreement with the track on which the object 1200 is positioned or not.

If these tracks agree with each other, then control goes to step S1206 in which the distance calculating means 1378 calculates the distance between the acquiring object 1206 and an object 1200 that is closest to the acquiring object 1206 at the time the decision button 112d is pressed.

In step S1207, the sound presentation determining means 1380 determines whether a condition to present a sound has been satisfied or not, based on whether the calculated distance falls in a predetermined range or not.

If the calculated distance falls in the predetermined range, then control goes to step S1208 in which the control input processing means 1310 sets the acquisition flag to "1". In step S1209, the distance calculating means 1378 accumulates the distances calculated so far.

If the calculated distance does not fall in the predetermined range in step S1207, or if the track on which the acquiring object 1206 is moving is not in agreement with the track on which the object 1200 is positioned in step S1205, then control goes to step S1210 in which the oversight count accumulating means 1382 increments the oversight count by +1.

Figure 62:
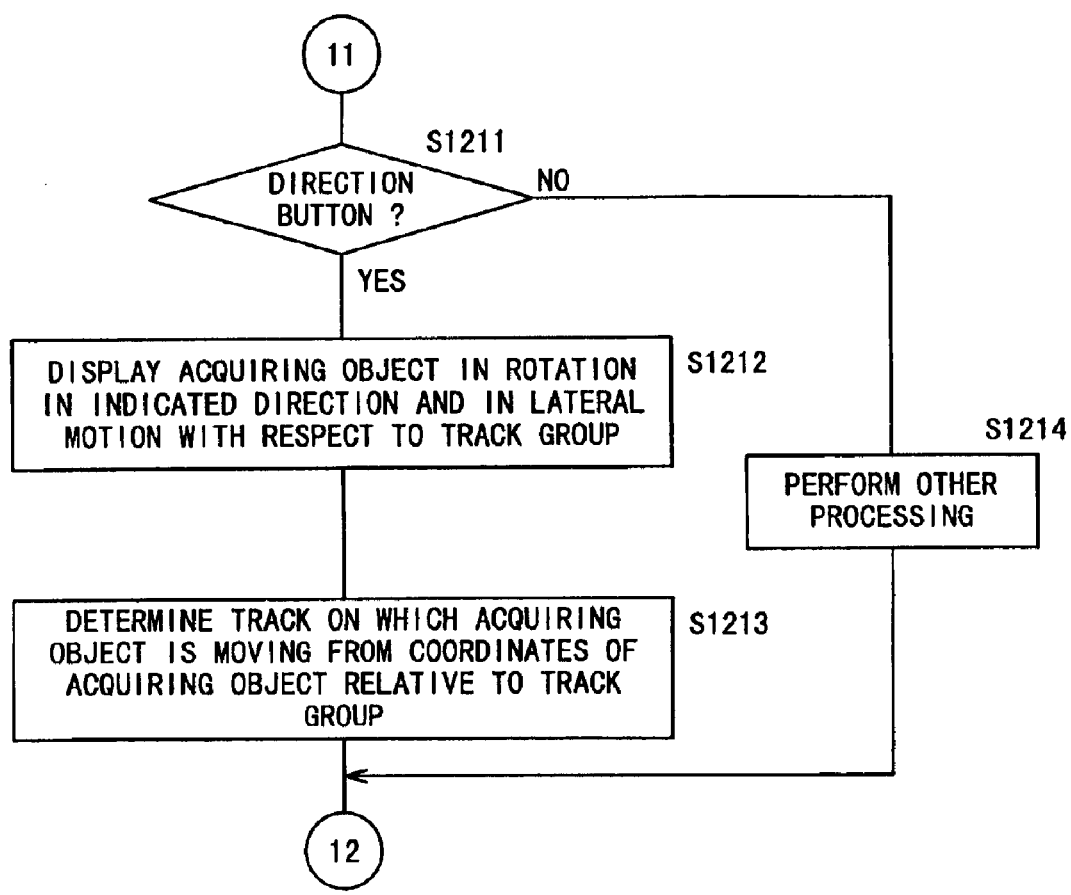

If the control input does not come from the decision button 112d in step S1204, then control goes to step S1211 shown in FIG. 62 in which the control input determining means 1374 determines whether the control input comes from any one of the direction buttons (including the joysticks 44, 46 and the control members 110a–110d) or not.

If the control input comes from a direction button, then control goes to step S1212 in which the acquiring object displaying means 1384 displays the acquiring object 1206 while the acquiring object 1206 is being rotated in a direction corresponding to the pressed direction button and moved laterally relatively to the track group 1202.

In step S1213, the acquiring track deciding means 1370 decides a track on which the acquiring object 1206 is moving from the coordinates of the acquiring object 1206 relative to the track group 1202.

If the control input does not come from any one of the direction buttons in step S1211, then control goes to step S1214 in which the control input processing means 1310 performs a processing based on the control input.

After the processing in step S1209, the processing in step S1210, the processing in step S1213, or the processing in step S1214, control goes to step S1215 (see FIG. 61) in which the end determining means 1386 determines there is an end request for the control input processing means 1310. If there is no end request, then control returns to step S1202 to repeat the processing from step S1202.

If there is an end request in step S1215, the processing sequence of the control input processing means 1310 is finished.

Referring back to the main routine shown in FIG. 56, the gameover determining means 1316 determines in step S1007 whether a gameover is reached for the present trial or not, based on whether the image sound output processing means 1314 has performed various gameover processings in step S1115 shown in FIG. 58.

If no gameover is reached for the present trial, then control goes to step S1008 in which the sound presentation trial processing means 1000 increments the value of the index register j by +1. In step S1009, the sound presentation trial processing means 1000 determines whether all trials at the terminal are ended or not, based on whether or not the value of the index register j is equal to or greater than the number A of trials.

If not all trials at the terminal are ended, then control returns to step S1004 to repeat the processing from step S1004. If all trials at the terminal are ended, then control goes to step S1010 in which the sound presentation trial processing means 1000 increments the value of the index register i by +1.

In step S1011, the event image displaying means 1302 displays an ith event image, e.g., an image showing guidance to the terminal of an ith country, on the display monitor 18.

In step S1012, the sound presentation trial processing means 1000 determines whether all trials at all the terminals are ended or not, based on whether or not the value of the index register i is equal to or greater than the number B of terminals.

If not all trials at all the terminals are ended, then control returns to step S1003 to repeat the processing from step S1003. If all trials at all the terminals are ended, then the processing sequence of the sound presentation trial processing means 1000 is ended.

As described above, the entertainment system 10 according to the present invention has the sound presentation trial processing means 1000 for displaying an object 1200 in relative motion on one of the tracks, e.g., the track T4, of the track group 1202 displayed on the display monitor 18, allowing the user to try to acquire the object 1200 with a control input, and outputting a sound assigned to the track when the acquisition of the object 1200 with the control input is detected.

Therefore, the object 1200 relatively moving on one of the tracks, e.g., the track T4, of the six tracks T1–T6 is displayed on the display monitor 18. At this time, the user enters a certain control input trying to acquire the object 1200. If the user acquires the object 1200, the sound assigned to the track on which the object 1200 has been relatively moving is outputted.

Since there are a plurality of tracks T1–T6, when objects 1200 are successively acquired on the tracks T1–T6, the sounds assigned to the tracks are successively outputted, and the outputted sounds are combined to complete one piece of music, for example.

Next, the audio data processing means 2000 will be described with reference to FIGS. 63 through 80.

Figure 63:
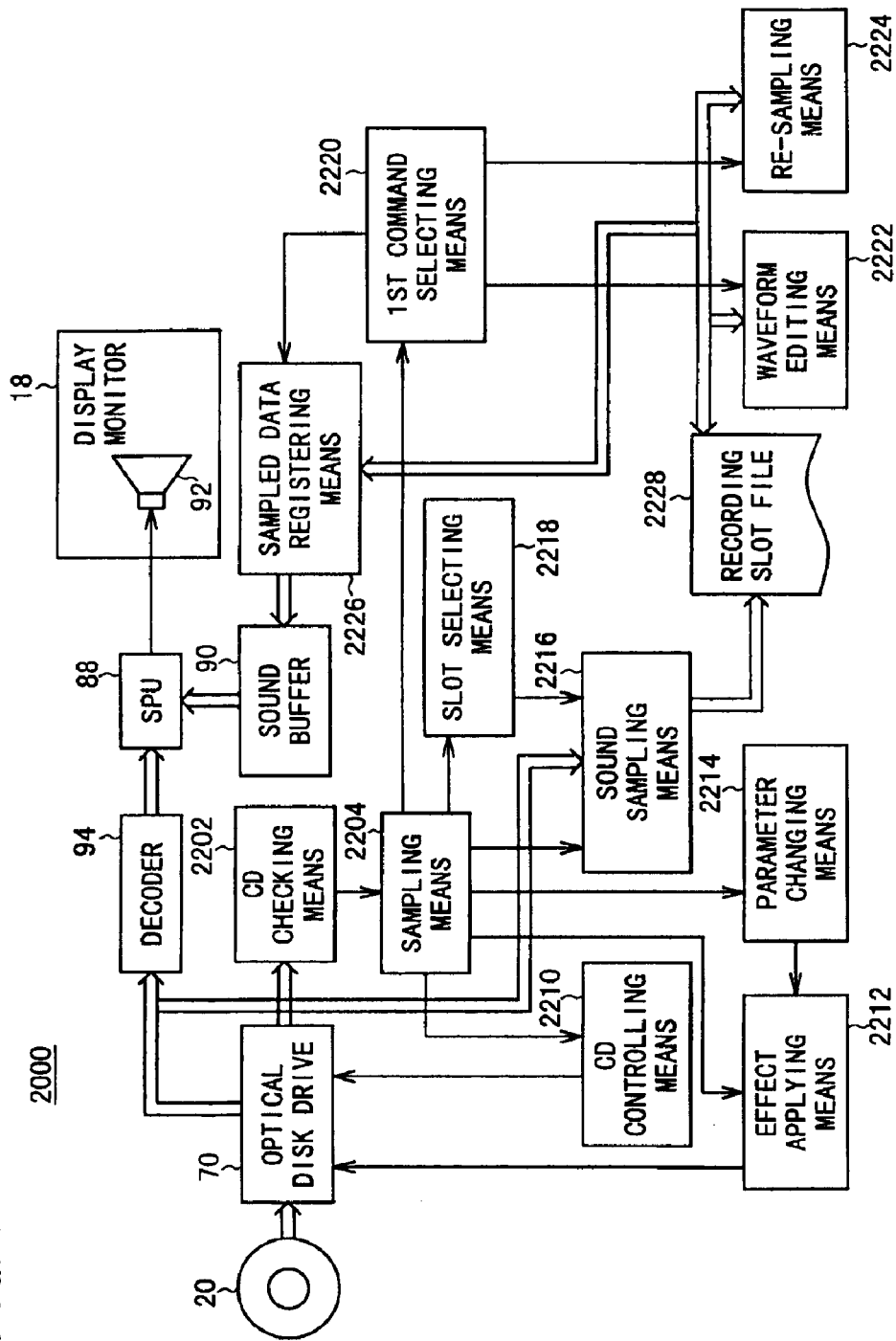
FIG. 63 is a functional block diagram of an audio data processing means including a sampling means.

As shown in FIG. 63, the audio data processing means 2000 has a CD checking means 2202 for checking whether the optical disk 20 loaded in the optical disk drive 70 is a music CD or not, and a sampling means 2204 for sampling any desired music data from audio data introduced when a music CD is played back.

The sampling means 2204 comprises a CD controlling means 2210 for controlling the optical disk drive 70 to play, stop, access tracks (forward and backward) of, and otherwise operate a music CD loaded in the optical disk drive 70 in response to control inputs from the manual controller 16, an effect applying means 2212 for applying various effects to reproduced music data from the music CD in response to control inputs from the manual controller 16, a parameter changing means 2214 for changing parameters including an effect level, a sound volume, etc. of audio data in response to control inputs from the manual controller 16, a sound sampling means 2216 for sampling audio data of a portion of the reproduced audio data which is determined by a control input from the manual controller 16 and registering the sampled audio data in a predetermined recording time slot, a slot selecting means 2218 for selecting a recording slot to register sampled audio data therein, and a first command selecting means 2220 for selecting various commands after music data is sampled.

The effect applying means 2212 controls the optical disk drive 70 to apply a necessary effect to reproduced audio data.

The first command selecting means 2220 comprises a waveform editing means 2222 for removing excessive data from sampled audio data, a re-sampling means 2224 for re-sampling desired audio data from sampled audio data, and a sampled data registering means 2226 for registering sampled audio data in a audio data file in the sound buffer 90.

A number of audio data registered in the sound pattern file serve as sound patterns for use by the music editing means 300 and the sound presentation trial processing means 1000, or serve as a sound source for use by the entertainment apparatus 12. When sampled audio data is registered in the sound pattern file by the sampled data registering means 2226, the sampled audio data is available as a sound pattern for the music editing means 300 and the sound presentation trial processing means 1000, or as a sound source for the entertainment apparatus 12.

The sound sampling means 2216 uses a recording slot file 2228 which has six records corresponding to respective six recording slots, for example, that are handled by the sound sampling means 2216. Each of the six records of the recording slot file 228 stores sampled audio data.

Figure 64:
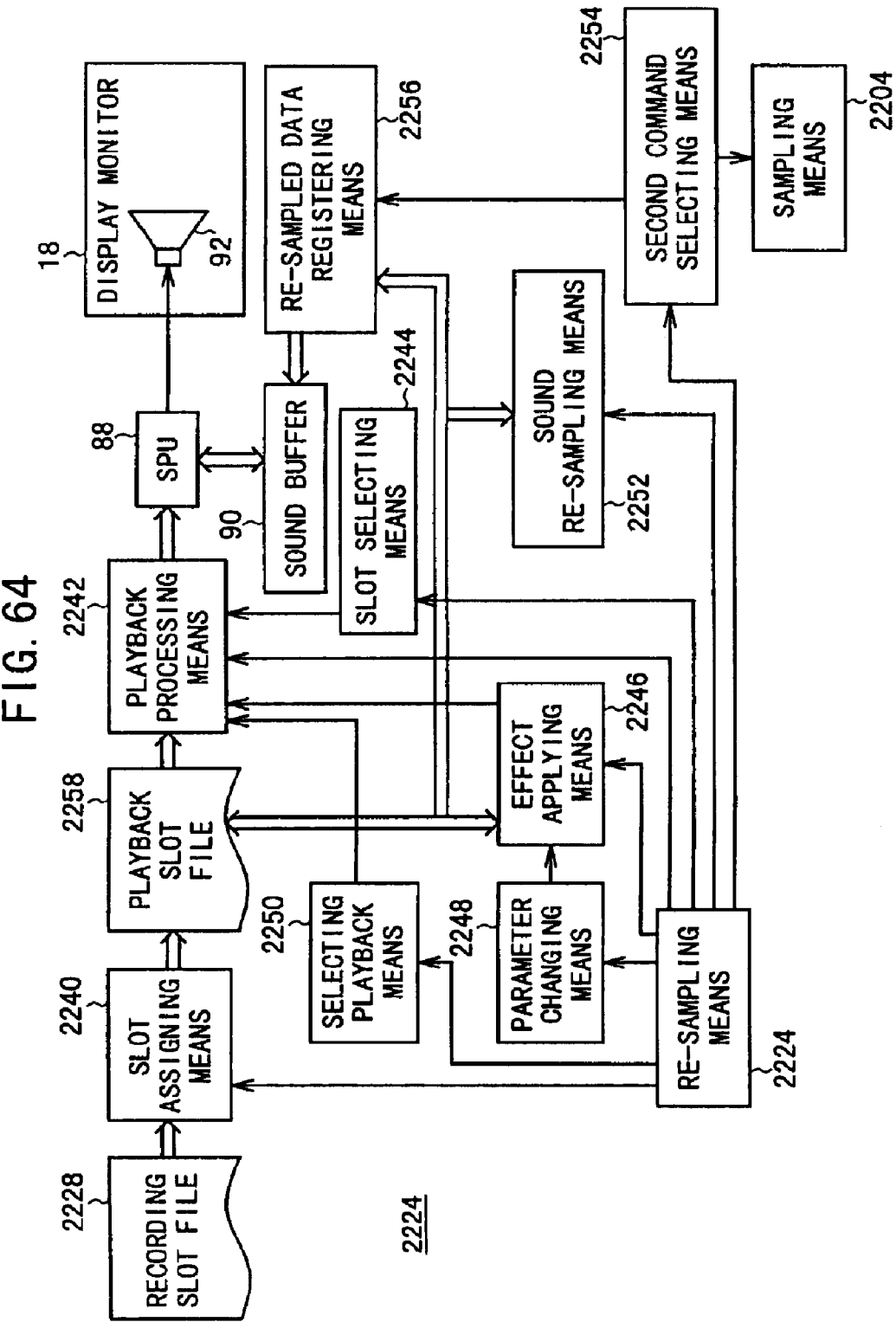
FIG. 64 is a functional block diagram of a re-sampling means in the audio data processing means.

As shown in FIG. 64, the re-sampling means 2224 comprises a slot assigning means 2240 for selecting a recording slot to be assigned to a playback time slot (playback slot) for re-sampling, a playback processing means 2242 for reproducing audio data assigned to playback slots, a slot selecting means 2244 for selecting a playback slot to be played back, an effect applying means 2246 for applying various effects to reproduced audio data in response to control inputs from the manual controller 16, a parameter changing means 2248 for changing parameters including an effect level, a sound volume. etc. of audio data in response to control inputs from the manual controller 16, a selecting playback means 2250 for selecting playback attributes according to control inputs, a sound re-sampling means 2252 for re-sampling audio data of a portion of the reproduced audio data which is determined by a control input from the manual controller 16 and registering the re-sampled audio data in a predetermined playback slot, and a second command selecting means 2254 for selecting various commands after audio data is re-sampled.

The second command selecting means 2254 comprises the waveform editing means 2222 (see FIG. 63) which removes excessive data from sampled audio data assigned to a selected playback slot, and re-sampled data registering means 2256 for registering re-sampled audio data in the audio data file in the sound buffer 90.

The sound re-sampling means 2252 uses a playback slot file 2258 which has four records corresponding to respective four playback slots, for example, that are handled by the sound sampling means 2252. Each of the four records of the playback slot file 2258 stores audio data in a selected recording slot. Particularly, the fourth record corresponding to the fourth playback slot stores re-sampled audio data.

A processing sequence of the audio data processing means 2000 will be described below with reference to FIGS. 63 through 80.

Figure 65:
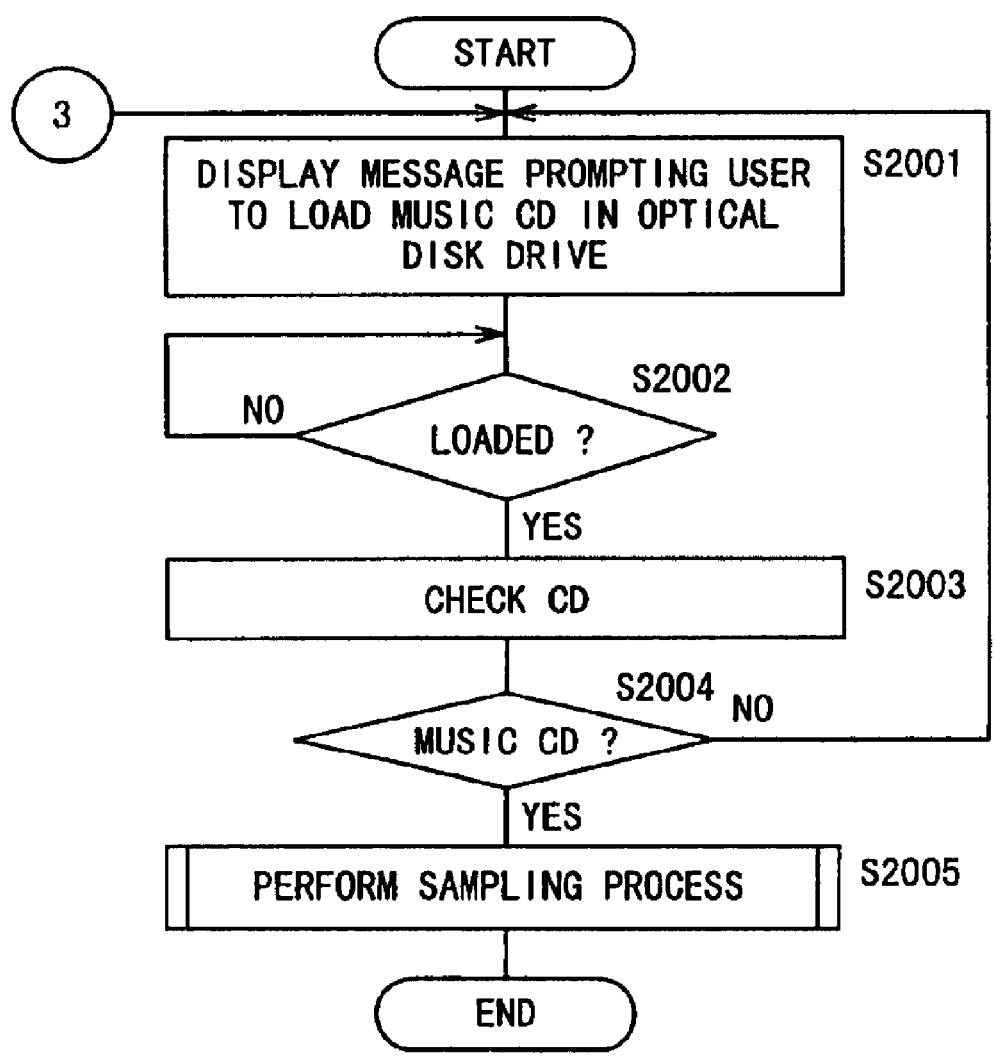
FIG. 65 is a flowchart of a processing sequence of the audio data processing means.

In step S2001 shown in FIG. 65, the CD checking means 2202 displays a message prompting the user to load a music CD in the optical disk drive 70 on the display monitor 18.

In step S2002, the CD checking means 2202 waits for an optical disk 20 to be loaded. If an optical disk 20 is loaded in the optical disk drive 70, then control goes to step S2003 in which the CD checking means 2202 checks the loaded optical disk 20.

In step S2004, the CD checking means 2202 checks if the loaded optical disk 20 is a music CD or not. If the loaded optical disk 20 is not a music CD, then control goes back to step S2001, displaying a message prompting the user to load a music CD in the optical disk drive 70 on the display monitor 18. If the loaded optical disk 20 is a music CD, then control proceeds to step S2005 in which the sampling means 2204 performs its own processing sequence.

The processing sequence of the sampling means 2204 will be described below with reference to FIGS. 66 and 67.

Figure 66:
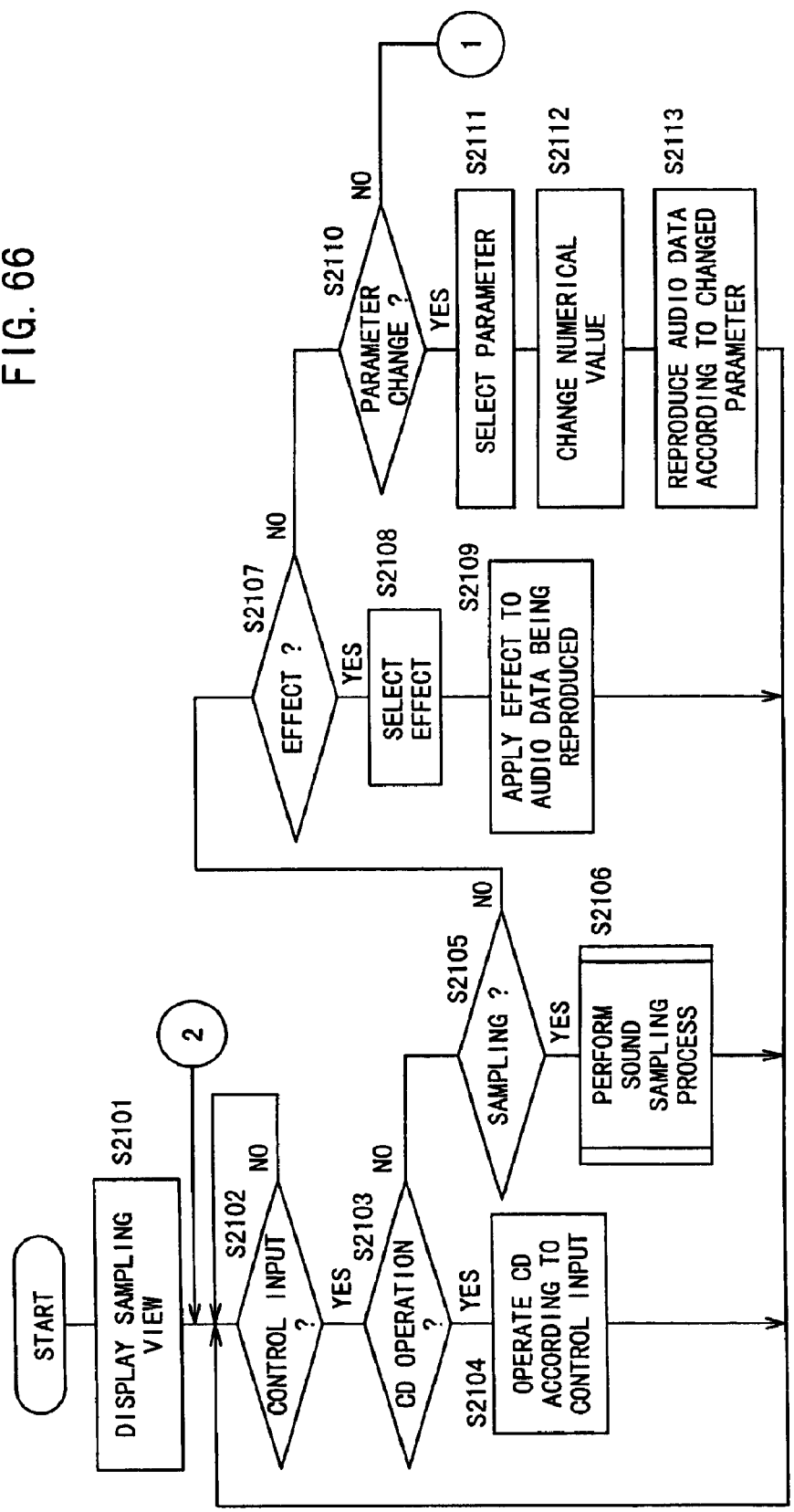
FIGS. 66 and 67 are a flowchart of a processing sequence of the sampling means.

In step S2101 shown in FIG. 66, the sampling means 2204 displays a sampling view 2300 (see FIG. 78) on the display monitor 18. The sampling view 2300 has a playback state display area 2302 indicative of playback states, such as a playback track and a playback time, of the music CD, an operation display area 2304 for applying an effect, changing parameters, and controlling the music CD, a waveform display area 2306 for displaying a registration destination (recording slot) for sampled audio data and also displaying the waveform of sampled audio data, and a time display area 2308 for displaying a bar representing a sampling time of audio data.

The operation display area 2304 has an effect selecting area 2310 for selecting various effects, a parameter changing area 2312 for changing various parameters, and a CD control area 2314 for controlling a CD.

The effects include a type (THRU) for playing back audio data without any effect applied, a type (ECHO) for applying an echo effect to audio data, a type (SPRING) for reverberating audio data using a spring, a type (FLANGER) for applying a flanger to audio data, etc. The user can select any on of the effects with the left button 110*d* and the right button 110*b*.

The parameters include an effect level (depth: EFX), a sound pitch (PIT), and a sound volume (VOL). The user can select any on of the parameters with the up button 110*a* and the down button 110*c*, and change the numerical value of a selected parameter with the left button 110*d* and the right button 110*b*.

The CD control area 2314 displays icons for playing, stopping, accessing tracks (forward) of, and accessing tracks (backward) of, a CD. The user can select any one of these icons with the up button 110*a*, the down button 110*c*, the left button 110*d*, and the right button 110*b*.

In step S2102 shown in FIG. 66, the sampling means 2204 waits for a control input from the manual controller 16. If there is a control input from the manual controller 16, control goes to step S2103 in which the sampling means 2204 determines whether the control input is a control input relative to the control of the CD or not. If the control input is a control input relative to the control of the CD, then control goes to step S2104 in which the CD controlling means 2210 controls the CD according to the control input. Specifically, the CD controlling means 2210 plays back the CD, stops the CD, accesses a track on the CD in a forward direction, or accesses a track on the CD in a backward direction.

If the control input is not a control input relative to the control of the CD, then control goes to step S2105 in which the sampling means 2204 determines whether the control input is a control input relative to sampling, e.g. a control input from the start button 40, or not. If the control input is a control input relative to sampling, then the sound sampling means 2216 performs its own processing sequence in step S2106.

The processing sequence of the sound sampling means 2216 will be described below with reference to FIG. 68.

Figure 68:
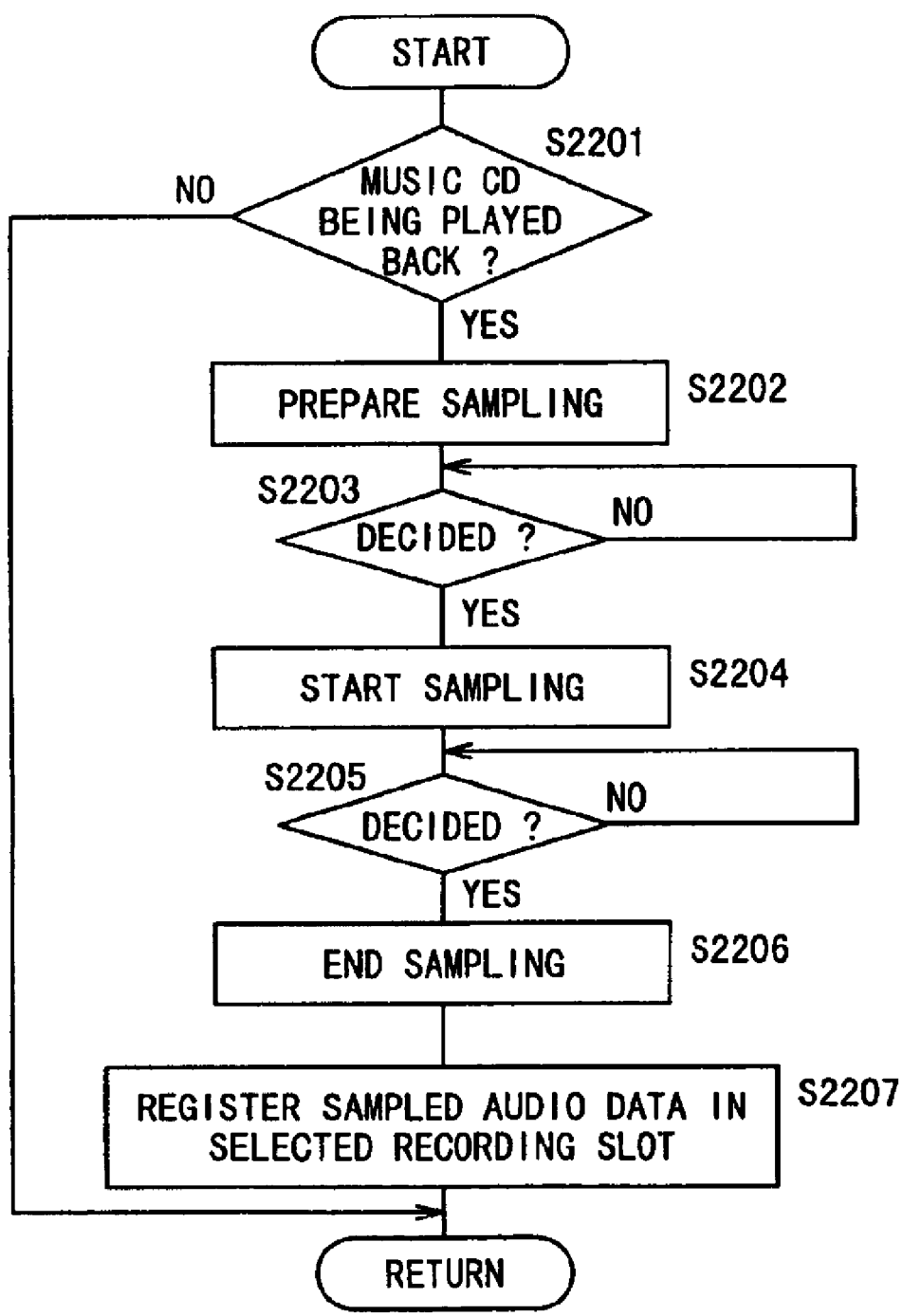
FIG. 68 is a flowchart of a processing sequence of a sound sampling means.

In step S2201 shown in FIG. 68, the sound sampling means 2216 determines whether a music CD is being played back or not. If a music CD is being played back, then control goes to step S2202 in which a sampling process is prepared. At this time, the color of the displayed frame of the waveform display area 2306 changes to yellow, for example, letting the user know that a sampling process is being prepared.

In step S2203, the sound sampling means 2216 waits for a control input from the button 112*d*, serving as a decision button, of the manual controller 16. If there is a control input from the decision button 112*d*, then control goes to step S2204 in which the sound sampling means 2216 starts sampling audio data that is being reproduced.

In step S2205, the sound sampling means 2216 waits for a control input from the decision button 112*d*. If there is a control input from the decision button 112*d*, then control goes to step S2206 in which the sound sampling means 2216 finishes the sampling process.

Thereafter, in step S2207, the sound sampling means 2216 registers sampled audio data in a record corresponding to a recording slot being selected, of the records in the recording slot file 2228.

After step S2207 or if a music CD is not being played back in step S2201, the processing sequence of the sound sampling means 2216 is finished.

Control then goes back to the routine shown in FIG. 66. If the control input is not a control input relative to sampling in step S2105, then control goes to step S2107 in which the sampling means 2204 determines whether the control input is a control input relative to an effect or not. If the control input is a control input relative to an effect, then the effect applying means 2212 performs its own processing sequence. Specifically, the user selects an effect with a control input in step S2108, and the effect applying means 2212 applies the selected effect to audio data being reproduced by the optical disk drive 70 in step S2109.

If the control input is not a control input relative to an effect, then control goes to step S2110 in which the sampling means 2204 determines whether the control input is a control input relative to the changing of a parameter or not. If the control input is a control input relative to the changing of a parameter, then the parameter changing means 2214 performs its own processing sequence. Specifically, the user selects a parameter with a control input in step S2111, and then the parameter changing means 2214 changes the numerical value of the selected parameter in step S2112. Thereafter, in step S2113, audio data is reproduced according to the changed parameter.

Figure 67:
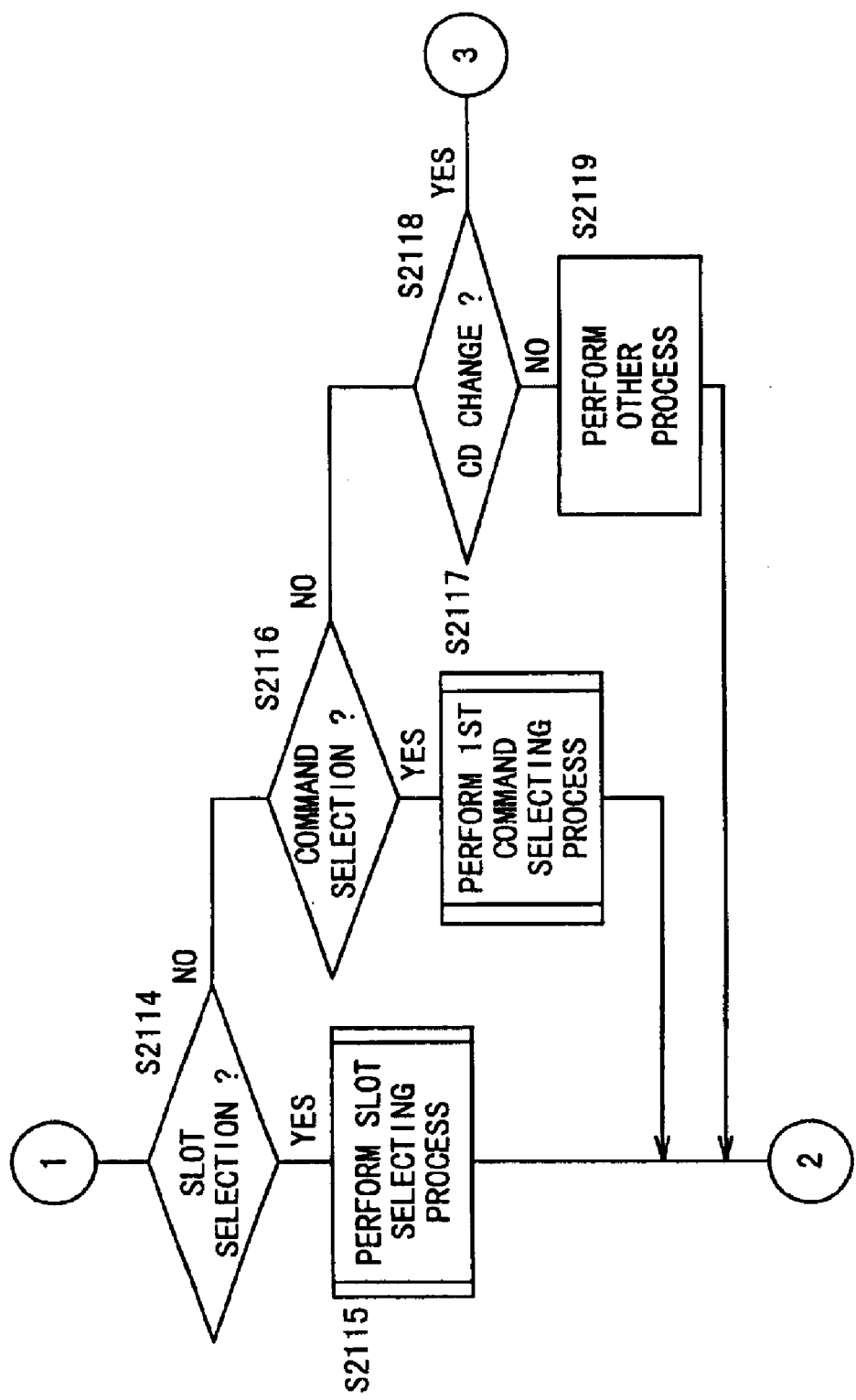

If the control input is not a control input relative to the changing of a parameter in step S2110, then control goes to step S2114 shown in FIG. 67 in which the sampling means 2204 determines whether the control input is a control input relative to the selection of a slot, e.g., a control input from the R2 button 116*b*, or not.

If the control input is a control input relative to the selection of a slot, then control goes to step S2115 in which the slot selecting means 2218 performs its own processing sequence.

Figure 69:
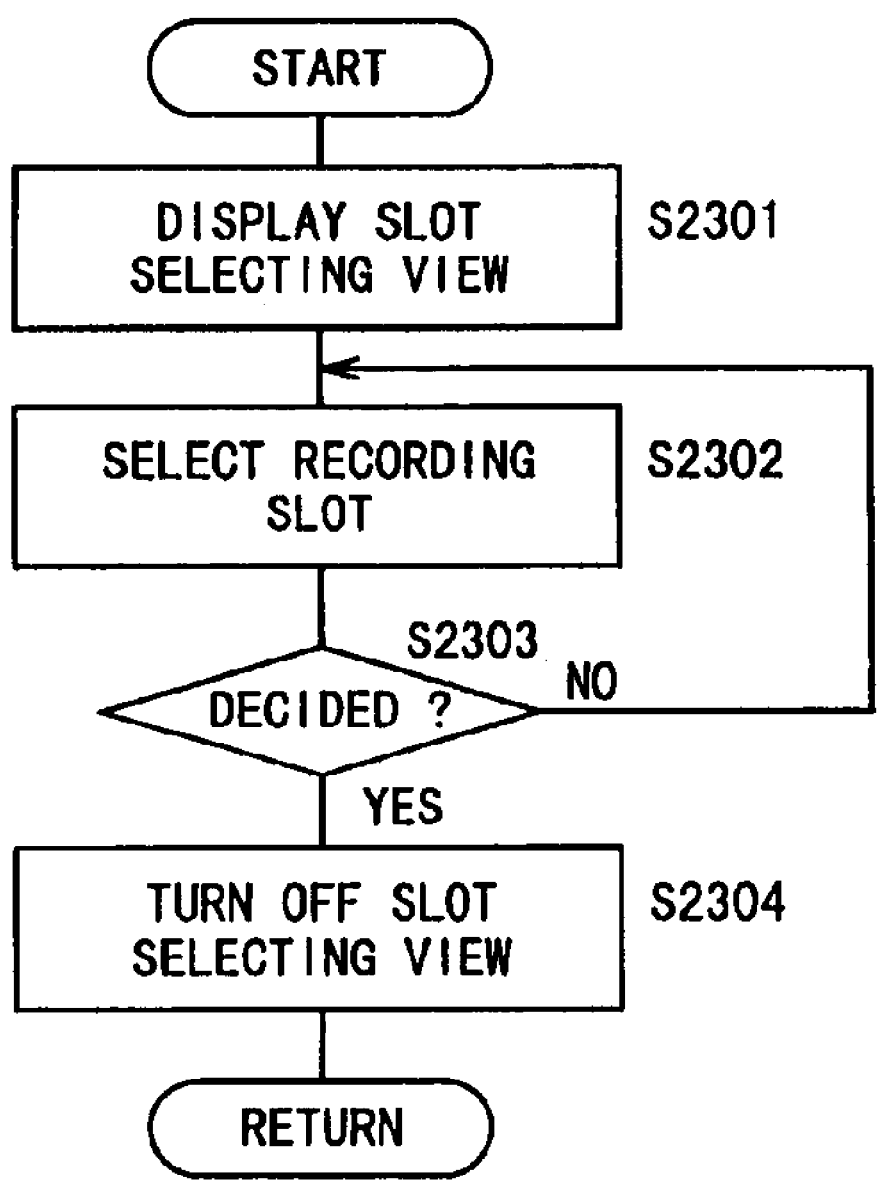
FIG. 69 is a flowchart of a processing sequence of a slot selecting means.

The processing sequence of the slot selecting means 2218 will be described below with reference to FIG. 69.

In step S2301 shown FIG. 15, the slot selecting means 2218 displays a slot selection view (window view), not shown, on the display monitor 18.

In step S2302, the user selects a recording slot in which to register sampled audio data by pressing the up button 110*a*, the down button 110*c*, and the decision button 112*d* of the manual controller 16. Specifically, when the user presses the up button 110*a* and the down button 110*c*, a cursor is moved, and when the user presses the decision button 112*d*, a recording slot where the cursor is positioned is selected. Then, when the user presses the X button 112*c*, the selected recording slot is decided.

In step S2303, the slot selecting means 2218 determines whether the selected recording slot is decided or not. If the selected recording slot is not decided, control goes back to step S2302 to select a recording slot again. If the selected recording slot is decided, then control goes to step S2304 in which the slot selecting means 2218 turns off the slot selection view. In step S2114, if the processing sequence of the slot selecting means 2218 now comes to an end.

Control then goes back to the routine shown in FIG. 67. If the control input is not a control input relative to the selection of a slot, then control goes to step S2116 in which the sampling means 2204 determines whether the control input is a control input relative to the selection of a command, e.g., a control input from the selection button 42, or not.

If the control input is a control input relative to the selection of a command, then control goes to step S2117 in which the first command selecting means 2220 performs its own processing sequence.

The processing sequence of the first command selecting means 2220 will be described below with reference to FIG. 70.

Figure 70:
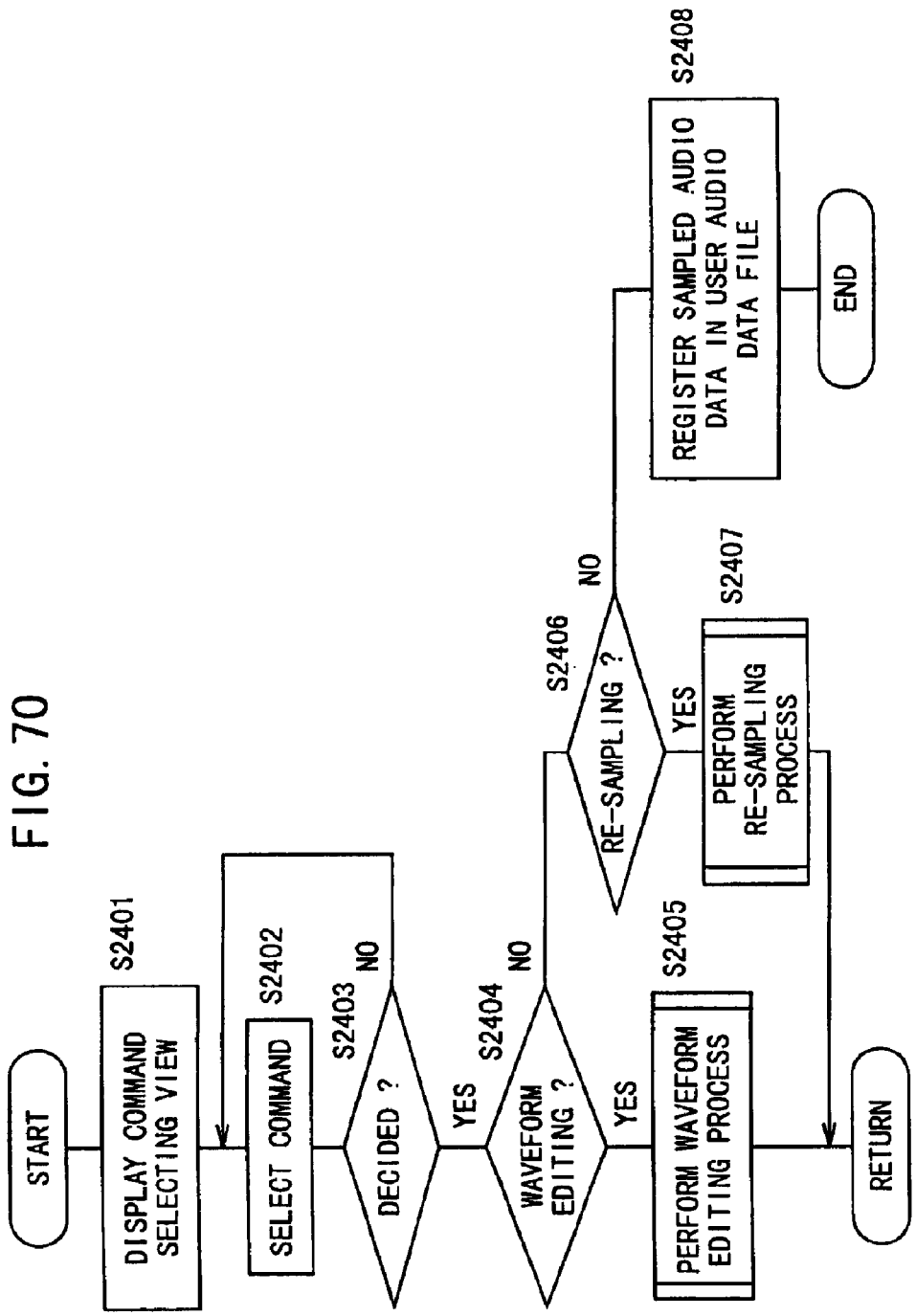
FIG. 70 is a flowchart of a processing sequence of a first command selecting means.

In step S2401 shown in FIG. 70, the first command selecting means 2220 displays a command request view, not shown, on the display monitor 18. The command request view a comprises a window view with an array of three commands including a mode changing command (MODE CHANGE), a waveform editing command (WAVE EDIT), and an end command (EXIT).

In step S2402, the user selects a command by pressing the left button 110*d*, the right button 110*b*, and the decision button 112*d* of the manual controller 16.

In step S2403, the first command selecting means 2220 determines whether the selected command is decided or not. If the selected command is not decided, control goes back to step S2402 to select a command again. If the selected command is decided, then control goes to step S2404 in which the first command selecting means 2220 determines whether the selected command is a command for editing a waveform. If the selected command is a command for editing a waveform, then control goes to step S2405 in which the waveform editing means 2222 performs its own processing sequence.

The processing sequence of the waveform editing means 2222 will be described below with reference to FIG. 71.

Figure 71:
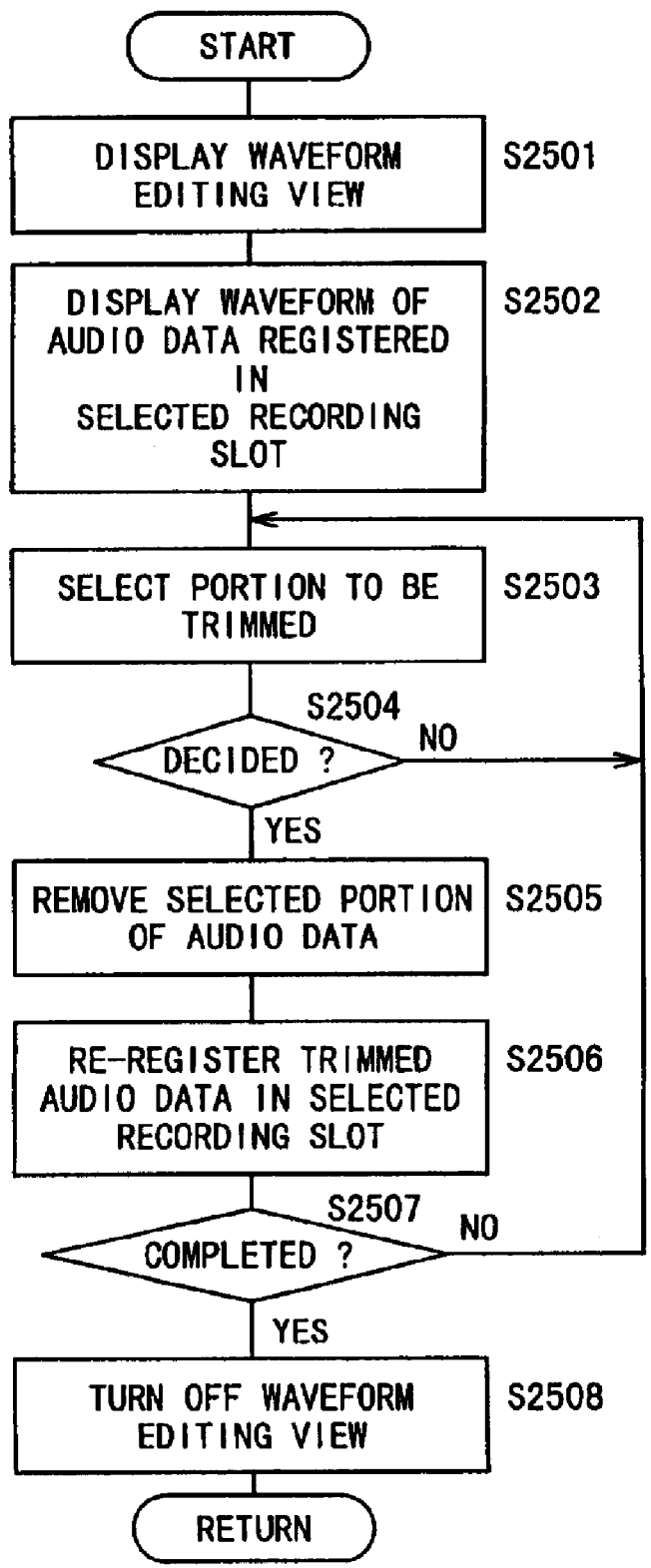
FIG. 71 is a flowchart of a processing sequence of a waveform editing means.
Figure 79:
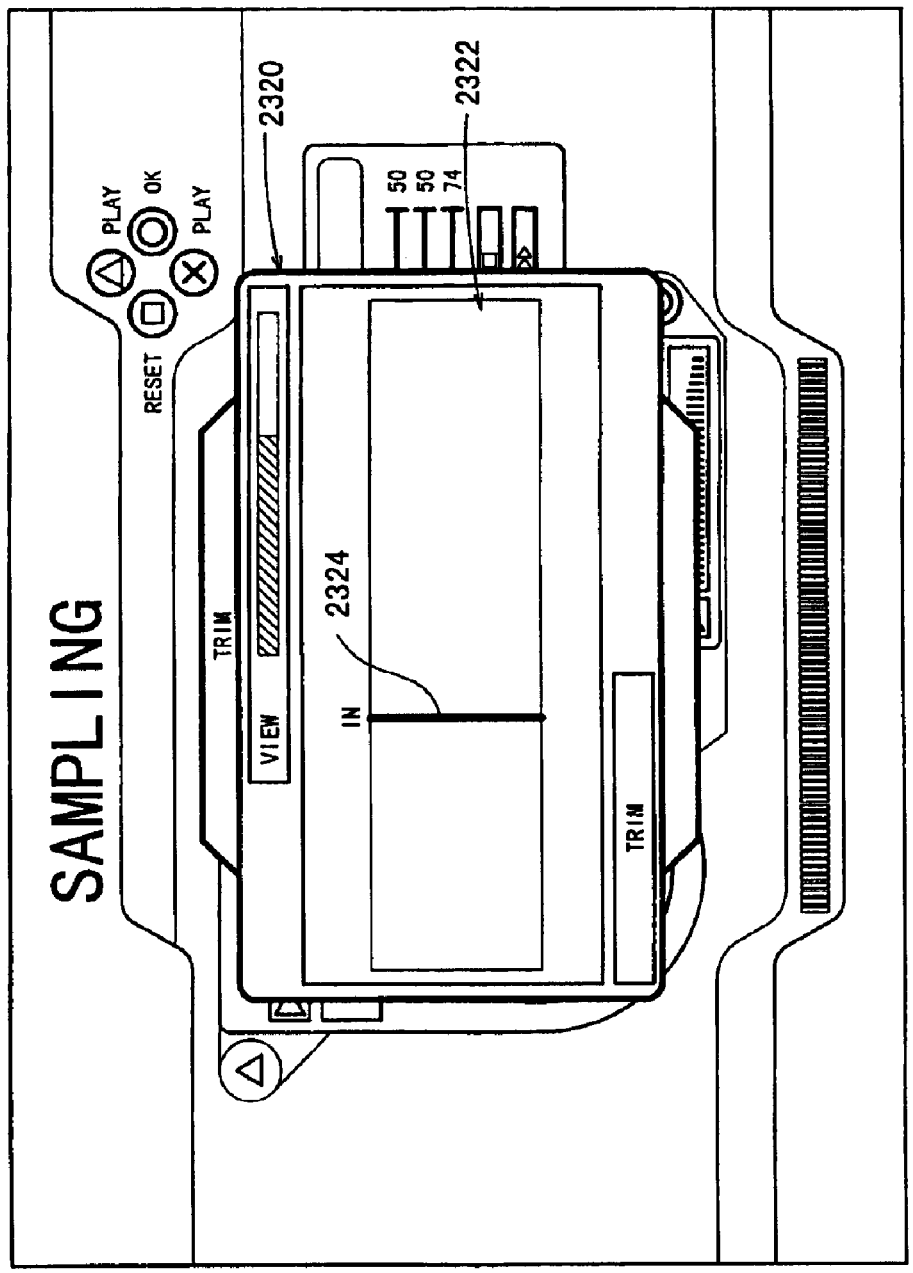
FIG. 79 is a view showing a displayed waveform editing view.

In step S2501 shown in FIG. 71, the waveform editing means 2222 displays a waveform editing view 2320 (see FIG. 79) on the display monitor 18. As shown in FIG. 79, the waveform editing view 2320 is a window view having a waveform display area 2322 for displaying the waveform of sampled audio data.

In the waveform display view 2320, the user can trim front and rear portions on a time axis of the displayed waveform. Specifically, the user presses the down button 110*c* to place a cursor 2324 in the front or rear portion of the displayed waveform, and then presses the left button 110*d* or the right button 110*b* to decides a region (time width) to be trimmed off the displayed waveform. After having decided the region to be trimmed off the displayed waveform, the user presses the decision button 112*d* to trim the region off the displayed waveform.

In step S2502 shown in FIG. 71, the waveform editing means 2222 displays the waveform of an audio data registered in a selected recording slot in the waveform display area 2322.

In step S2503, the user decides a region to be trimmed off the displayed waveform in the manner described above. Thereafter, the waveform editing means 2222 determines whether the region to be trimmed has been decided or not in step S2504. If not decided, then control goes back to step S2503 for the user to decide a region to be trimmed off the displayed waveform again.

If decided, then control goes to step S2505 in which the waveform editing means 2222 removes, i.e., trims the selected region off the displayed waveform.

In step S2506, the waveform editing means 2222 reregisters the trimmed audio data in the selected recording slot. That it, the waveform editing means 2222 re-registers the trimmed audio data in a record corresponding to the selected recording slot, of the records in the recording slot file.

In step S2507, the waveform editing means 2222 determines whether the trimming process has been completed or not based on whether there is a control input from the X button 112*c*, for example, or not.

If the trimming process has not been completed, then control goes back to step S2503 to select a region to be trimmed again. If the trimming process has been completed, then control goes to step S2508 in which the waveform editing means 2222 turns off the waveform editing view 2320. The processing sequence of the waveform editing means 2222 is finished.

Control then returns to the routine shown in FIG. 70. If the selected command is a not command for editing a waveform in step S2404 shown in FIG. 70, then control goes to step S2406 in which the first command selecting means 2220 determines whether the selected command is a command for re-sampling or not. If the selected command is a command for re-sampling, then control goes to step S2407 in which the re-sampling means 2224 performs its own processing sequence. The processing sequence of the re-sampling means 2224 will be described later on.

If the selected command is not a command for re-sampling in step S2406, then control goes to step S2408 in which the sampled data registering means 2226 registers the sampled audio data which has been registered in the selected recording slot, in the audio data file, e.g., a user audio data file, in the sound buffer 90. At this time, the audio data becomes available for use as one sound source for the entertainment apparatus 12. After step S2408, the processing sequence of the sampling means 2204 is ended.

Control then returns to the routine shown in FIG. 67. If the control input is not a control input relative to the selection of a command in step S2116, then control goes to step S2118 in which the sampling means 2204 determines whether the control input is a control input relative to the changing of a CD or not based on whether the control input is a control input from the R1 button 116*a* or not.

If the control input is a control input relative to the changing of a CD, then control goes back to step S2001 shown in FIG. 65 to display a message prompting the user to change a CD in the optical disk drive 70 on the display monitor 18 and wait for a CD to be changed. The user can leave this waiting state by pressing the X button 112*c*.

If the control input is not a control input relative to the changing of a CD in step S2118 shown in FIG. 67, then control goes to step S2119 in which another process depending on the control input is carried out.

The processing sequence of the re-sampling means 2224 will be described below with reference to FIGS. 72 and 73.

Figure 72:
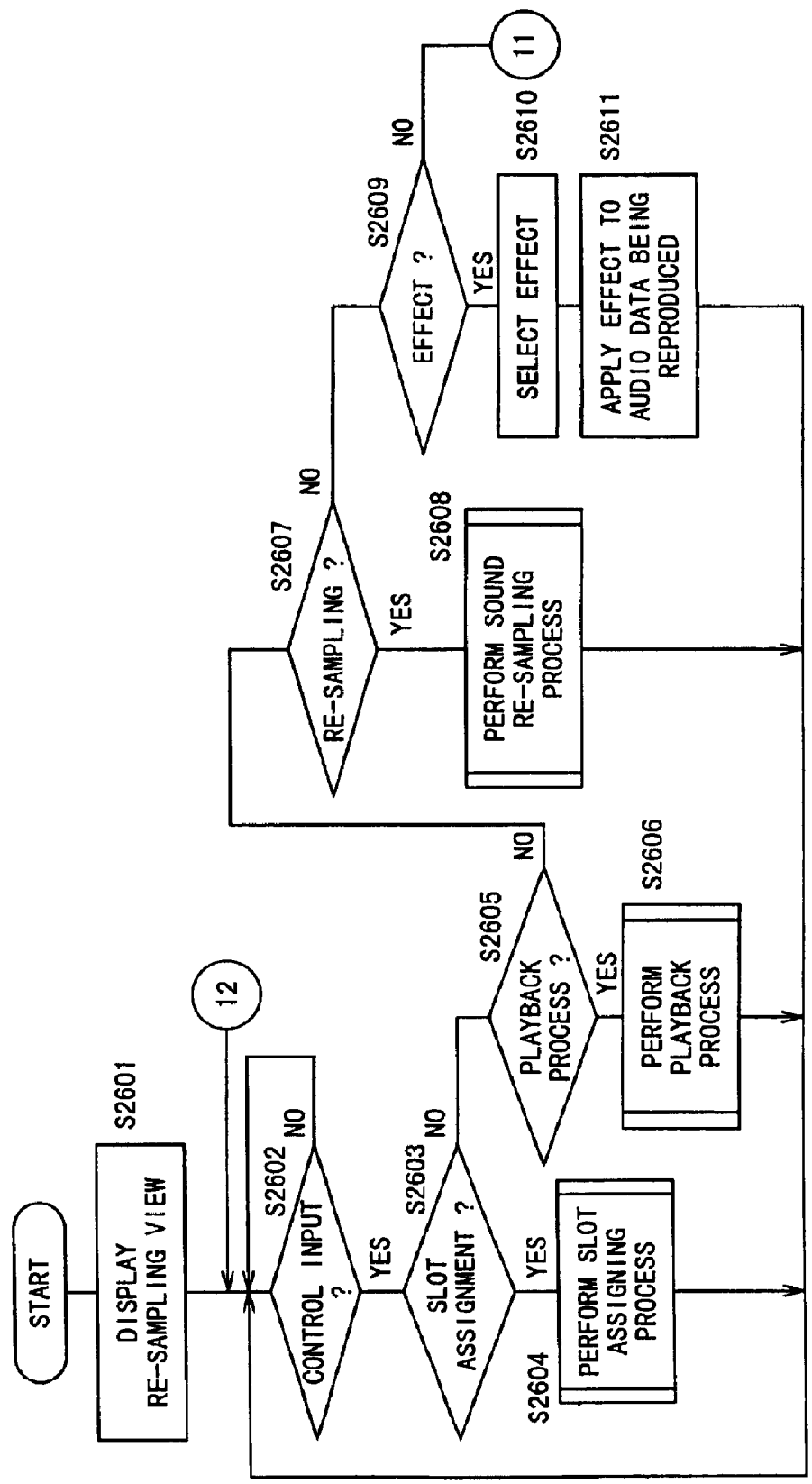
FIGS. 72 and 73 are a flowchart of a processing sequence of the re-sampling means.

In step S2601 shown in FIG. 72, the re-sampling means 2224 displays a re-sampling view 2330 (see FIG. 80) on the display monitor 18. The re-sampling view 2330 has a first slot display area 2332 for displaying three selected recording slots, a second slot display area 2334 for displaying the recording slot of re-sampled audio data, a playback attribute display area 2336 for applying an effect, changing parameters, and selecting playback attributes, and a time display area 2350 for displaying a bar representing a re-sampling time of audio data.

The playback attribute display area 2336 has an effect selecting area 2338 for selecting various effects, a parameter changing area 2340 for changing various parameters, and a playback attribute selecting area 2342 for selecting playback attributes.

Figure 78:
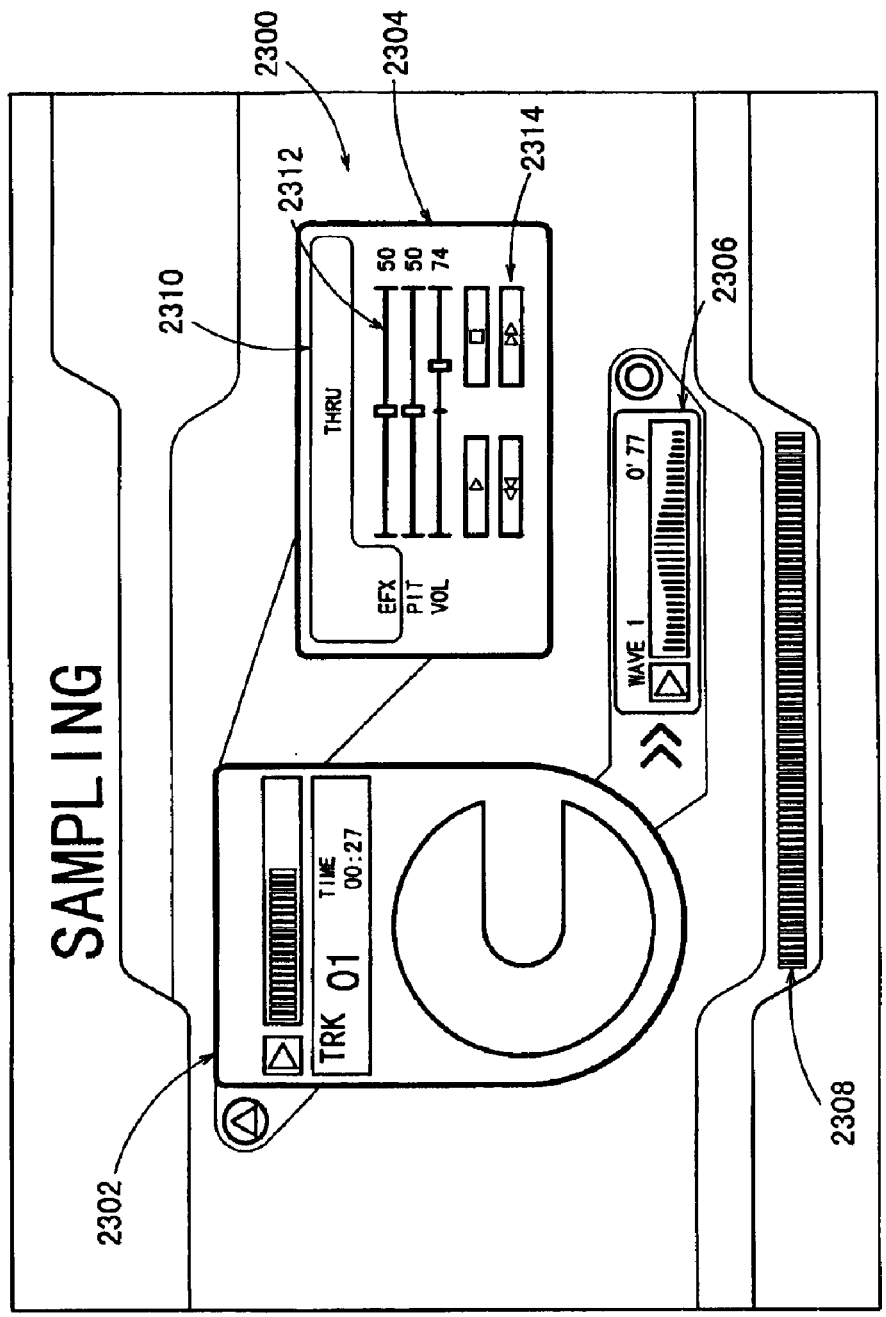
FIG. 78 is a view showing a displayed sampling view.

The effect selecting area 2338 and the parameter changing area 2340 are the same as the effect selecting area 2310 and the parameter changing area 2312 in the sampling view 2300 shown in FIG. 78, and will not be described below. The playback attribute selecting area 2342 allows the user to select a playback direction and playback attributes. The user can select playback attributes by pressing the left button 110d and the right button 110b. The playback attributes that can be selected include a reverse playback mode (REVERSE), a skipping playback mode (SKIP), and a scratch playback mode (SCRATCH).

In step S2602 shown in FIG. 72, the re-sampling means 2224 waits for a control input from the manual controller 16. If there is a control input from the manual controller 16, control goes to step S2603 in which the re-sampling means 2224 determines whether the control input is a control input relative to the assignment of a slot, e.g., a control input from the R2 button 116b, or not. If the control input is a control input relative to the assignment of a slot, then control goes to step S2604 in which the slot assigning means 2240 performs its own processing sequence.

The processing sequence of the slot assigning means 2240 will be described below with reference to FIG. 74.

Figure 74:
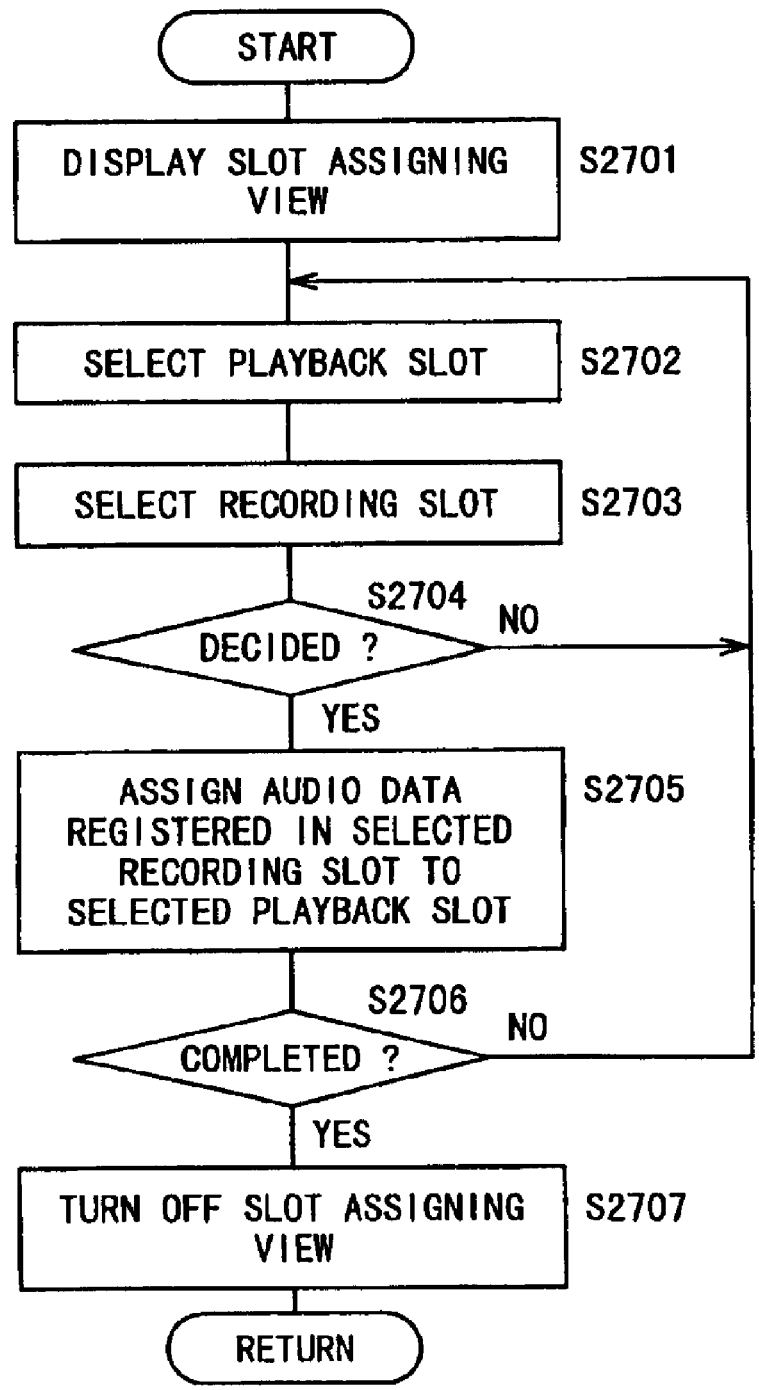
FIG. 74 is a flowchart of a processing sequence of a slot assigning means.

In step S2701 shown in FIG. 74, the slot assigning means 2240 displays a slot assigning view, not shown, which comprises a window view having a playback slot display area for displaying four playback slots and a recording slot display area for displaying six recording slots.

In step S2702, the user selects a playback slot by pressing the L1 button 114a and the L2 button 114b. Then, in step S2703, the user selects a recording slot by pressing the up button 110a and the down button 10c.

In step S2704, the slot assigning means 2240 determines whether the selected slots have been decided or not based on whether there is a control input from the decision button 112d or not. If the selected slots have not been decided, then control goes back to step S2702 for the user to select a playback slot and a recording slot again.

If the selected slots have been decided, then control goes to step S2705 in which the slot assigning means 2240 assigns the audio data registered in the selected recording slot to the selected playback slot. For example, the audio data registered in the second recording slot is assigned to the first playback slot, the audio data registered in the third recording slot is assigned to the second playback slot, the audio data registered in the fourth recording slot is assigned to the third playback slot, and the audio data registered in the sixth recording slot is assigned to the fourth playback slot.

In step 2706, the slot assigning means 2240 determines whether the assignment of a slot has been completed or not based on whether there is a control input from the X button 112c or not. If the assignment of a slot has not been completed, then control goes back to step S2702 to assign a slot again. If the assignment of a slot has been completed, then control goes to step S2707 in which the slot assigning means 2240 turns off the slot assigning view. The processing sequence of the slot assigning means 2240 now comes to an end.

Control then returns to the routine shown in FIG. 72. If the control input is not a control input relative to the assignment of a slot in step S2603, then the re-sampling means 2224 determines whether the control input is a control input relative to a playback process, i.e., a control input from the Δ button 112a, the □ button 112b, the X button 112c, or the decision button 112d, or not in step S2605.

If the control input is a control input relative to a playback process, then control goes to step S2606 in which the playback processing means 2242 performs its own processing sequence.

The processing sequence of the playback processing means 2242 will be described below with reference to FIG. 75.

Figure 75:
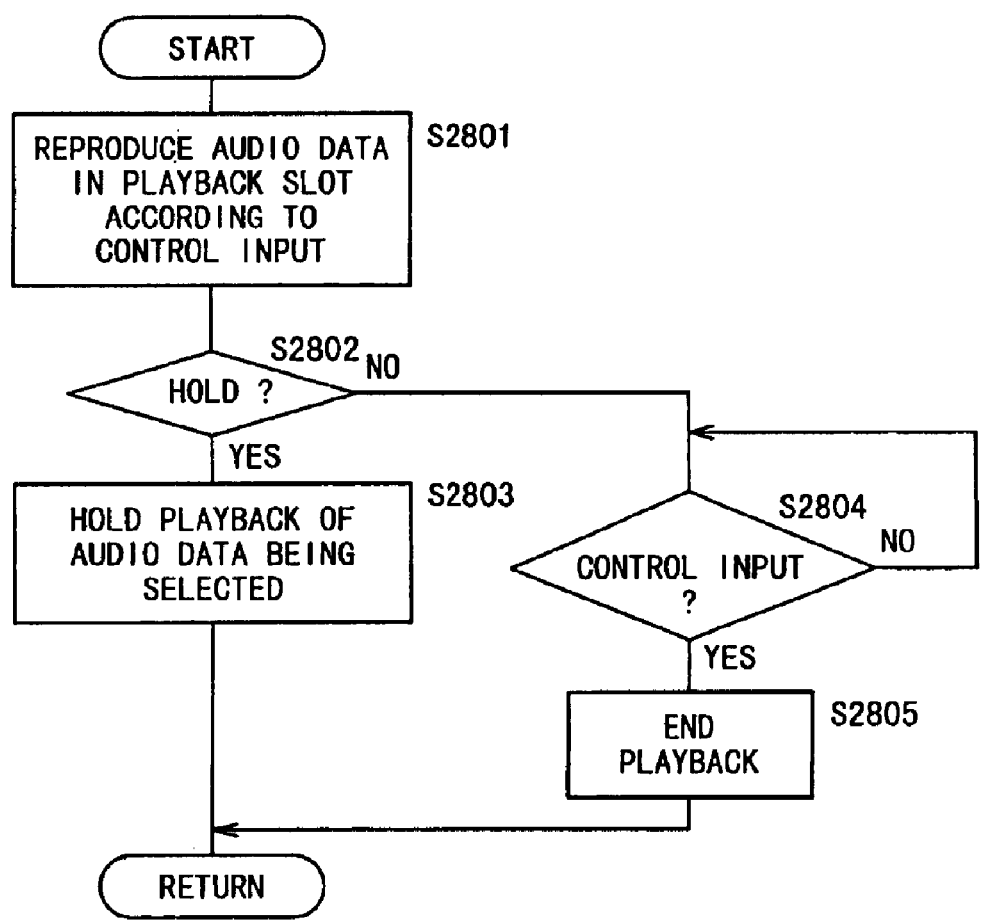
FIG. 75 is a flowchart of a processing sequence of a playback processing means.

In step S2801 shown in FIG. 75, the playback processing means 2242 reproduces audio data in a playback slot depending on the control input. Specifically, if the control input comes from the Δ button 112a, then the playback processing means 2242 reproduces audio data in the first playback slot. If the control input comes from the □ button 112b, then the playback processing means 2242 reproduces audio data in the second playback slot. If the control input comes from the X button 112c, then the playback processing means 2242 reproduces audio data in the third playback slot. If the control input comes from the decision button 112d, then the playback processing means 2242 reproduces audio data in the fourth playback slot.

In step S2802, the playback processing means 2242 determines whether there is a control input indicative of a playback hold mode, e.g., a control input from the R1 button 116a, or not. If there is a control input indicative of a playback hold mode, then control goes to step S2803 in which the playback processing means 2242 holds the playback of the audio data assigned to the selected playback slot.

If there is not a control input indicative of a playback hold mode in step S2802, then control goes to step S2804 in which the playback processing means 2242 waits for a control input to end. If a control input comes to an end, then control goes to step S2805 to finish the playback process.

After step S2803 or step S2805, the processing sequence of the playback processing means 2242 is brought to an end.

Then, control returns to the routine shown in FIG. 72. If the control input is no a control input relative to a playback process in step S2605, then control goes to step S2607 in which the re-sampling means 2224 determines whether the control input is a control input relative to re-sampling or not. If the control input is a control input relative to re-sampling, then control goes to step S2608 in which the sound re-sampling means 2252 performs its own processing sequence. The processing sequence of the sound re-sampling means 2252 will be described later on.

If the control input is not a control input relative to re-sampling in step S2607, then control goes to step S2609 in which the re-sampling means 2224 determines whether the control input is a control input relative to an effect or not. If the control input is a control input relative to an effect, then the effect applying means 2246 performs its own processing sequence. Specifically, the user selects an effect with a control input in step S2610, and the effect applying means 2246 applies the selected effect to audio data being reproduced by the optical disk drive 70 in step S2611.

In step S2609, If the control input is not a control input relative to an effect, then control goes to step S2612 (see FIG. 73) in which the re-sampling means 2224 determines whether the control input is a control input relative to the changing of a parameter or not. If the control input is a control input relative to the changing of a parameter, then the parameter changing means 2248 performs its own processing sequence. Specifically, the user selects a parameter with a control input in step S2613, and then the parameter changing means 2248 changes the numerical value of the selected parameter in step S2614. Thereafter, in step S2615, audio data is reproduced according to the changed parameter.

If the control input is not a control input relative to the changing of a parameter in step S2612, then control goes to step S2616 in which the re-sampling means 2224 determines whether the control input is a control input relative to the selection of a playback attribute or not. If the control input is a control input relative to the selection of a playback attribute, then the selecting playback means 2250 performs its own processing sequence. Specifically, the user selects a playback attribute with a control input in step S2617, and the selecting playback means 2250 reproduces audio data according to the selected playback attribute in step S2618.

If the control input is not a control input relative to the selection of a playback attribute in step S2616, then control goes to step S2619 in which the re-sampling means 2224 determines whether the control input is a control input relative to the selection of a slot. A slot can be selected with the L1 button 114a and the L2 button 114b, for example.

If the control input is a control input relative to the selection of a slot, then control goes to step S2620 in which the slot selecting means 2244 selects a playback slot to be played back according to a control input.

The processing sequence of the sound re-sampling means 2252 in step S2608 will be described below with reference to FIG. 76.

Figure 76:
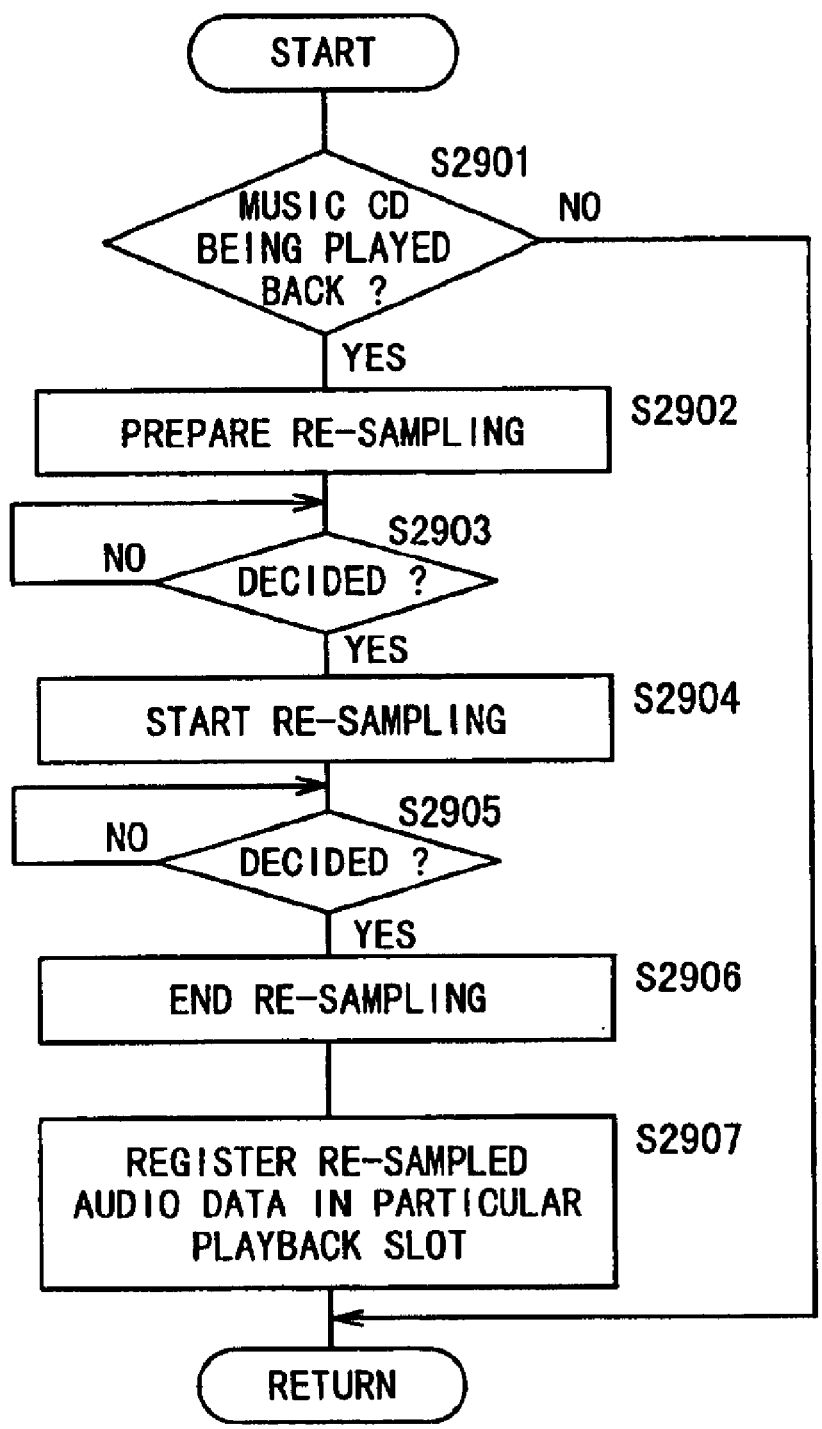
FIG. 76 is a flowchart of a processing sequence of a sound re-sampling means.

In step 2901 shown in FIG. 76, the sound re-sampling means 2252 determines whether audio data is being reproduced or not. If audio data is being reproduced, then control goes to step S2902 in which a re-sampling process is prepared. At this time, the color of the displayed frame of the second slot display area 2334 changes to yellow, for example, letting the user know that a re-sampling process is being prepared.

In step S2903, the sound re-sampling means 2252 waits for a control input from the decision button 112d. If there is a control input from the decision button 112d, then control goes to step S2904 in which the sound re-sampling means 2252 starts re-sampling audio data that is being reproduced.

In step S2905, the sound re-sampling means 2252 waits for a control input from the decision button 112d. If there is a control input from the decision button 112d, then control goes to step S2906 in which the sound re-sampling means 252 finishes the re-sampling process.

Thereafter, in step S2907, the sound re-sampling means 2252 registers re-sampled audio data in the fourth playback slot, i.e., in a record corresponding to the fourth playback slot, of the records in the playback slot file 2258.

After step S2907 or if audio data is not being reproduced in step S2901, the processing sequence of the sound re-sampling means 2252 is finished.

Figure 73:
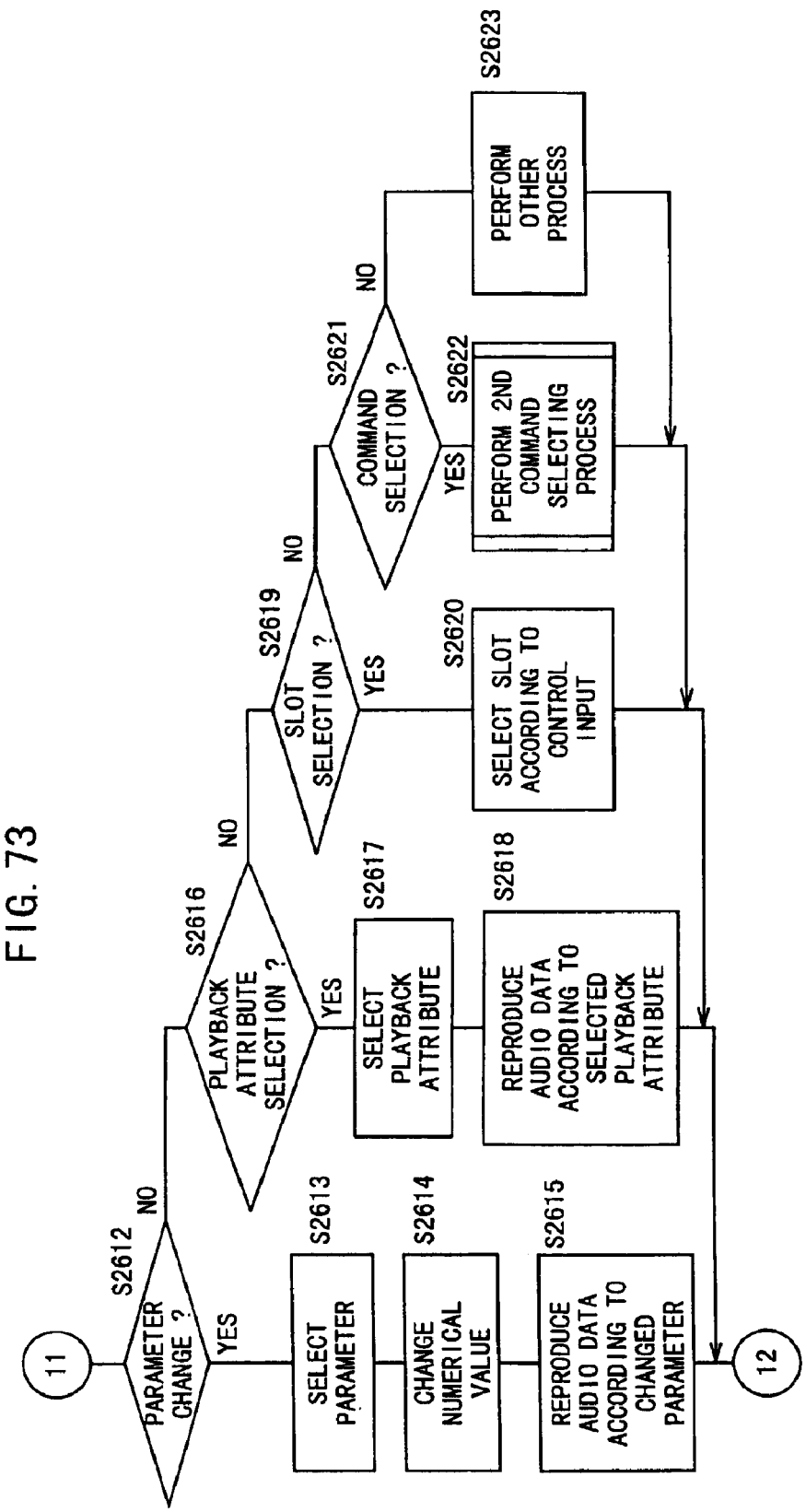

Control then goes back to the routine shown in FIG. 73. If the control input is not a control input relative to the selection of a slot in step S2619, then control goes to step S2621 in which the sound re-sampling means 2252 determines whether the control input is a control input relative to the selection of a command, e.g., a control input from the selection button 42, or not.

If the control input is a control input relative to the selection of a command, then control goes to step S2622 in which the second command selecting means 2254 performs its own processing sequence.

The processing sequence of the second command selecting means 2254 will be described below with reference to FIG. 77.

Figure 77:
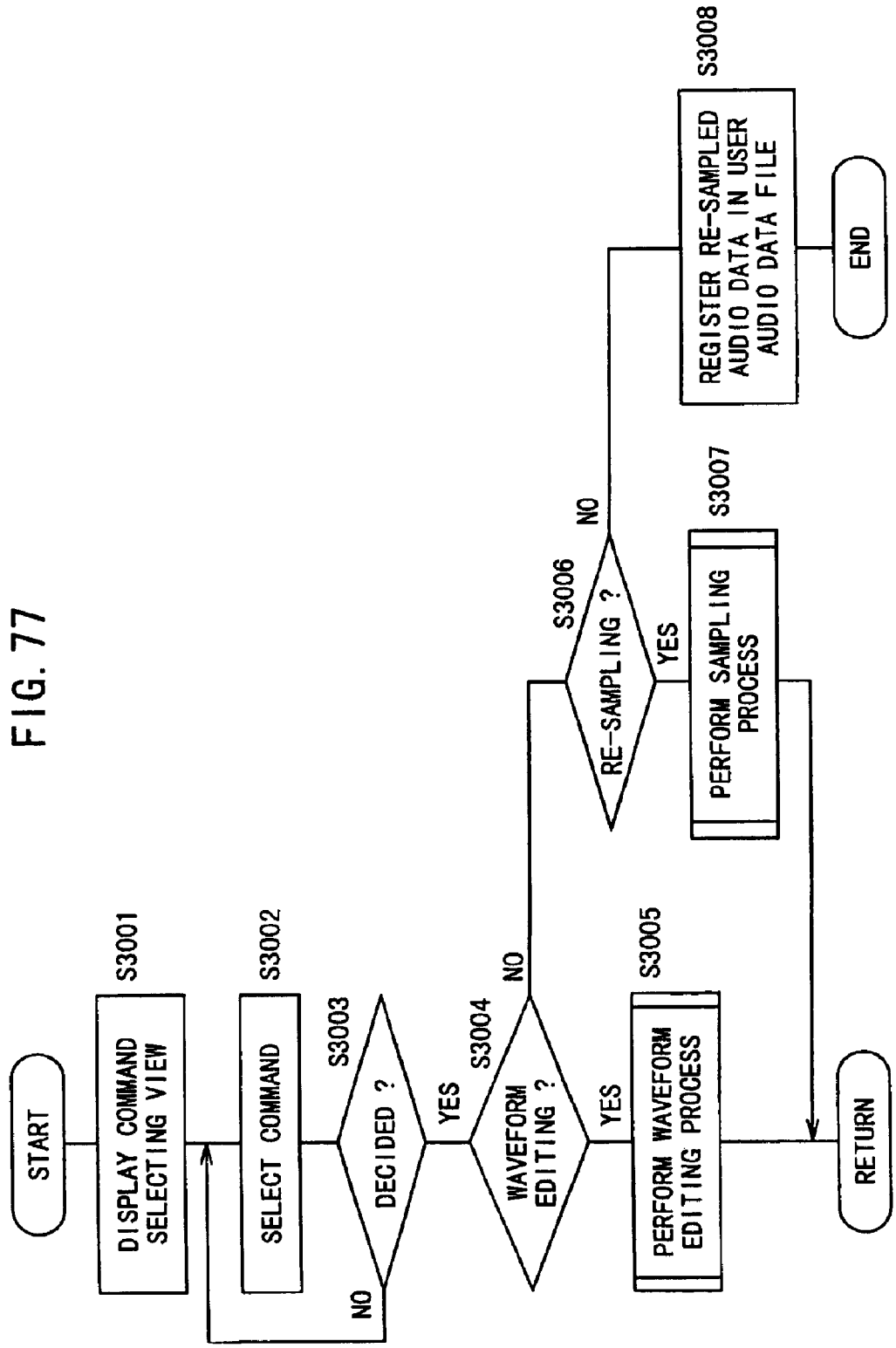
FIG. 77 is a flowchart of a processing sequence of a second command selecting means.

In step S3001 shown in FIG. 77, the second command selecting means 2254 displays a command request view, not shown, on the display monitor 18. The command request view comprises a window view with an array of three commands including a mode changing command (MODE_CHANGE), a waveform editing command (WAVE_EDIT), and an end command (EXIT).

In step S3002, the user selects a command by pressing the left button 110d, the right button 110b, and the decision button 112d of the manual controller 16.

In step S3003, the second command selecting means 2254 determines whether the selected command is decided or not. If the selected command is not decided, control goes back to step S3002 to select a command again. If the selected command is decided, then control goes to step S3004 in which the second command selecting means 2254 determines whether the selected command is a command for editing a waveform. If the selected command is a command for editing a waveform, then control goes to step S3005 in which the waveform editing means 2222 performs its own processing sequence.

The processing sequence of the waveform editing means 2222 is essentially the same as the processing sequence shown in FIG. 71, and will not be described in detail below. In this processing sequence, the waveform editing means 2222 edits the waveform, i.e., trims, the audio data assigned to the selected playback slot.

If the selected command is a not command for editing a waveform in step S3004, then control goes to step S3006 in which the second command selecting means 2252 determines whether the selected command is a command for sampling or not. If the selected command is a command for sampling, then control goes to step S3007 in which the sampling means 2204 performs its own processing sequence. The processing sequence of the sampling means 2204 has been described, and hence will not be described below.

If the selected command is not a command for sampling in step S3006, then control goes to step S3008 in which the re-sampled data registering means 2256 registers the re-sampled audio data which has been registered in the fourth playback slot, in the audio data file, e.g., a user audio data file, in the sound buffer 90. At this time, the audio data becomes available for use as one sound source for the entertainment apparatus 12. After step S3008, the processing sequence of the re-sampling means 2224 is ended.

Control then returns to the routine shown in FIG. 73. If the control input is not a control input relative to the selection of a command in step S2621, then control goes to step S2623 in which another process depending on the control input is carried out.

As described above, the entertainment system according to the present embodiment 10 comprises the music editing means 300 for assigning an arbitrary sound pattern selected from a plurality of sound patterns each composed of a combination of sounds to at least one track based on a control input from the manual controller, and the sound presentation trial processing means 1000 for outputting the sound pattern assigned to the track when a control input from the manual controller satisfies a predetermined condition.

Accordingly, audio data supplied from music CDs (Compact Disks) or via a network can be used as a BGM sound source for a video game or the like, thus providing an additional element of musical interest for the video game.

Further, the user can compose music simply with a small-scale facility without using a musical score and also to enjoy a music composition process and compose a piece of music at any time.

Further, the entertainment system according to the present invention can output a sound in response to a control input entered by the user, adding musical interest to a video game or the like. By producing various sounds in response to control inputs entered by the user, one piece of music can be completed, thereby allowing the user to enjoy the fun of completing a piece of music.

In the entertainment system 10 according to the present embodiment, as described above, a plurality of sound patterns composed of a combination of desired sounds are displayed as symbol images on the display monitor 18, and when at least one of tracks displayed on the display monitor 18 is selected and one of the symbol images is selected, one of the sound patterns which corresponds to the selected symbol image is registered in the selected track. Consequently, a desired sound pattern can be selected from a plurality of sound patterns composed of a combination of desired sounds, and assigned to a track.

Since the user is simply required to place various sound patterns on tracks without the need for placing notes on a staff notation, the user can compose music through highly simple control actions even if the user does not have an ability to read musical scores.

Inasmuch as sound patterns are represented by symbol images, the user is able to find desired sound patterns with ease and hence to make selections simply.

Therefore, the entertainment system 10 according to the present invention allows the user to compose music simply with a small-scale facility without using a musical score and also to enjoy a music composition process and compose a piece of music at any time.

As described above, in the entertainment system 10 according to the present embodiment, the user can compose music simply with a small-scale facility without using a musical score and also to enjoy a music composition process and compose a piece of music at any time.

The combination of sound patterns generated by the above-described music editing means 300 can be incorporated in the video game executed by the sound presentation trial processing means 1000. Therefore, a user can compose music and utilize the composed music for the video game. Accordingly, the user hardly loses interest in the video game.

By executing the sound presentation trial processing means 1000, the music composed by the user is gradually presented. The order of presentations of sound patterns registered in the respective tracks may be different from the order of registrations of sound patterns. That is, the atmosphere of combined sound patterns until a piece of music is completely created by the sound presentation trial processing function may differ from the atmosphere of combined sound patterns when the user composed the music. Accordingly, the user's motivation for composing music is further enhanced.

In the entertainment system 10 according to the present embodiment, extracted audio data of audio data introduced from an external source is registered as one of sound sources for the entertainment apparatus 12 or sound patterns for the music editing means 300 and the sound presentation trial processing means 1000. Therefore, audio data supplied from music compact discs (CDs) or via a network can be used as a sound source for video games to be played back on the entertainment apparatus 12, providing an additional element of musical interest for video games.

Particularly, according to the present embodiment, the waveform editing means 2222 for removing excessive data from the extracted audio data can cut off unwanted data from the extracted audio data, leaving only impressive audio data for use as a sound pattern.

Furthermore, according to the present embodiment, since the effect applying means 2212, 2246 for applying desired effects to the extracted audio data are provided, even one form of audio data can be modified into different forms of audio data by applying various effects, resulting in a variety of sound sources available.

Further, according to the present embodiment, the re-sampling means 2224 is provided for re-extracting desired audio data from the extracted audio data. Consequently, the user can extract only favorite portions from the audio data to which various effects have been applied or the audio data from which unwanted portions have been removed. Therefore, the quality of audio data for use as sound sources can be increased, and the process of extracting audio data is easy.

Moreover, the selecting playback means 2250 is provided for reproducing the extracted audio data according to one of a plurality of playback attributes which is selected by a control input from the manual controller 16. Therefore, the audio data can be varied in various playback modes such as the reverse playback mode and the skipping playback mode, resulting in a variety of sound sources available.

In the illustrated embodiment, audio data is introduced from a music CD loaded in the optical disk drive 70 of the entertainment apparatus 12. However, audio data may be introduced from a music playback device such as another optical disk drive, a DAT (Digital Audio Tape recorder), or the like connected to an external interface, e.g., a parallel I/O interface, of the entertainment apparatus 12, with the music playback device being controlled by the CPU 72.

The audio data processing means can be executed without having to replace an optical disk which stores the audio data processing means and various data, with a music CD, so that the entertainment system can be operated with ease and the optical disk can be replaced with various music CDs quickly.

Although a certain preferred embodiment of the present invention has been shown and described in detail, it should be understood that various changes and modifications may be made therein without departing from the scope of the appended claims.

What is claimed is:

1. An entertainment system comprising:
   an entertainment apparatus for executing various programs;
   at least one manual controller for entering control requests from a user into said entertainment apparatus;
   music editing means for assigning an arbitrary sound pattern selected from a plurality of sound patterns each composed of a combination of sounds to at least one track based on a control input from said manual controller; and
   sound presentation trial processing means for outputting said sound pattern assigned to said track when a control input from said manual controller satisfies a predetermined condition;
   wherein said music editing means displays said plurality of sound patterns as respective symbol images on said display unit, and, responsive to a control input from said manual controller to select at least one track displayed on said display unit and a control input from said manual controller to select said symbol images, registers sound patterns corresponding to the symbol images in the selected track;

wherein said music editing means comprises:

sound pattern outputting means for outputting a sound of the selected sound pattern via a speaker;

wherein said sound pattern outputting means comprises:

means for outputting the selected sound pattern depending on an array of light spots which are turned on, of a string of light spots disposed in said selected track.

2. An entertainment system according to claim 1, wherein said music editing means comprises:

light spot array changing means for changing the array of light spots which are turned on.

3. An entertainment system comprising:

an entertainment apparatus for executing various programs;

at least one manual controller for entering control requests from a user into said entertainment apparatus;

a sound pattern file for registering a plurality of sound patterns, said sound patterns each composed of a combination of sounds to have a length of at least one measure;

music editing means for assigning an arbitrary sound pattern selected from said sound patterns registered in said sound pattern file to at least one track based on a control input from said manual controller; and sound presentation trial processing means for outputting said sound pattern assigned to said track when a control input from said manual controller satisfies a predetermined condition;

wherein said sound presentation trial processing means displays an object relatively moving on at least one track displayed on said display unit, allowing the user to try to acquire the object with a control input, and outputs a sound assigned to the track on which the object is relatively moving when the acquisition of the object with the control input is detected;

wherein said sound presentation trial processing means comprises:

object displaying means for displaying said object relatively moving on at least one track;

object acquisition determining means for determining whether the object has been acquired with a control input or not; and sound outputting means for outputting a sound assigned to the track on which the object is relatively moving when said object acquisition determining means determines that the object has been acquired.

4. An entertainment system comprising:

an entertainment apparatus for executing various programs;

at least one manual controller for entering control requests from a user into said entertainment apparatus;

music editing means for assigning an arbitrary sound pattern selected from a plurality of sound patterns each composed of a combination of sounds to at least one track based on a control input from said manual controller; and sound presentation trial processing means for outputting said sound pattern assigned to said track when a control input from said manual controller satisfies a predetermined condition;

wherein said sound presentation trial processing means for displaying an object relatively on at least one track displayed on said display unit, allowing the user to try to acquire the object with a control input, and outputting a sound assigned to the track on which the object is relatively moving when the acquisition of the object with the control input is detected;

wherein said sound presentation trial processing comprises:

object displaying for displaying said object relatively moving on at least one track;

object acquisition determining means for determining whether the object has been acquired with a control input or not; and sound outputting means for outputting a sound assigned to the track on which the object is relatively moving when said object acquisition determining means determines that the object has been acquired;

wherein said sound presentation trail processing means comprises:

acquiring object displaying means for displaying an acquiring object to acquire the relatively moving object; and wherein said object acquisition determining means comprises:

means for determining that said object is acquired if the distance between said acquiring object and the relatively moving object falls in a predetermined range when a predetermined control input is entered from said manual controller.

5. An entertainment system according to claim 4, wherein a plurality of tracks are displayed on said display unit, and said object acquisition determining means comprises:

means for determining that said object is acquired if a track on which said acquiring object and a track on which the relatively moving object are the same as each other when said predetermined control input is entered from said manual controller, and also if the distance between said acquiring object and the relatively moving object falls in said predetermined range.

6. An entertainment system according to claim 5, further comprising:

indicator displaying means for displaying an indicator image indicative of one of said tracks on which said object is coming.

7. An entertainment system comprising:

an entertainment apparatus for executing various programs;

at least one manual controller for entering control requests from a user into said entertainment apparatus;

music editing means for assigning an arbitrary sound pattern selected from a plurality of sound patterns each composed of a combination of sounds to at least one track based on a control input from said manual controller; and sound presentation trial processing means for outputting said sound pattern assigned to said track when a control input from said manual controller satisfies a predetermined condition;

wherein said sound presentation trial processing means for displaying an object relatively moving on at least one track displayed on said display unit, allowing the user to try to acquire the object with a control input, and outputting a sound assigned to the track on which the object is relatively moving when the acquisition of the object with the control input is detected;

wherein said sound presentation trial processing means comprises:

object displaying means for displaying said object relatively moving on at least one track;

object acquisition determining means for determining whether the object has been acquired with a control input or not; and sound outputting means for outputting a sound assigned to the track on which the object is relatively moving when said object acquisition determining means determines that the object has been acquired;

wherein a sound pattern assigned to said track is disposed as a bit string indicative of whether the sound is to be outputted or not outputted, on said track, further comprising:

light spot displaying means for displaying a bit string related to the acquired object and indicative of an output state, of the sound pattern disposed on the track on which the acquired object is positioned, in relative motion as an array of light spots; and wherein said sound outputting means comprises:

means for outputting a sound assigned to a light spot which has reached said acquiring object, of the sound pattern assigned to said track.

8. A recording medium storing a program and data for use in an entertainment system having an entertainment apparatus for executing various programs, at least one manual controller for entering manual control requests from the user into said entertainment apparatus, and a display unit for displaying images outputted from said entertainment apparatus, the program stored in said recording medium comprising a first step of:

assigning an arbitrary sound pattern selected from a plurality of sound patterns each composed of a combination of sounds to at least one track based on a control input from said manual controller; and said program further comprising a second step of:

outputting said sound pattern assigned to said track when a control input from said manual controller satisfies a predetermined condition;

wherein said first step includes the steps of:

displaying a plurality of sound patterns composed of a combination of sounds as respective symbol images on said display unit, and, responsive to a control input from said manual controller to select at least one track displayed on said display unit and a control input from said manual controller to select said symbol images, registering sound patterns corresponding to the symbol images in the selected track;

wherein said first step includes the step of:

outputting a sound of the selected sound pattern via a speaker;

wherein said step of outputting a sound comprises the step of:

outputting the selected sound pattern depending on an array of light spots which are turned on, of a string of light spots disposed in said selected track.

9. A recording medium according to claim 8, wherein said first step includes the step of:

changing the array of light spots which are turned on.

10. A recording medium storing a program and data for use in an entertainment system having an entertainment apparatus for executing various programs, at least one manual controller for entering manual control requests from the user into said entertainment apparatus, and a display unit for displaying images outputted from said entertainment apparatus, the program stored in said recording medium comprising a first step of:

assigning an arbitrary sound pattern selected from a plurality of sound patterns each composed of a combination of sounds to at least one track based on a control input from said manual controller; and said program further comprising a second step of:

outputting said sound pattern assigned to said track when a control input form said manual controller satisfies a predetermined condition;

wherein said second step includes the steps of:

displaying an object relatively moving on at least one track displayed on said display unit;

allowing the user to try to acquired the object with a control input; and outputting a sound assigned to the track on which the object is relatively moving when the acquisition of the object with the control input is detected;

wherein said second step includes the steps of:

displaying said object relatively moving on at least one track;

determining whether the object has been acquired with a control input or not; and outputting a sound assigned to the track on which the object is relatively moving when the object is determined as acquired;

wherein said second step includes the step of:

displaying an acquiring object to acquire the relatively moving object; and wherein said step of determining whether the object has been acquired with a control input or not comprises the step of:

determining that said object is acquired the distance between said acquiring object and the relatively moving object falls in a predetermined range when a predetermined control input is entered from said manual controller;

wherein a plurality of tracks are displayed on said display unit, and said second step includes the step of:

determining that said object is acquired if a track on which said acquiring object and a track on which the relatively moving object are the same as each other when said predetermined control input is entered from said manual controller, and also if the distance between said acquiring object and the relatively moving object falls in said predetermined range.

11. A recording medium according to claim 10, wherein said program further comprises the step of:

displaying an indicator image indicative of one of said tracks on which said object is coming.

12. A recording medium storing a program and data for use in an entertainment system having an entertainment apparatus for executing various programs, at least one manual controller for entering manual control requests from the user into said entertainment apparatus, and a display unit for displaying images outputted from said entertainment apparatus, the program stored in said recording medium comprising a first step of:

assigning an arbitrary sound pattern selected from a plurality of sound patterns each composed of a combination of sounds to at least one track based on a control input from said manual controller; and said program further comprising a second step of:

outputting said sound pattern assigned to said track when a control input from said manual controller satisfies a predetermined condition;

wherein said second step includes the steps of:

displaying an object relatively moving on at least one track displayed on said display unit;

allowing the user to try to acquire the object with a control input; and outputting a sound assigned to the track on wich the object is relatively moving when the acquisition of the object with the control input is detected;

wherein said second step includes the steps of:

displaying said object relatively moving on at least one track;

determining whether the object has been acquired with a control input or not; and outputting a sound assigned to the track on which the object is relatively moving when the object is determined as acquired;

wherein a sound pattern assigned to said track is disposed as a bit string indicative of whether the sound is to be outputted or not outputted, on said track, wherein said program further comprises the step of:

displaying a bit string related to the acquired object and indicative of an output state, of the sound pattern disposed on the track on which the acquired object is positioned, in relative notion as an array of light spots; and wherein said step of outputting a sound comprises the step of:

outputting a sound assigned to a light spot which has reached said acquiring object, of the sound pattern assigned to said track.

* * * * *